United States Patent
Sekiguchi et al.

(10) Patent No.: US 12,462,840 B2
(45) Date of Patent: *Nov. 4, 2025

(54) MAGNETIC RECORDING MEDIUM AND CARTRIDGE

(71) Applicant: Sony Group Corporation, Tokyo (JP)

(72) Inventors: Noboru Sekiguchi, Tokyo (JP); Minoru Yamaga, Tokyo (JP); Futoshi Sasaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 18/574,137

(22) PCT Filed: Mar. 31, 2022

(86) PCT No.: PCT/JP2022/016806
§ 371 (c)(1),
(2) Date: Dec. 26, 2023

(87) PCT Pub. No.: WO2023/002723
PCT Pub. Date: Jan. 26, 2023

(65) Prior Publication Data
US 2024/0331727 A1 Oct. 3, 2024

(30) Foreign Application Priority Data
Jul. 21, 2021 (JP) .................. 2021-121070

(51) Int. Cl.
*G11B 5/733* (2006.01)
*G11B 5/706* (2006.01)
(Continued)

(52) U.S. Cl.
CPC .......... *G11B 5/733* (2013.01); *G11B 5/70678* (2013.01); *G11B 5/7085* (2013.01); *G11B 5/714* (2013.01)

(58) Field of Classification Search
None
See application file for complete search history.

(56) References Cited

U.S. PATENT DOCUMENTS 6,139,937 A * 10/2000 Sato .................... G11B 5/84
6,177,175 B1 * 1/2001 Hashimoto ....... G11B 11/10593
428/141

(Continued)

FOREIGN PATENT DOCUMENTS

JP 2008065953 A 3/2008
JP 2010-231843 A 10/2010
(Continued)

OTHER PUBLICATIONS

International Search Report from corresponding PCT application PCT/JP2022/016806, dated Jun. 28, 2022.

*Primary Examiner* — Kevin M Bernatz
(74) *Attorney, Agent, or Firm* — K&L Gates LLP

(57) ABSTRACT

A magnetic recording medium sequentially includes a base, an underlayer, and a magnetic layer. The magnetic layer includes magnetic particles, conductive first particles, and second particles having a Mohs hardness of 7.0 or more. The magnetic layer has a concavoconvex shape on a magnetic surface, and the concavoconvex shape includes a first protrusion including the first particles and a second protrusion including the second particles. A ratio H1/H2 of an average height H1 of the first protrusion and an average height H2 of the second protrusion satisfies H1/H2≤2.3, a height range ΔH obtained from statistical information on a height of the concavoconvex shape satisfies 3.00 nm≤ΔH≤6.00 nm, and a gradient range ΔA obtained from statistical information on a gradient of the concavoconvex shape satisfies 4.00 degrees≤ΔA≤9.00 degrees.

20 Claims, 32 Drawing Sheets

(51) Int. Cl.
  *G11B 5/708*  (2006.01)
  *G11B 5/714*  (2006.01)

(56) References Cited

U.S. PATENT DOCUMENTS

| | | | | |
|---|---|---|---|---|
| 11,854,585 B2* | 12/2023 | Sekiguchi | ............ | G11B 5/5928 |
| 12,243,569 B2* | 3/2025 | Sekiguchi | ............ | G11B 5/5928 |
| 2005/0079389 A1* | 4/2005 | Ichikawa | ............. | G11B 5/7325 |
| | | | | 428/844 |
| 2010/0246073 A1* | 9/2010 | Katayama | ............ | G11B 5/7085 |
| | | | | 360/324 |
| 2014/0287271 A1 | 9/2014 | Sato | | |
| 2019/0074032 A1 | 3/2019 | Mori et al. | | |
| 2022/0270644 A1* | 8/2022 | Kurokawa | ............ | G11B 5/7085 |
| 2024/0170013 A1* | 5/2024 | Yamaga | ................. | G11B 5/708 |

FOREIGN PATENT DOCUMENTS

| JP | 2014-209403 A | 11/2014 |
|---|---|---|
| JP | 2017-168178 A | 9/2017 |
| JP | 2019-050067 A | 3/2019 |
| JP | 6863511 B2 | 4/2021 |

\* cited by examiner

FIG. 3
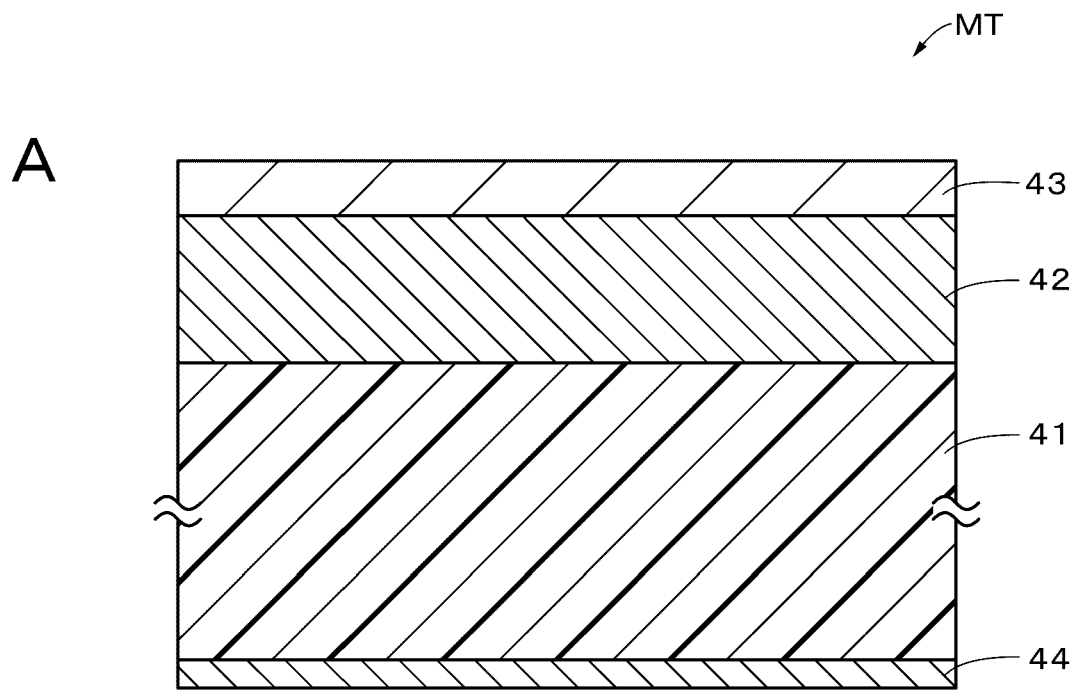
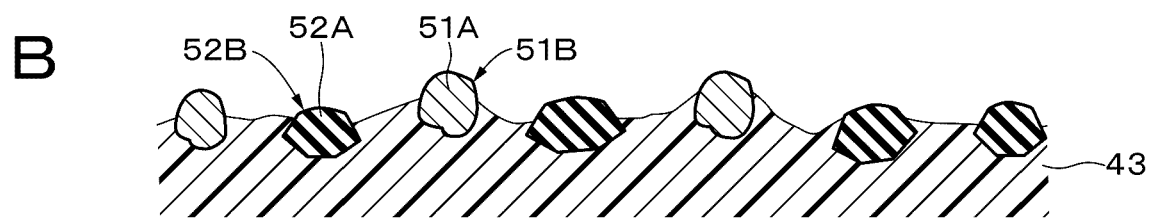

FIG. 11
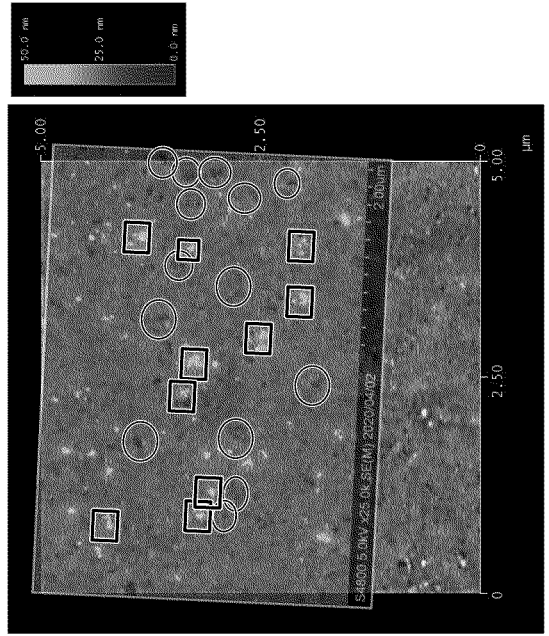
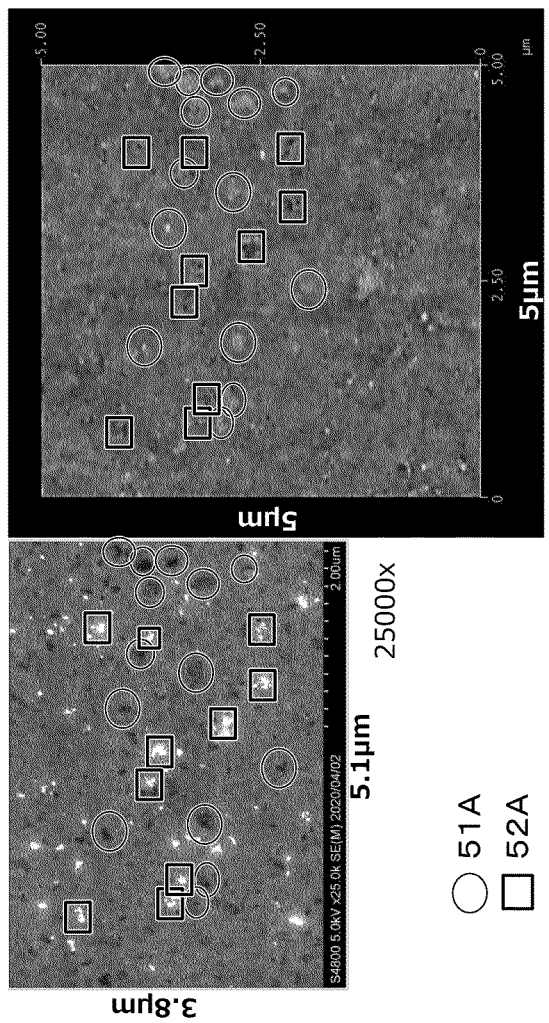

FIG. 20
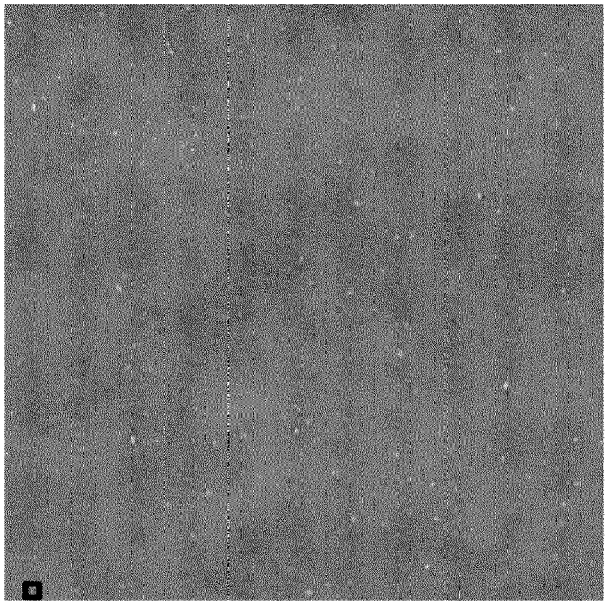
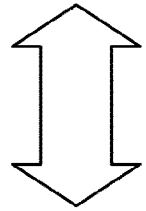

FIG. 21

NUMERICAL DATA MATRIX OF HEIGHT Z (L, W)

|   | 1 | 2 | 3 | ... | 254 | 255 | 256 (=L) |
|---|---|---|---|---|---|---|---|
| 1 | 0.00 | 0.10 | 0.00 | ... | -0.20 | -0.10 | -0.10 |
| 2 | 0.10 | 0.20 | 0.00 | ... | 0.20 | 0.20 | 0.10 |
| 3 | 0.40 | 0.00 | 0.00 | ... | 0.20 | 0.00 | 0.00 |
| ... | ... | ... | ... | ... | ... | ... | ... |
| 254 | 0.40 | 0.20 | 0.10 | ... | -0.20 | 0.00 | -0.10 |
| 255 | 0.10 | -0.20 | -0.10 | ... | -0.30 | -0.10 | 0.00 |
| 256 | 0.00 | -0.10 | -0.20 | ... | -0.40 | -0.20 | -0.10 |

NUMERICAL DATA MATRIX OF HEIGHT ζ (L, W)

|   | 1 | 2 | 3 | ... | 254 | 255 | 256 | (=L) |
|---|---|---|---|---|---|---|---|---|
| 1 | 0.10 | 0.20 | 0.10 | ... | -0.10 | 0.00 | 0.00 | |
| 2 | 0.20 | 0.30 | 0.10 | ... | 0.30 | 0.30 | 0.20 | |
| 3 | 0.50 | 0.10 | 0.10 | ... | 0.30 | 0.10 | 0.10 | |
| ... | ... | ... | ... | ... | ... | ... | ... | |
| 254 | 0.50 | 0.30 | 0.20 | ... | -0.10 | 0.10 | 0.00 | |
| 255 | 0.20 | -0.10 | 0.00 | ... | -0.20 | 0.00 | 0.10 | |
| 256 | 0.10 | 0.00 | -0.10 | ... | -0.30 | -0.10 | 0.00 | |

NUMERICAL DATA MATRIX OF GRADIENT $G_L$ (L, W)

| | 1 | 2 | 3 | ... | 254 | 255 | 256 (=L) |
|---|---|---|---|---|---|---|---|
| 1 | 0.07 | 0.07 | 0.03 | ... | 0.07 | 0.00 | NONE |
| 2 | 0.07 | 0.15 | 0.10 | ... | 0.00 | 0.07 | NONE |
| 3 | 0.29 | 0.00 | 0.12 | ... | 0.15 | 0.00 | NONE |
| ... | ... | ... | ... | ... | ... | ... | ... |
| 254 | 0.15 | 0.07 | 0.05 | ... | 0.15 | 0.07 | NONE |
| 255 | 0.22 | 0.07 | 0.18 | ... | 0.15 | 0.07 | NONE |
| 256 | 0.07 | 0.07 | 0.00 | ... | 0.15 | 0.07 | NONE |

(=W)

B

NUMERICAL DATA MATRIX OF GRADIENT $G_W$ (L, W)

| | 1 | 2 | 3 | ... | 254 | 255 | 256 (=L) |
|---|---|---|---|---|---|---|---|
| 1 | 0.07 | 0.07 | 0.00 | ... | 0.29 | 0.22 | 0.15 |
| 2 | 0.22 | 0.15 | 0.00 | ... | 0.00 | 0.15 | 0.07 |
| 3 | 0.20 | 0.20 | 0.23 | ... | 0.24 | 0.12 | 0.22 |
| ... | ... | ... | ... | ... | ... | ... | ... |
| 254 | 0.22 | 0.29 | 0.15 | ... | 0.07 | 0.07 | 0.07 |
| 255 | 0.07 | 0.07 | 0.07 | ... | 0.07 | 0.07 | 0.07 |
| 256 | NONE | NONE | NONE | ... | NONE | NONE | NONE |

(=W)

FIG. 24
A
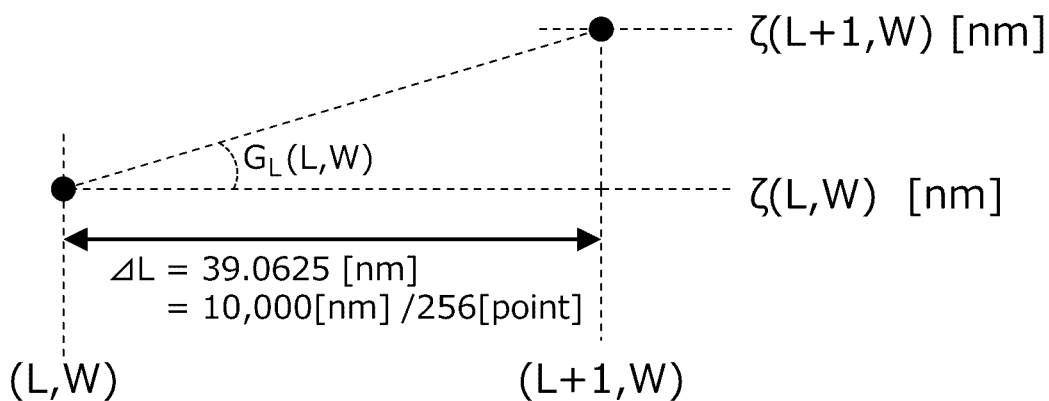
B
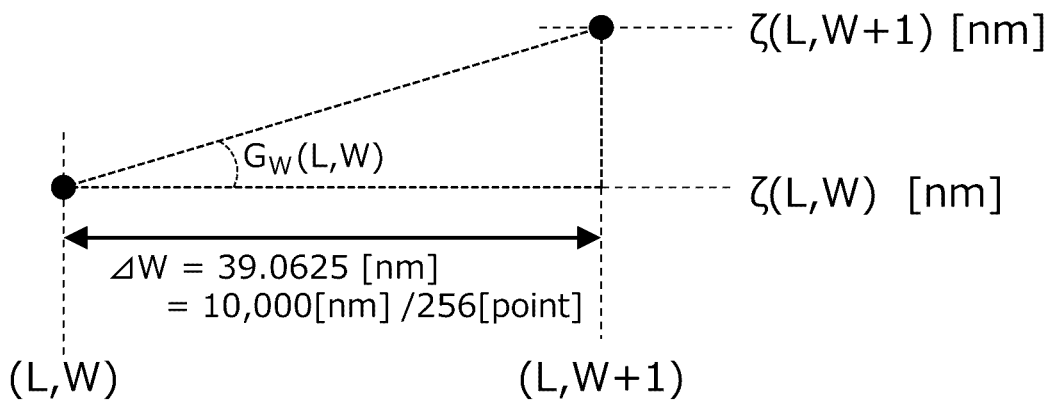

NUMERICAL DATA MATRIX OF NUMBER OF DATA M (H, A)

| | | 0.0 | 0.1 | 0.2 | ... | 1.2 | GRADIENT REPRESENTATIVE VALUE A |
|---|---|---|---|---|---|---|---|
| 1.7 | +11.5 | 0 | 2 | 2 | ... | 2 | |
| 4.2 | +11.0 | 3 | 3 | 7 | ... | 4 | |
| ... | ... | ... | ... | ... | ... | ... | |
| 1844.9 | +1.0 | 2862 | 2758 | 2690 | ... | 674 | |
| 1934.1 | +0.5 | 2932 | 3014 | 2977 | ... | 711 | |
| 2037.1 | 0 | 3162 | 3123 | 3066 | ... | 711 | |

$M_{ave}(H)$  HEIGHT REPRESENTATIVE VALUE H

AVERAGING $M_{ave}(H) = -5.0H + 59.2$ $M_{ave}(H_{low}) = 4.2$

THRESHOLD = 2

$M_{ave}(H_{high}) = 1.7$ $H_{high} = 11.5$   $\Delta H = 11.4$   $H_{low} = 11.0$

|  |  | 0.0 | 0.1 | 0.2 | ... | 3.4 | 3.5 | $M_{ave}(A)$ |
|---|---|---|---|---|---|---|---|---|
|  |  | 916.2 | 902.5 | 889.0 | ... | 2.2 | 1.7 | GRADIENT REPRESENTATIVE VALUE A |
| 1.7 | +11.5 | 0 | 2 | 2 | ... | 1 | 4 | |
| 4.2 | +11.0 | 3 | 3 | 7 | ... | 0 | 2 | |
| ... | ... | ... | ... | ... | ... | ... | ... | |
| 1844.9 | +1.0 | 2862 | 2758 | 2690 | ... | 5 | 1 | |
| 1934.1 | +0.5 | 2932 | 3014 | 2977 | ... | 3 | 2 | |
| 2037.1 | 0 | 3162 | 3123 | 3066 | ... | 5 | 7 | |

$M_{ave}(H)$ HEIGHT REPRESENTATIVE VALUE H

AVERAGING → 916.2

$M_{ave}(A) = -5.0A + 19.2$ $M_{ave}(A_{low}) = 2.2$

THRESHOLD = 2

$M_{ave}(A_{high}) = 1.7$ $A_{high} = 3.5$   $\Delta A = 3.44$   $A_{low} = 3.4$

MAGNETIC RECORDING MEDIUM AND CARTRIDGE

TECHNICAL FIELD

The present disclosure relates to a magnetic recording medium and a cartridge including the magnetic recording medium.

BACKGROUND ART

Tape-shaped magnetic recording media are widely used for storage of electronic data. In a tape-shaped magnetic recording medium, in order to obtain good recording/reproducing characteristics (electromagnetic conversion characteristics), it is desired to reduce height of unevenness of a surface (hereinafter, referred to as a "magnetic surface") of a magnetic layer and to smooth a magnetic surface (see, for example, Patent Document 1).

CITATION LIST

Patent Document

Patent Document 1: Japanese Patent Application Laid-Open No. 2006-65953

SUMMARY OF THE INVENTION

Problems to be Solved by the Invention

However, when the height of the unevenness of the magnetic surface is reduced, as an abuse, a standard deviation σPES of a PES value of the magnetic recording medium increases due to traveling many times.

An object of the present disclosure is to provide a magnetic recording medium that can ensure good electromagnetic conversion characteristics while suppressing an increase in standard deviation σPES due to traveling many times, and a cartridge including the magnetic recording medium.

Solutions to Problems

In order to solve the above problem, a first disclosure is a tape-shaped magnetic recording medium, the magnetic recording medium sequentially including a base, an underlayer, and a magnetic layer,
  in which the magnetic layer includes magnetic particles, conductive first particles, and second particles having a Mohs hardness of 7.0 or more,
  the magnetic layer has a concavoconvex shape on a magnetic surface,
  the concavoconvex shape includes a first protrusion including the first particle and a second protrusion including the second particle,
  a ratio H1/H2 of an average height H1 of the first protrusion and an average height H2 of the second protrusion satisfies H1/H2≤2.3,
  a height range ΔH obtained from statistical information on a height of the concavoconvex shape satisfies 3.00 nm≤ΔH≤6.00 nm, and
  a gradient range ΔA obtained from statistical information on a gradient of the concavoconvex shape satisfies 4.00 degrees≤ΔA≤9.00 degrees.

A second disclosure is a tape-shaped magnetic recording medium, the magnetic recording medium sequentially including a base, an underlayer, and a magnetic layer,
  in which the magnetic layer includes magnetic particles, carbon particles, and an abrasive,
  the magnetic layer has a concavoconvex shape on a magnetic surface,
  the concavoconvex shape includes a first protrusion including the carbon particle and a second protrusion including the abrasive,
  a ratio H1/H2 of an average height H1 of the first protrusion and an average height H2 of the second protrusion satisfies H1/H2≤2.3,
  a height range ΔH obtained from statistical information on a height of the concavoconvex shape satisfies 3.00 nm≤ΔH≤6.00 nm, and
  a gradient range ΔA obtained from statistical information on a gradient of the concavoconvex shape satisfies 4.00 degrees≤ΔA≤9.00 degrees.

BRIEF DESCRIPTION OF DRAWINGS

FIG. 3A is a cross-sectional view illustrating an example of a configuration of a magnetic tape. FIG. 3B is a cross-sectional view illustrating an example of a configuration of a magnetic surface.

FIG. 11 is a view illustrating an example of a composite image in which an AFM image and the FE-SEM image are superimposed.

FIG. 20A is a view illustrating an example of a two-dimensional surface profile image after filter action. FIG. 20B is a view illustrating an example of a numerical data matrix of a height $\zeta$ (L, W).

FIG. 21 is a view illustrating an example of a numerical data matrix of a relative height Z (L, W).

FIG. 22 is a view for explaining a method of calculating gradients $G_L$ (L, W) and $G_W$ (L, W) at each point (L, W).

FIG. 23A is a view illustrating an example of a numerical data matrix of the gradient $G_L$ (L, W). FIG. 23B is a view illustrating an example of a numerical data matrix of the gradient $G_W$ (L, W).

FIG. 24A is a view illustrating a method of calculating the gradient $G_L$ (L, W). FIG. 24B is a view illustrating a method of calculating the gradient $G_W$ (L, W).

MODE FOR CARRYING OUT THE INVENTION

Figure 1:
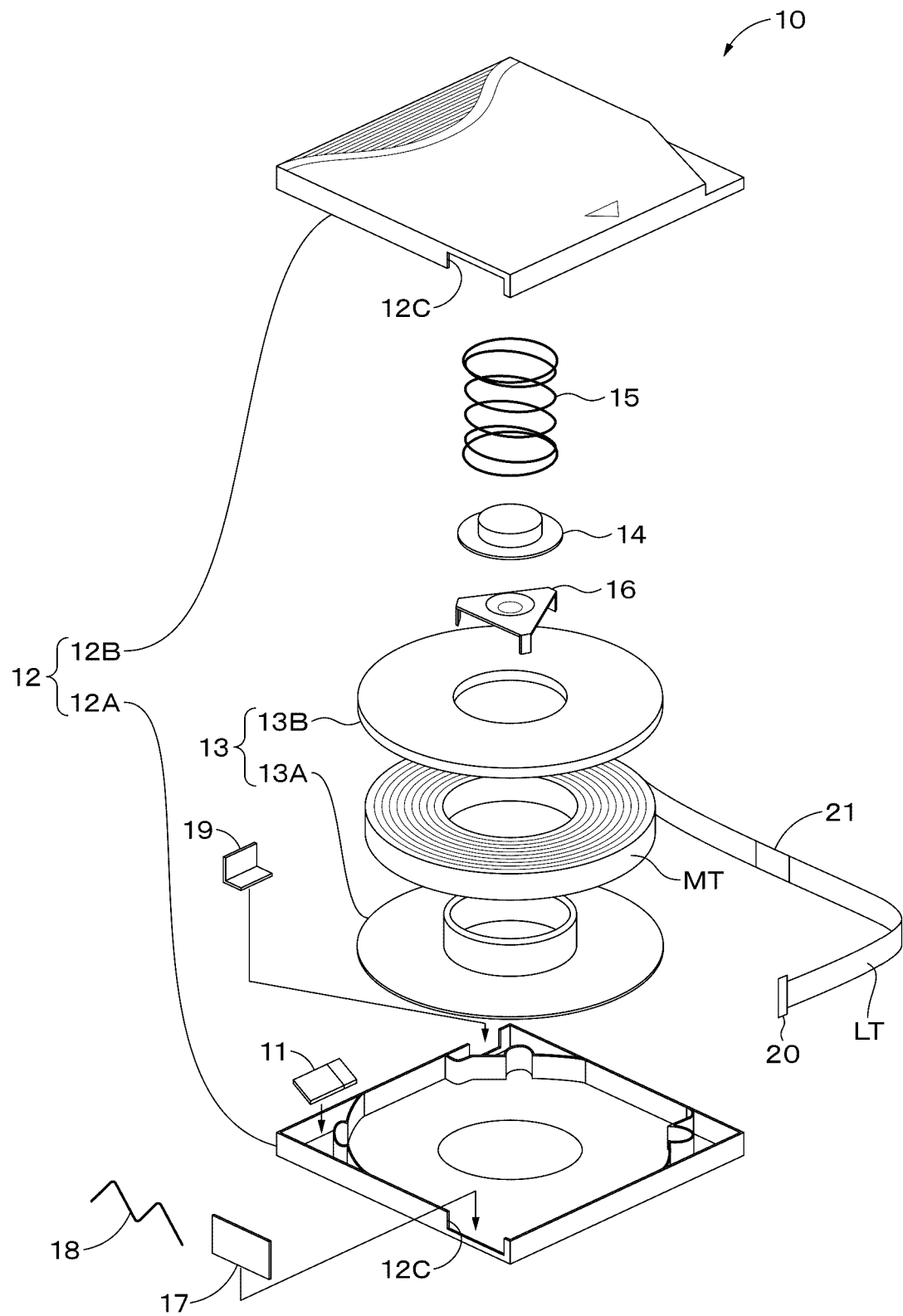
FIG. 1 is an exploded perspective view illustrating an example of a configuration of a cartridge according to an embodiment of the present disclosure.

Embodiments of the present disclosure will be described in the following order.

1 Configuration of cartridge
2 Configuration of cartridge memory
3 Configuration of magnetic tape
4 Method of manufacturing magnetic tape
5 Operation and effect
6 Modification In the present specification, in a case where a measurement environment is not particularly described with respect to a description of a measurement method, measurement is performed under an environment of 25° C.±2° C. and 50% RH±5% RH.

[1 Configuration of Cartridge]

FIG. 1 is an exploded perspective view illustrating an example of a configuration of a cartridge 10. The cartridge 10 is a one-reel type cartridge, and includes one reel 13 around which a tape-shaped magnetic recording medium (hereinafter, referred to as a "magnetic tape") MT is wound inside a cartridge case 12 including a lower shell 12A and an upper shell 12B, a reel lock 14 and a reel spring 15 for locking rotation of the reel 13, a spider 16 for releasing a locked state of the reel 13, a slide door 17 for opening and closing a tape drawing port 12C provided in the cartridge case 12 across the lower shell 12A and the upper shell 12B, a door spring 18 for biasing the slide door 17 to a closed position of the tape drawing port 12C, a write protect 19 for preventing erroneous erasure, and a cartridge memory 11. The reel 13 for winding the magnetic tape MT has a substantially disk shape having an opening in a central portion, and includes a reel hub 13A and a flange 13B formed from a hard material such as plastic. A reader tape LT is connected to an end portion on an outer peripheral side of the magnetic tape MT. A leader pin 20 is provided at a tip of the reader tape LT.

The cartridge 10 may be a magnetic tape cartridge according to a linear tape-open (LTO) standard, or may be a magnetic tape cartridge according to a standard different from the LTO standard.

The cartridge memory 11 is provided near one corner of the cartridge 10. In a state where the cartridge 10 is loaded into a recording/reproduction apparatus, the cartridge memory 11 faces a reader-writer of the recording/reproduction apparatus. The cartridge memory 11 communicates with the recording/reproduction apparatus, specifically, with the reader-writer by a wireless communication standard according to the LTO standard.

[2 Configuration of Cartridge Memory]

Figure 2:
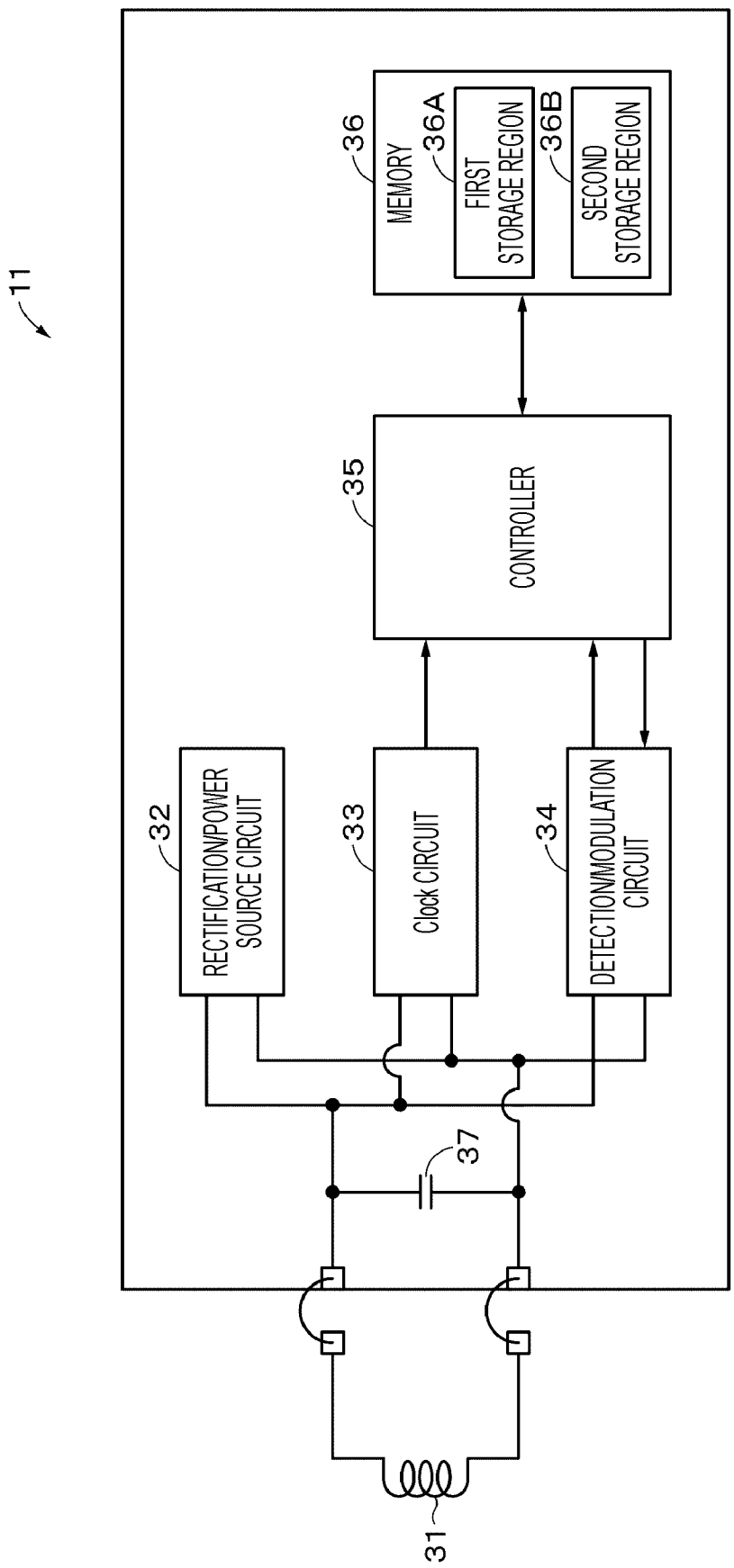
FIG. 2 is a block diagram illustrating an example of a configuration of a cartridge memory.

FIG. 2 is a block diagram illustrating an example of a configuration of the cartridge memory 11. The cartridge memory 11 includes an antenna coil (communication section) 31 that communicates with the reader-writer according to a prescribed communication standard, a rectification/power source circuit 32 that generates electric power from an electric wave received from the antenna coil 31 by use of an induced electromotive force, and rectifies the electric power to generate a power source, a clock circuit 33 that generates a clock from the electric wave received from the antenna coil 31 by similarly using the induced electromotive force, a detection/modulation circuit 34 that performs detection of the electric wave received from the antenna coil 31 and modulation of a signal to be transmitted from the antenna coil 31, a controller (control section) 35 including a logical circuit or the like for discriminating commands and data from a digital signal extracted from the detection/modulation circuit 34 and for processing the commands and data, and a memory (storage section) 36 that stores information. In addition, the cartridge memory 11 includes a capacitor 37 connected in parallel to the antenna coil 31, and the antenna coil 31 and the capacitor 37 constitute a resonance circuit.

The memory 36 stores information concerning the cartridge 10 and the like. The memory 36 is a non-volatile memory (NVM). The memory 36 preferably has a storage capacity of about 32 KB or more.

The memory 36 includes a first storage region 36A and a second storage region 36B. The first storage region 36A corresponds to, for example, a storage region of a cartridge memory of a magnetic tape standard before a specified generation (for example, LTO standards before LTO8), and is a region for storing information according to the magnetic tape standard before the specified generation. The information according to the magnetic tape standard before the specified generation is, for example, manufacturing information (for example, specific number of the cartridge 10 or the like), use history (for example, the number of times of tape draw-out (Thread Count)), and the like.

The second storage region 36B corresponds to an extension storage region in regard of the storage region of the cartridge memory of the magnetic tape standard before the specified generation (for example, LTO standards before LTO8). The second storage region 36B is a region for storing additional information. Here, the additive information means, for example, information concerning the cartridge 10 that is not prescribed in the magnetic tape standard before the specified generation (for example, LTO standards before LTO8). The additional information includes, for example, at least one type of information selected from the group consisting of tension adjustment information, management ledger data, index information, thumbnail information, and the like, but is not limited to these data. The tension adjustment information is information for adjusting the tension applied to the magnetic tape MT in the longitudinal direction. The tension adjustment information includes, for example, at least one type of information selected from the group consisting of information obtained by intermittently measuring a width between servo bands in the longitudinal direction of the magnetic tape MT, drive tension information, drive temperature and humidity information, and the like. These pieces of information may be managed in cooperation with information associated with a usage status of the cartridge 10 or the like. The tension adjustment information is preferably acquired at the time of data recording on the magnetic tape MT or before data recording. The drive tension information means information on the tension applied to the magnetic tape MT in the longitudinal direction.

The management ledger data is data including at least one selected from the group consisting of the capacity, creation date, editing date, storage location, and the like of a data file recorded on the magnetic tape MT. The index information is metadata or the like for searching the content of the data file. The thumbnail information is a thumbnail of a moving image or a still image stored on the magnetic tape MT.

The memory 36 may have a plurality of banks. In this case, some of the plurality of banks may constitute the first storage region 36A, and the remaining banks may constitute the second storage region 36B.

The antenna coil 31 induces an induced voltage by electromagnetic induction. The controller 35 communicates with the recording/reproducing device according to a prescribed communication standard through the antenna coil 31. Specifically, for example, mutual authentication, transmission and reception of commands, and exchange of data are performed.

The controller 35 stores information received from the recording/reproducing device through the antenna coil 31 in the memory 36. For example, the tension adjustment information received from the recording/reproducing device through the antenna coil 31 is stored in the second storage region 36B of the memory 36. In response to a request from the recording/reproducing device, the controller 35 reads information from the memory 36, and transmits the information to the recording/reproducing device through the antenna coil 31. For example, in response to the request from the recording/reproducing device, the tension adjustment information is read from the second storage region 36B of the memory 36 and transmitted to the recording/reproducing device through the antenna coil 31.

[3 Configuration of Magnetic Tape]

FIG. 3A is a cross-sectional view illustrating an example of a configuration of the magnetic tape MT. The magnetic tape MT is provided with an elongated base 41, an underlayer 42 provided on one main surface (first main surface) of the base 41, a magnetic layer 43 provided on the underlayer 42, and a back layer 44 provided on the other main surface (second main surface) of the base 41. Note that the underlayer 42 and the back layer 44 are provided as necessary and they are not necessarily provided. The magnetic tape MT may be a perpendicular recording type magnetic recording medium or may be a longitudinal recording type magnetic recording medium. The magnetic tape MT preferably contains a lubricant from the viewpoint of improving traveling performance. The lubricant may be contained in at least one of the underlayer 42 or the magnetic layer 43.

The magnetic tape MT may conform to the LTO standard, or may conform to a standard different from the LTO standard. The width of the magnetic tape MT may be ½ inches, or may be wider than ½ inches. In a case where the magnetic tape MT conforms to the LTO standard, the width of the magnetic tape MT is ½ inches. The magnetic tape MT may have a configuration in which the width of the magnetic tape MT can be kept constant or substantially constant by adjusting tension, applied in the longitudinal direction of the magnetic tape MT during traveling, by the recording/reproducing device (drive).

The magnetic tape MT has an elongated shape and runs in the longitudinal direction during recording and reproducing. The magnetic tape MT is preferably used in a recording/reproducing device provided with a ring head as a recording head. The magnetic tape MT is preferably used in a recording/reproducing device configured to be able to record data with a data track width of 1500 nm or less or 1000 nm or less.

The magnetic tape MT is preferably reproduced by a reproducing head using a TMR element. The signal reproduced by the reproducing head using TMR may be data recorded in the data band DB (see FIG. 4) or a servo pattern (servo signal) recorded in the servo band SB (see FIG. 4).

(Base)

The base 41 is a nonmagnetic supporting body which supports the underlayer 42 and the magnetic layer 43. The base 41 has an elongated film shape. An upper limit value of the average thickness of the base 41 is preferably 4.4 μm or less, more preferably 4.2 μm or less, still more preferably 4.0 μm or less, particularly preferably 3.8 μm or less, and most preferably 3.4 μm or less. When the upper limit value of the average thickness of the base 41 is 4.4 μm or less, a recording capacity which may be recorded in one data cartridge may be increased as compared with that in a general magnetic tape. A lower limit value of the average thickness of the base 41 is preferably 3 μm or larger, and more preferably 3.2 μm or larger. When the lower limit value of the average thickness of the base 41 is 3 μm or larger, reduction in strength of the base 41 may be suppressed.

The average thickness of the base 41 is obtained as follows. First, the magnetic tape MT accommodated in the cartridge 10 is unwound, and the magnetic tape MT is cut out to a length of 250 mm at a position of 30 m to 40 m in the longitudinal direction from a connection portion 21 between the magnetic tape MT and the reader tape LT, thereby preparing samples. In the present specification, the "longitudinal direction" in the case of "longitudinal direction from the connection portion 21 between the magnetic tape MT and the reader tape LT" means a direction from one end on the reader tape LT side toward the other end on the opposite side.

Subsequently, layers other than the base 41 of the sample (that is, the underlayer 42, the magnetic layer 43, and the back layer 44) are removed by a solvent such as methyl ethyl ketone (MEK) or dilute hydrochloric acid. Next, a thickness of the sample (base 41) is measured in five positions using a laser holo gauge (LGH-110C) manufactured by Mitutoyo as a measuring device, and simply averages (arithmetically averages) the measured values to calculate the average thickness of the base 41. Note that the five measurement positions described above are randomly selected from each sample so as to be different positions in the longitudinal direction of the magnetic tape MT.

The base 41 contains, for example, polyester as a main component. The polyester includes, for example, at least one selected from the group consisting of polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), or polyethylene bisphenoxycarboxylate. In a case where the base 41 includes two or more polyesters, the two or more polyesters may be mixed, copolymerized, or stacked. At least one of the terminal or the side chain of the polyester may be modified. The base 41 may contain a resin other than the polyester described later in addition to the polyester.

In the present specification, the "main component" means a component having the highest content ratio among the components constituting the base 41. For example, in a case where the main component of the base 41 is polyester, the content ratio of polyester in the base 41 may be, for example, 50% by mass or more, 60% by mass or more, 70% by mass or more, 80% by mass or more, 90% by mass or more, 95% by mass or more, or 98% by mass or more with respect to the mass of the base 41, or the base 41 may contain only polyester.

The inclusion of polyester in the base 41 is confirmed, for example, as follows. First, similarly to the method for measuring the average thickness of the base 41, a magnetic tape MT is prepared, and cut into a length of 250 mm to prepare a sample, and then layers other than the base 41 of the sample are removed. Next, an IR spectrum of the sample (base 41) is acquired by infrared absorption spectroscopy (IR). Based on this IR spectrum, it can be confirmed that polyester is contained in the base 41.

The base 41 preferably contains polyester. When the base 41 contains polyester, the Young's modulus of the base 41 in the longitudinal direction can be reduced to preferably 2.5 GPa or more and 7.8 GPa or less, and more preferably 3.0 GPa or more and 7.0 GPa or less. Therefore, the width of the magnetic tape MT can be kept constant or substantially constant by adjusting the tension in the longitudinal direction of the magnetic tape MT during traveling by the recording/reproducing device. A method for measuring the Young's modulus of the base 41 in the longitudinal direction will be described later.

The base 41 may contain a resin other than polyester. In this case, the resin other than polyester may be the main component of a constituent material of the base 41. The resin other than the polyester includes, for example, at least one selected from the group consisting of a polyolefin-based resin, a cellulose derivative, a vinyl-based resin, and other polymer resins. In a case where the base 41 includes two or more of these resins, the two or more materials may be mixed, copolymerized, or stacked.

The polyolefin-based resins include, for example, at least one selected from the group consisting of polyethylene (PE) and polypropylene (PP). The cellulose derivatives include, for example, at least one selected from the group consisting of cellulose diacetate, cellulose triacetate, cellulose acetate butyrate (CAB), or cellulose acetate propionate (CAP). The vinyl-based resins include, for example, at least one selected from the group consisting of polyvinyl chloride (PVC) or polyvinylidene chloride (PVDC).

Other polymer resins include, for example, at least one selected from the group consisting of polyether ether ketone (PEEK), polyamide, (PA, nylon), aromatic polyamide (aromatic PA, aramid), polyimide (PI), aromatic polyimide (aromatic PI), polyamide imide (PAI), aromatic polyamide imide (aromatic PAI), polybenzoxazole (PBO, for example, ZYLON (registered trademark)), polyether, polyether ketone (PEK), polyether ester, polyether sulfone (PES), polyether imide (PEI), polysulfone (PSF), polyphenylene sulfide (PPS), polycarbonate (PC), polyarylate (PAR), or polyurethane (PU).

The base 41 may be biaxially stretched in the longitudinal direction and the width direction. The polymer resin contained in the base 41 is preferably oriented in an oblique direction with respect to the width direction of the base 41.

(Magnetic Layer)

The magnetic layer 43 is configured to be able to record a signal by a magnetization pattern. The magnetic layer 43 may be a perpendicular recording type recording layer or may be a longitudinal recording type recording layer. The magnetic layer 43 includes magnetic particles, first particles, and second particles. The magnetic layer 43 may further contain a binder. The magnetic layer 43 may further contain at least one additive of a lubricant, a curing agent, a rust-preventive agent, nonmagnetic reinforcing particles, and the like as necessary.

FIG. 3B is a cross-sectional view illustrating an example of a configuration of a surface (hereinafter, referred to as a "magnetic surface") of the magnetic layer 43. The magnetic layer 43 has a concavoconvex shape on a magnetic surface (surface). The concavoconvex shape includes a first protrusion 51B including first particles 51A and a second protrusion 52B including second particles 52A.

Figure 4:
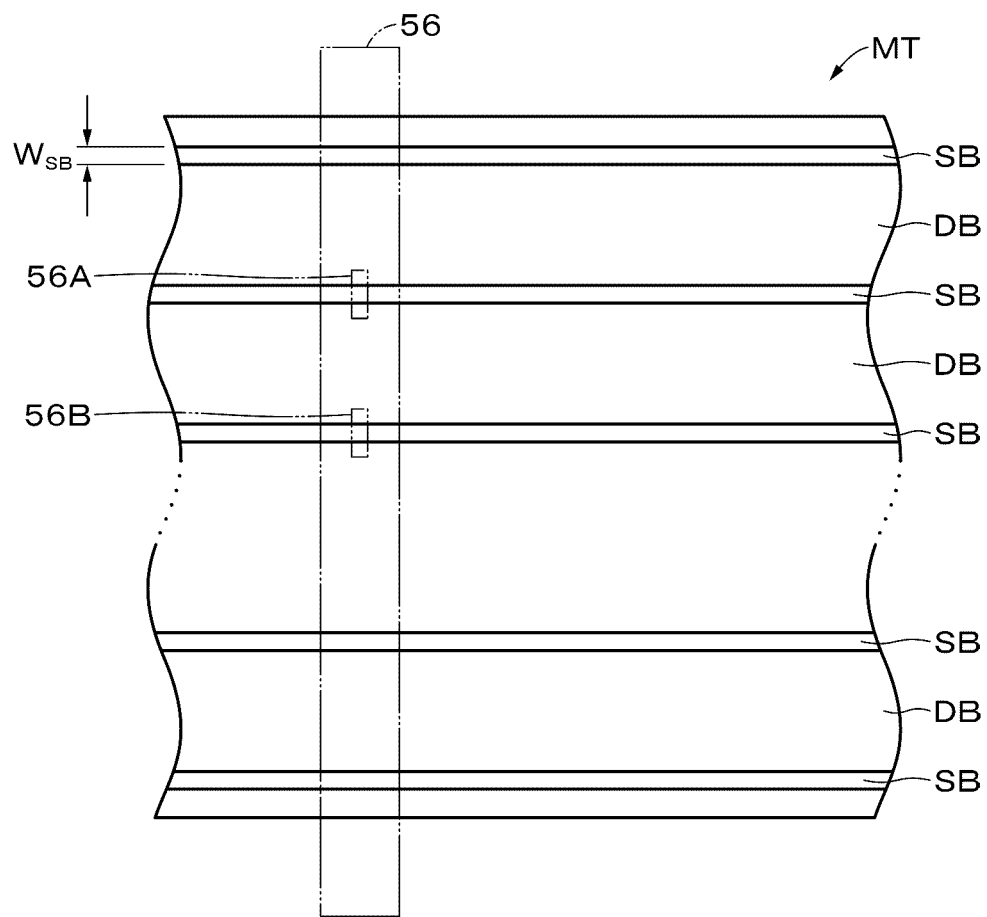
FIG. 4 is a schematic diagram illustrating an example of a layout of data bands and servo bands.

The magnetic layer 43 may include a plurality of the servo bands SB and a plurality of the data bands DB in advance as illustrated in FIG. 4. The plurality of servo bands SB is provided at equal intervals in a width direction of the magnetic tape MT. The data band DB is provided between the adjacent servo bands SB. The servo band SB is for guiding a head unit (magnetic head) 56 (specifically, servo read heads 56A and 56B) at the time of recording or reproducing data. In the servo band SB, a servo pattern (servo signal) for performing tracking control on the head unit 56 is written in advance. User data is recorded in the data band DB.

An upper limit value of a ratio $R_S(=(S_{SB}/S) \times 100)$ of a total area $S_{SB}$ of the plurality of servo bands SB to an area S of the magnetic surface (surface of the magnetic layer 43) is preferably 4.0% or less, more preferably 3.0% or less, and still more preferably 2.0% or less from a viewpoint of securing a high recording capacity. On the other hand, a lower limit value of the ratio $R_S$ of the total area $S_{SB}$ of the plurality of servo bands SB to the area S of the magnetic surface is preferably 0.8% or more from a viewpoint of securing five or more servo bands SB.

The ratio $R_S$ of the total area $S_{SB}$ of the plurality of servo bands SB to the area S of the entire magnetic surface is obtained as follows. The magnetic tape MT is developed using a ferri-colloid developer (Sigmarker Q, produced by Sigma Hi-Chemical), then the developed magnetic tape MT is observed under an optical microscope, to measure the servo band width $W_{SB}$ and the number of the servo bands SB. Next, the ratio $R_S$ is obtained from the following equation.

Ratio $R_S[\%] = (((\text{servo band width } W_{SB}) \times (\text{number of servo bands SB}))/(\text{width of magnetic tape MT})) \times 100$ The number of servo bands SB is, for example, 5+4n (where n is an integer of 0 or more) or more. The number of servo bands SB is preferably 5 or more, and more preferably 9 or more. When the number of servo bands SB is 5 or more, an effect of a dimensional change in the width direction of the magnetic tape MT on the servo signal is suppressed, and a stable recording/reproducing characteristic with smaller off-track can be secured. An upper limit value of the number of servo bands SB is not especially limited, but is, for example, 33 or less.

The number of servo bands SB is obtained similarly to the above method of calculating the ratio $R_S$.

An upper limit value of the servo band width $W_{SB}$ is preferably 95 µm or less, more preferably 60 µm or less, and still more preferably 30 µm or less from a viewpoint of securing the high recording capacity. A lower limit value of the servo band width $W_{SB}$ is preferably 10 µm or more. It is difficult to manufacture a magnetic head capable of reading a servo signal having a servo band width $W_{SB}$ of less than 10 µm.

The width of the servo band width $W_{SB}$ is obtained similarly to the method of calculating the ratio $R_S$.

Figure 5:
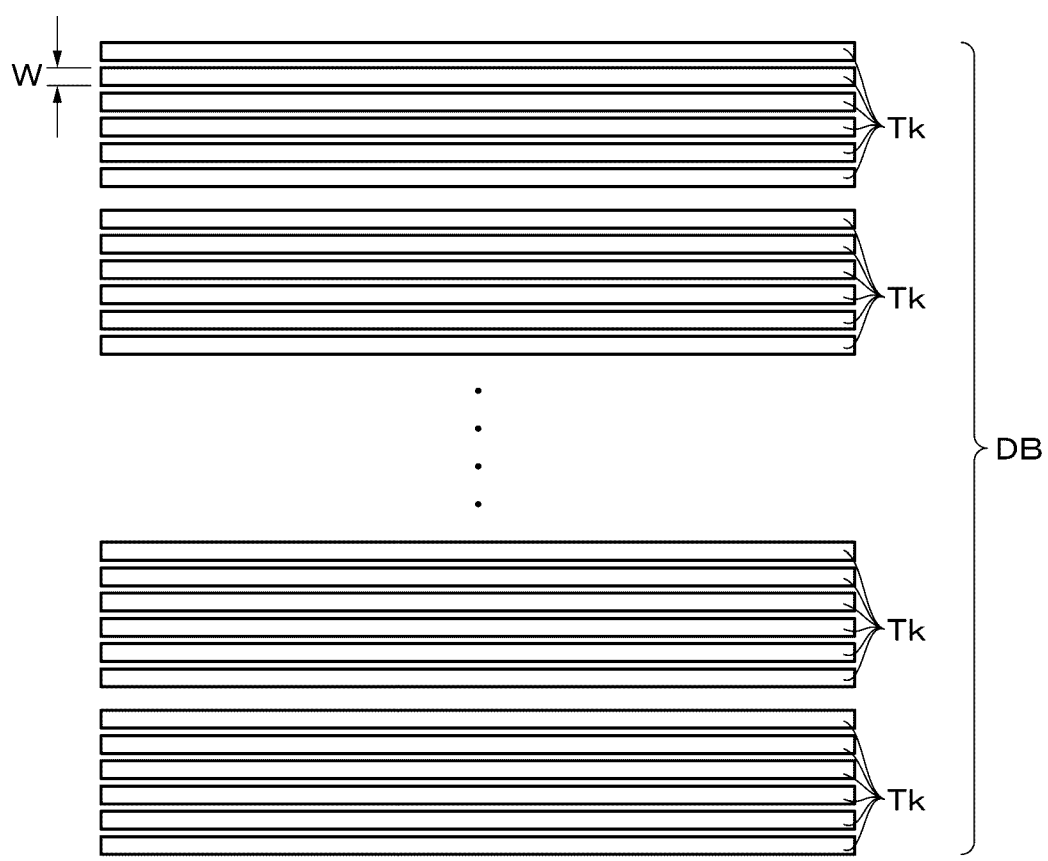
FIG. 5 is an enlarged view illustrating an example of a configuration of a the data band.

The magnetic layer 43 is configured to be able to form a plurality of data tracks Tk in the data band DB, as illustrated in FIG. 5. The upper limit value of the data track width W is preferably 1500 nm or less, more preferably 1000 nm or less, still more preferably 800 nm or less, and particularly preferably 600 nm or less from the viewpoint of improving a track recording density and securing a high recording capacity. A lower limit value of the data track width W is preferably 20 nm or more in consideration of a magnetic particle size.

The magnetic layer 43 is configured to be able to record the data so that a minimum value L of a distance between magnetization reversals is preferably 40 nm or less, more preferably 36 nm or less, and still more preferably 32 nm or less from a viewpoint of securing the high recording capacity. A lower limit value of the minimum value L of the distance between magnetization reversals is preferably 20 nm or more in consideration of the magnetic particle size.

The data track width W is determined as follows. First, the cartridge 10 in which data is recorded on the entire surface of the magnetic tape MT is prepared, the magnetic tape MT is unwound from the cartridge 10, and the magnetic tape MT is cut out to a length of 250 mm at a position of 30 m to 40 m in the longitudinal direction from a connection portion 21 between the magnetic tape MT and the reader tape LT, thereby preparing samples.

Subsequently, a data recording pattern of a data band DB portion of the magnetic layer 43 of the sample is observed using a magnetic force microscope (MFM) to obtain an MFM image. As the MFM, Dimension 3100 manufactured by Digital Instruments, Inc. and its analysis software are used. A measurement region for the MFM image is 10 µm×10 µm, and the measurement region of 10 µm×10 µm is divided into 512×512 (=262, 144) measurement points. Measurement by MFM is conducted for three 10 µm×10 µm measurement regions at different locations, and, thus, three MFM images are obtained. From the three MFM images thus obtained, track width is measured at 10 locations, using the analysis software attached to Dimension 3100, and an average (simple mean) is obtained. The average value is the data track width W. Note that measurement conditions for the MFM described above are scanning speed: 1 Hz, chip used: MFMR-20, lift height: 20 nm, and correction: Flatten order 3.

The minimum value L of the distance between magnetization reversals is obtained as follows. First, the cartridge 10 in which data is recorded on the entire surface of the magnetic tape MT is prepared, the magnetic tape MT is unwound from the cartridge 10, and the magnetic tape MT is cut out to a length of 250 mm at a position of 30 m in the longitudinal direction from the connection portion 21 between the magnetic tape MT and the reader tape LT, thereby preparing samples. Subsequently, a data recording pattern of a data band DB portion of the magnetic layer 43 of the sample is observed using a magnetic force microscope (MFM) to obtain an MFM image. As the MFM, Dimension 3100 manufactured by Digital Instruments, Inc. and its analysis software are used. A measurement region for the MEM image is 2 µm×2 µm, and the measurement region of 2 µm×2 µm is divided into 512×512 (=262, 144) measurement points. Measurement by MFM is conducted for three 2 µm×2 µm measurement regions at different locations, and, thus, three MFM images are obtained. From two-dimensional rugged charts of record patterns of the MFM images thus obtained, the distance between bits is measured at 50 locations. The measurement of the distance between bits is conducted using the analysis software attached to Dimension 3100. A value approximately equal to the greatest common divisor of the measured 50 distances between bits is made to be the minimum value L of the distance between magnetization reversals. Note that measurement conditions are scanning speed: 1 Hz, chip used: MFMR-20, lift height: 20 nm, and correction: Flatten order 3.

The servo pattern is a magnetization region, and is formed by magnetizing a specific region of the magnetic layer 43 in a specific direction by a servo write head at the time of manufacturing the magnetic tape. In the servo band SB, a region where no servo pattern is formed (hereinafter, referred to as a "non-pattern region") may be a magnetized region where the magnetic layer 43 is magnetized or a non-magnetized region where the magnetic layer 43 is not magnetized. In a case where the non-pattern region is the magnetization region, the servo pattern-formed region and the non-pattern region are magnetized in different directions (for example, opposite directions).

Figure 6:
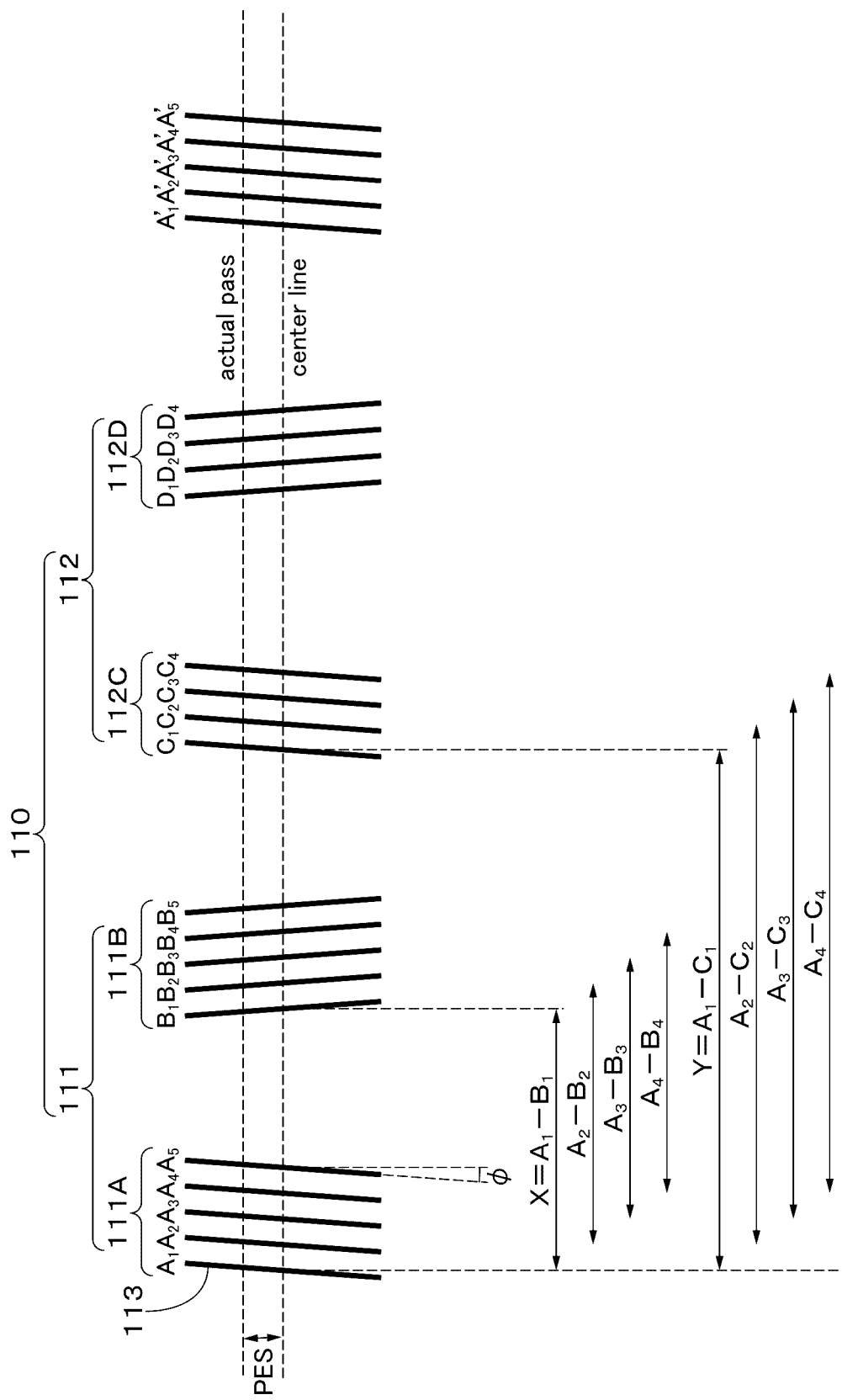
FIG. 6 is an enlarged view illustrating an example of a configuration of a the servo band.

In the LTO standard, as illustrated in FIG. 6, a servo pattern including a plurality of servo stripes (linear magnetization regions) 113 inclined with respect to the width direction of the magnetic tape MT is formed on the servo band SB.

The servo band SB includes a plurality of servo frames 110. Each of the servo frames 110 includes eighteen servo stripes 113. Specifically, each of the servo frames 110 includes a servo subframe 1 (111) and a servo subframe 2 (112).

The servo subframe 1 (111) includes an A burst 111A and a B burst 111B. The B burst 111B is disposed adjacent to the A burst 111A. The A burst 111A includes the five servo stripes 113 inclined at a predetermined angle φ with respect to the width direction of the magnetic tape MT and formed at specified intervals. In FIG. 6, these five servo stripes 113 are denoted by reference signs $A_1$, $A_2$, $A_3$, $A_4$, and $A_5$ from an end of tape (EOT) to a beginning of tape (BOT) of the magnetic tape MT. Similarly to the A burst 111A, the B burst 111B includes the five servo pulses 63 inclined at a predetermined angle φ with respect to the width direction of the magnetic tape MT and formed at specified intervals. In FIG. 6, these five servo stripes 113 are denoted by reference signs $B_1$, $B_2$, $B_3$, $B_4$, and $B_5$ from the EOT to the BOT of the magnetic tape MT. The servo stripe 113 of the B burst 111B is inclined in a direction opposite to the servo stripe 113 of the A burst 111A. That is, the servo stripe 113 of the A burst 111A and the servo stripe 113 of the B burst 111B are arranged in a chevron shape.

The servo subframe 2 (112) includes a C burst 112C and a D burst 112D. The D burst 112D is disposed adjacent to the C burst 112C. The C burst 112C includes the four servo stripes 113 inclined at a predetermined angle φ with respect to the tape width direction and formed at specified intervals. In FIG. 6, these four servo stripes 113 are denoted by reference signs $C_1$, $C_2$, $C_3$, and $C_4$ from the EOT to the BOT of the magnetic tape MT. Similarly to the C burst 112C, the D burst 112D includes the four servo pulses 63 inclined at a predetermined angle φ with respect to the tape width direction and formed at specified intervals. In FIG. 6, these four servo stripes 113 are denoted by reference signs $D_1$, $D_2$, $D_3$, and $D_4$ from the EOT to the BOT of the magnetic tape MT. The servo stripe 113 of the D burst 112D is inclined in a direction opposite to the servo stripe 113 of the C burst 112C. That is, the servo stripe 113 of the C burst 112C and the servo stripe 113 of the D burst 112D are arranged in a chevron shape.

The predetermined angle φ described above of the servo stripe 113 in the A burst 111A, the B burst 111B, the C burst 112C, and the D burst 112D can be, for example, 11° or more and 40° or less, preferably 11° or more and 36° or less, more preferably 11° or more and 25° or less, and still more preferably 17° or more and 25° or less.

By reading the servo band SB with the head unit 56, information for acquiring a tape speed and a position of the head unit 56 in a vertical direction can be obtained. The tape speed is calculated from the time between four timing signals (A1-C1, A2-C2, A3-C3, A4-C4). The head position is calculated from the time between the four timing signals described above and the time between another four timing signals (A1-B1, A2-B2, A3-B3, A4-B4). The servo pattern may have a shape including two parallel lines.

As illustrated in FIG. 6, the servo patterns (that is, the plurality of servo stripes 113) are preferably linearly arranged in the longitudinal direction of the magnetic tape MT. That is, the servo band SB preferably has a linear shape in the longitudinal direction of the magnetic tape MT.

An upper limit value of an average thickness $t_1$ of the magnetic layer 43 is preferably 80 nm or less, more preferably 70 nm or less, and still more preferably 50 nm or less. When the upper limit value of the average thickness $t_1$ of the magnetic layer 43 is 80 nm or less, an influence of a demagnetizing field can be reduced in a case where a ring type head is used as a recording head, and therefore more excellent electromagnetic conversion characteristics can be obtained.

A lower limit value of the average thickness $t_1$ of the magnetic layer 43 is preferably 35 nm or larger. When the lower limit value of the average thickness $t_1$ of the magnetic layer 43 is 35 nm or more, an output may be secured in a case where an MR head is used as the recording head, and therefore more excellent electromagnetic conversion characteristics can be obtained.

The average thickness $t_1$ of the magnetic layer 43 is determined as follows. First, the magnetic tape MT accommodated in the cartridge 10 is unwound, and the magnetic tape MT is cut out into a length of 250 mm from each of a position of 10 m to 20 m, a position of 30 m to 40 m, and a position of 50 m to 60 m in the longitudinal direction from the connection portion 21 between the magnetic tape MT and the reader tape LT to prepare three samples. Subsequently, each sample is processed by a FIB method or the like to perform thinning. In a case where the FIB method is used, a carbon layer and a tungsten layer are formed as protective films as a pre-treatment for observing a TEM image of a cross section described later. The carbon layer is formed on a surface on the magnetic layer 43 side and a surface on the back layer 44 side of the magnetic tape MT by a vapor deposition method, and then the tungsten layer is further formed on the surface of the magnetic layer 43 by a vapor deposition method or a sputtering method. The thinning is performed in the longitudinal direction of the magnetic tape MT. That is, a cross section parallel to both the longitudinal direction and the thickness direction of the magnetic tape MT is formed by the thinning.

The obtained cross section described above of each thinned sample is observed with a transmission electron microscope (TEM) under the following conditions to obtain a TEM image of each thinned sample. Note that the magnification and the acceleration voltage may be appropriately adjusted according to the type of the apparatus.

Device: TEM (H9000NAR manufactured by Hitachi, Ltd.)
Acceleration voltage: 300 kV
Magnification: 100,000 times Next, the thickness of the magnetic layer 43 is measured at ten positions of each resulting thinned sample using the obtained TEM image of each thinned sample. Note that the ten measurement positions of each thinned sample are randomly selected from the sample so as to be different positions in the longitudinal direction of the magnetic tape MT. An average value obtained by simply averaging (arithmetically averaging) the obtained measured values (the thicknesses of the magnetic layers 43 at thirty points in total) of each thinned sample is defined as an average thickness $t_1$ [nm] of the magnetic layer 43.

(Magnetic Particles)

The magnetic particles are, for example, particles containing hexagonal ferrite (hereinafter, referred to as "hexagonal ferrite particles"), particles containing epsilon-type iron oxide (ε-iron oxide) (hereinafter, referred to as "ε-iron oxide particles"), or particles containing Co-containing spinel ferrite (hereinafter, referred to as "cobalt ferrite particles"). The magnetic particles are preferably crystal oriented preferentially in the vertical direction of the magnetic tape MT. In the present specification, the vertical direction (thickness direction) of the magnetic tape MT means the thickness direction of the magnetic tape MT in a planar state.

(Hexagonal Ferrite Particles)

The hexagonal ferrite particles have, for example, a plate-like shape such as a hexagonal plate-like shape or a columnar shape such as a hexagonal columnar shape (however, the thickness or height is smaller than the major axis of the plate surface or the bottom surface). In the present specification, the hexagonal plate-like shape includes a substantially hexagonal plate-like shape. The hexagonal ferrite preferably includes at least one of Ba, Sr, Pb, or Ca, and more preferably at least one of Ba or Sr. Specifically, the hexagonal ferrite may be, for example, barium ferrite or strontium ferrite. Barium ferrite may further include at least one of Sr, Pb, or Ca in addition to Ba. In addition to Sr, strontium ferrite may further include at least one of Ba, Pb, or Ca.

More specifically, hexagonal ferrite has an average composition represented by general formula $MFe_{12}O_{19}$. However, M is, for example, at least one metal selected from the group consisting of Ba, Sr, Pb, and Ca, preferably at least one metal selected from the group consisting of Ba and Sr. M may be a combination of Ba and at least one metal selected from the group consisting of Sr, Pb, and Ca.

Furthermore, M may be a combination of Sr and at least one metal selected from the group consisting of Ba, Pb, and Ca. In the general formula described above, a part of Fe may be substituted by another metal element.

In a case where the magnetic particles are hexagonal ferrite particles, the average particle size of the magnetic particles is preferably 13 nm or more and 22 nm or less, more preferably 13 nm or more and 19 nm or less, still more preferably 13 nm or more and 18 nm or less, particularly preferably 14 nm or more and 17 nm or less, and most preferably 14 nm or more and 16 nm or less. When the average particle size of the magnetic particles is 22 nm or less, more excellent electromagnetic conversion characteristic (for example, SNR) may be obtained in the magnetic tape MT of high recording density. On the other hand, when the average particle size of the magnetic particles is 13 nm or more, the dispersibility of the magnetic particles is further improved, and a more excellent electromagnetic conversion characteristic (for example, SNR) can be obtained.

In a case where the magnetic particles are hexagonal ferrite particles, an average aspect ratio of the magnetic particles is preferably 1.0 or more and 3.0 or less, more preferably 1.5 or more and 2.8 or less, and still more preferably 1.8 or more and 2.7 or less. When the average aspect ratio of the magnetic particles is within the range of 1.0 or more and 3.0 or less, aggregation of the magnetic particles can be suppressed. Furthermore, when the magnetic particles are vertically oriented in a process of forming the magnetic layer 43, resistance applied to the magnetic particles can be suppressed. Therefore, vertical orientation of the magnetic particles can be improved.

In a case where the magnetic particles are hexagonal ferrite particles, the average particle size and the average aspect ratio of the magnetic particles are determined as follows. First, the magnetic tape MT accommodated in the cartridge 10 is unwound, and the magnetic tape MT is cut out at a position of 30 m to 40 m in the longitudinal direction from the connection portion 21 between the magnetic tape MT and the reader tape LT. Subsequently, the magnetic tape MT to be measured is processed into a thin piece by an FIB method or the like. In a case where the FIB method is used, a carbon layer and a tungsten layer are formed as protective films as a pre-treatment for observing a TEM image of a cross section described later. The carbon layer is formed on a surface on the magnetic layer 43 side and a surface on the back layer 44 side of the magnetic tape MT by a vapor deposition method, and then the tungsten layer is further formed on the surface of the magnetic layer 43 by a vapor deposition method or a sputtering method. The thinning is performed in the length direction (longitudinal direction) of the magnetic tape MT. That is, a cross section parallel to both the longitudinal direction and the thickness direction of the magnetic tape MT is formed by the thinning.

Using a transmission electron microscope (H-9500 manufactured by Hitachi High-Technologies Corporation), the cross section described above of the obtained thin piece sample is observed at an acceleration voltage of 200 kV and a total magnification of 500,000 times so that the entire magnetic layer 43 is included in the thickness direction of the magnetic layer 43, and a TEM image is captured. As the TEM image, the number of sheets capable of extracting fifty particles capable of measuring a plate diameter DB and a plate thickness DA (see FIG. 7) shown below is prepared.

Figure 7:
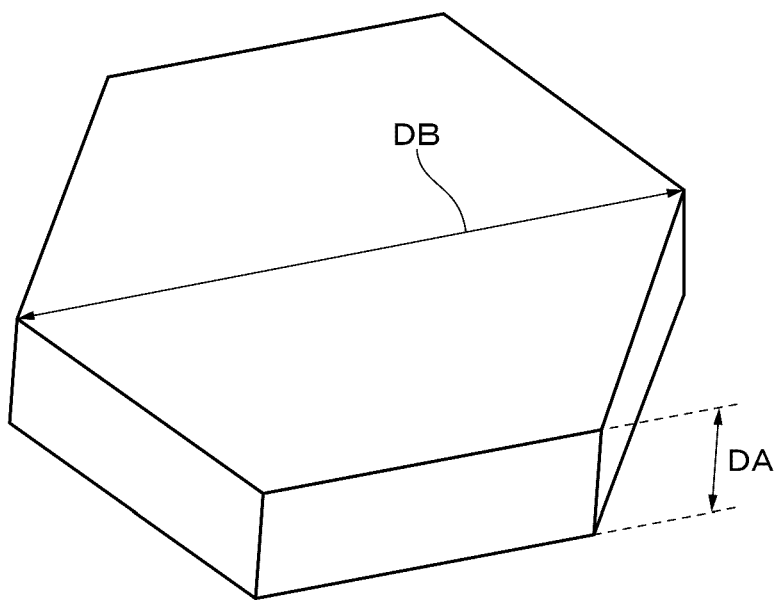
FIG. 7 is a perspective view illustrating an example of a shape of a particle.

In the present specification, as for the size of the hexagonal ferrite particles (hereinafter, referred to as "particle size"), in a case where the shape of the particles observed in the TEM image described above is a plate shape or a columnar shape (however, the thickness or height is smaller than the major axis of the plate surface or the bottom surface) as illustrated in FIG. 7, the major axis of the plate surface or the bottom surface is taken as the value of the plate diameter DB. The thickness or height of the particles observed in the TEM image described above is defined as the value of the plate thickness DA. In a case where the plate surface or the bottom surface of the particle observed in the TEM image is hexagonal, the major axis means the longest diagonal distance. In a case where the thickness or height of the particle is not constant in one particle, the maximum thickness or height of the particle is defined as the plate thickness DA.

Next, fifty particles extracted from the captured TEM image are selected based on the following criteria. A particle whose part of the particle protrudes outside the field of view of the TEM image is not measured, and a particle whose outline is clear and which exists in isolation is measured. In a case where there is an overlap between the particles, although each particle in which the boundary between the particles is clear and the shape of the entire particle can be determined is measured as a single particle, a particle in which the boundary is not clear and the entire shape of the particle cannot be determined is not measured as a particle whose shape cannot be determined.

Figure 8:
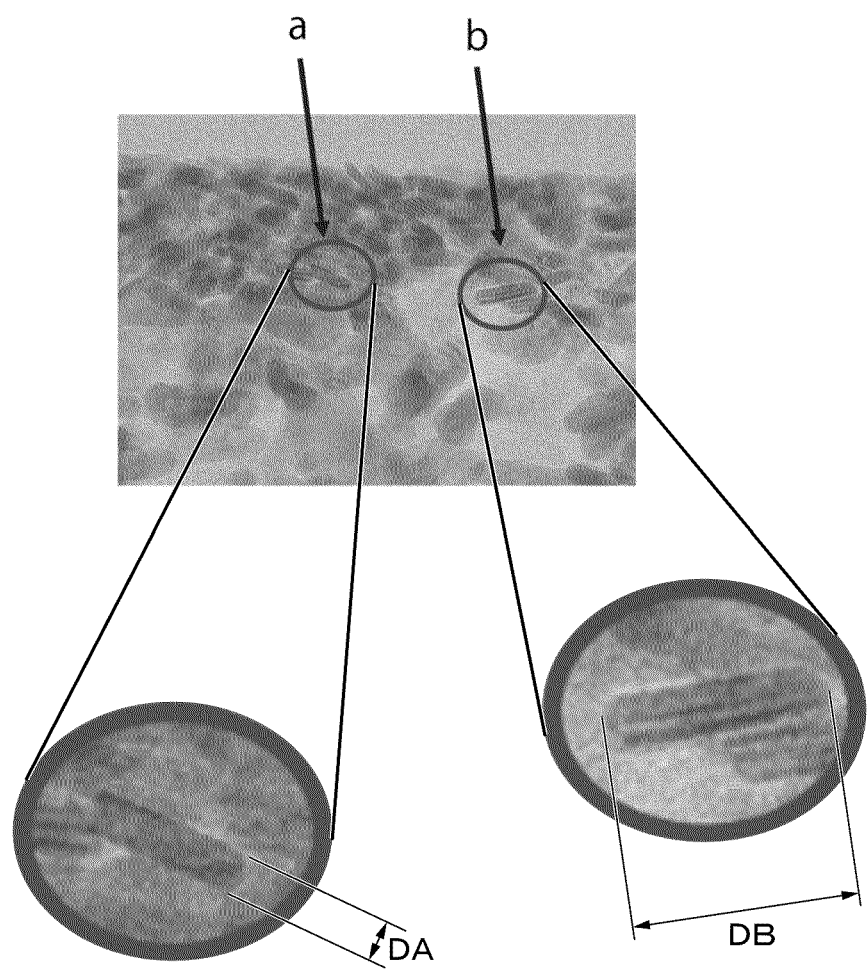
FIG. 8 is a view illustrating a first example of a cross-sectional TEM image of a magnetic layer.
Figure 9:
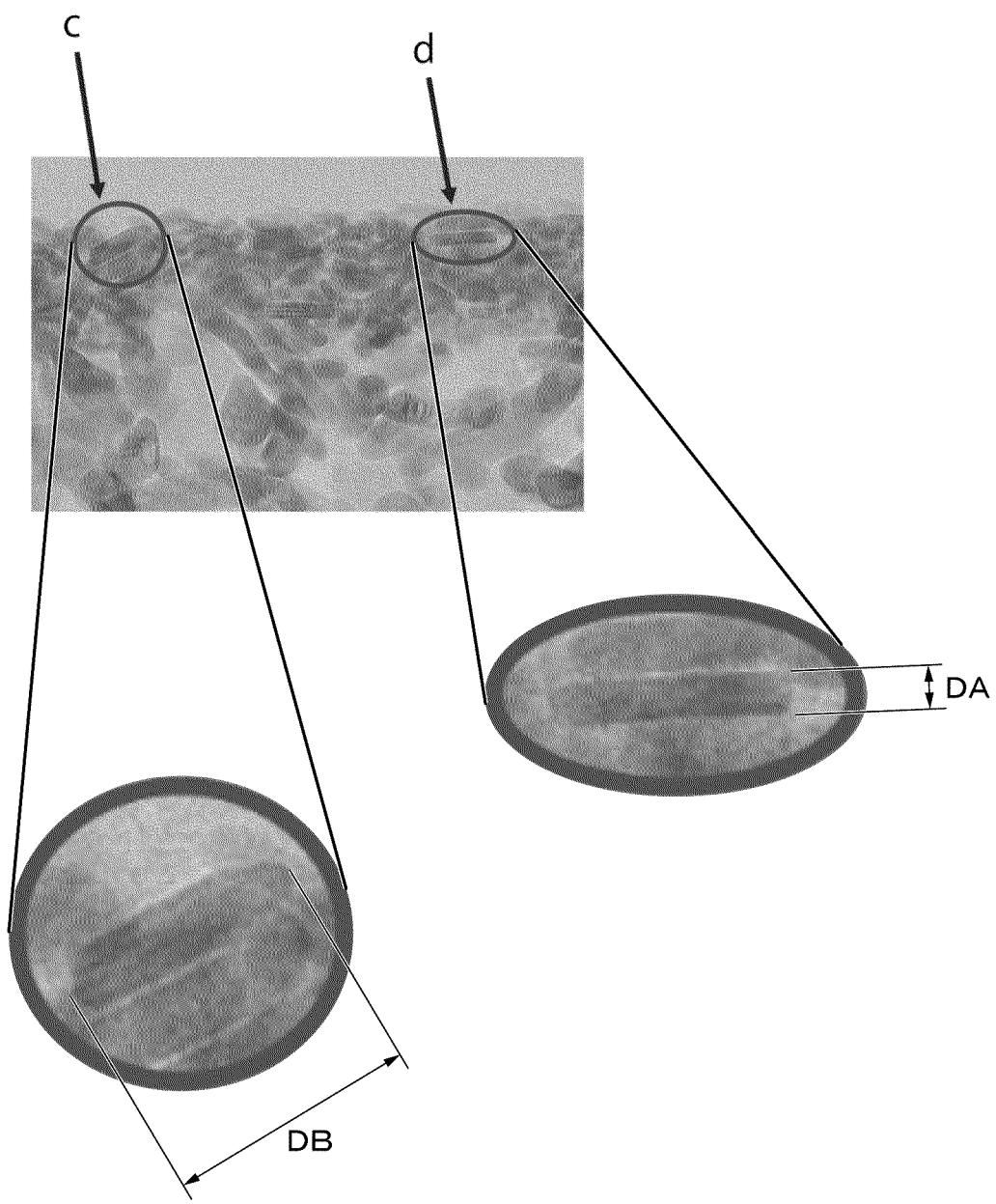
FIG. 9 is a view illustrating a second example of the cross-sectional TEM image of the magnetic layer.

FIGS. 8 and 9 illustrate a first example and a second example of the TEM image, respectively. In FIGS. 8 and 9, for example, the particles indicated by arrows a and d are selected because the plate thickness (thickness or height of the particles) DA of the particles can be clearly confirmed. The plate thickness DA of each of the selected fifty particles is measured. The plate thicknesses DA thus obtained are simply averaged (arithmetically averaged) to obtain an average plate thickness $DA_{ave}$. The average plate thickness $DA_{ave}$ is an average particle plate thickness. Subsequently, the plate diameter DB of each magnetic particle is measured. In order to measure the plate diameter DB of the particle, fifty particles for which the plate diameter DB of the particle can be clearly confirmed are selected from the captured TEM image. For example, in FIGS. 8 and 9, for example, the particles indicated by arrows b and c are selected because the plate diameter DB of the particles can be clearly confirmed. The plate diameter DB of each of the selected fifty particles is measured. The plate diameters DB thus obtained are simply averaged (arithmetically averaged) to obtain an average plate diameter $DB_{ave}$. The average plate diameter $DB_{ave}$ is an average particle size. Then, an average aspect ratio ($DB_{ave}/DA_{ave}$) of the particle is obtained from the average plate thickness $DA_{ave}$ and the average plate diameter $DB_{ave}$.

In a case where the magnetic particles are hexagonal ferrite particles, the average particle volume of the magnetic particles is preferably 500 $nm^3$ or more and 2500 $nm^3$ or less, more preferably 500 $nm^3$ or more and 1600 $nm^3$ or less, still more preferably 500 $nm^3$ or more and 1500 $nm^3$ or less, particularly preferably 600 $nm^3$ or more and 1200 $nm^3$ or less, and most preferably 600 $nm^3$ or more and 1000 $nm^3$ or less. When the average particle volume of the magnetic particle is 2500 $nm^3$ or less, an effect similar to that in a case where the average particle size of the magnetic particle is 22 nm or less may be obtained. On the other hand, when the average particle volume of the magnetic particles is 500 $nm^3$ or more, the effect similar to that in a case where the average particle size of the magnetic particles is 13 nm or more is obtained.

The average particle volume of the magnetic particles is obtained as follows. First, as described above regarding the above-described method of calculating the average particle size of the magnetic particle, the average plate thickness $DA_{ave}$ and the average plate diameter $DB_{ave}$ are obtained. Next, an average volume V of the magnetic particles is determined by the following equation.

$$V = \frac{3\sqrt{3}}{8} \times DA_{ave} \times DB_{ave} \times DB_{ave} \quad \text{[Equation 1]}$$

(ε-Iron Oxide Particles) The ε-iron oxide particles are hard magnetic particles that can obtain high coercive force even when the iron oxide particles are fine particles. The ε-iron oxide particles have a spherical shape or have a cubic shape. In the present specification, the spherical shape includes a substantially spherical shape. Furthermore, the cubic shape includes a substantially cubic shape. Since the ε-iron oxide particles have the shape as described above, in a case where ε-iron oxide particles are used as the magnetic particles, a contact area between the particles in the thickness direction of the magnetic tape MT can be reduced and aggregation of the particles can be suppressed as compared with a case where barium ferrite particles having a hexagonal plate shape are used as magnetic particles. Therefore, dispersibility of the magnetic particles is increased, and a more excellent electromagnetic conversion characteristic (for example, a signal-to-noise ratio (SNR)) can thus be obtained.

The ε-iron oxide particle has a core-shell structure. Specifically, the ε-iron oxide particle is provided with a core and a shell having a two-layer structure provided around the core. The shell having the two-layer structure is provided with a first shell provided on the core and a second shell provided on the first shell.

The core includes ε-iron oxide. ε-iron oxide included in the core preferably includes a ε-$Fe_2O_3$ crystal as a main phase, and more preferably includes a single-phase ε-$Fe_2O_3$.

The first shell covers at least a part of a periphery of the core. Specifically, the first shell may partially cover the periphery of the core or may cover an entire periphery of the core. From a viewpoint of making exchange coupling between the core and the first shell sufficient and improve a magnetic characteristic, the entire surface of the core is preferably covered.

The first shell is a so-called soft magnetic layer, and includes, for example, a soft magnetic material such as α-Fe, a Ni—Fe alloy, or a Fe—Si—$A_1$ alloy. α-Fe may also be obtained by reducing ε-iron oxide included in the core.

The second shell is an oxide coating as an oxidation resistant layer. The second shell includes α-iron oxide, aluminum oxide, or silicon oxide. α-iron oxide includes at least one iron oxide selected from the group consisting of $Fe_3O_4$, $Fe_2O_3$, and FeO, for example. In a case where the first shell includes α-Fe (soft magnetic material), α-iron oxide may be obtained by oxidizing α-Fe included in the first shell.

Since the ε-iron oxide particle has the first shell as described above, it is possible to adjust the coercive force Hc as whole ε-iron oxide particles (core-shell particles) to the coercive force Hc suitable for recording while keeping a large value of the coercive force Hc of the core alone for securing thermal stability. Furthermore, since the ε-iron oxide particle has the second shell as described above, it is possible to suppress a decrease in characteristic of the ε-iron oxide particle due to exposure of the ε-iron oxide particle to the air and occurrence of rust and the like on a particle surface at a manufacturing step of the magnetic tape MT and before the step. Therefore, deterioration in characteristic of the magnetic tape MT may be suppressed.

The ε-iron oxide particle may have a shell having a single-layer structure. In this case, the shell has the configuration similar to that of the first shell. However, from a viewpoint of suppressing deterioration in characteristic of the ε-iron oxide particle, it is preferable that the ε-iron oxide particle has the shell having the two-layer structure as described above.

The ε-iron oxide particle may contain an additive instead of the core-shell structure described above, or may have the core-shell structure and may contain an additive as well. In this case, a part of Fe of the ε-iron oxide particle is substituted with the additive. The coercive force Hc of all the ε-iron oxide particles may be adjusted to the coercive force Hc suitable for recording also when the ε-iron oxide particle includes the additive, so that recordability may be improved. The additive is a metal element other than iron, preferably a trivalent metal element, more preferably at least one of Al, Ga, or In, and still more preferably at least one of Al or Ga.

Specifically, the ε-iron oxide containing an additive is an ε-$Fe_{2-x}M_xO_3$ crystal (where M is a metal element other than iron, preferably a trivalent metal element, more preferably at least one of Al, Ga, or In, and still more preferably at least one of Al or Ga. x is, for example, 0<x<1).

In a case where the magnetic particles are ε-iron oxide particles, an average particle size of the magnetic particles is preferably 10 nm or more and 20 nm or less, more preferably 10 nm or more and 18 nm or less, still more preferably 10 nm or more and 16 nm or less, particularly preferably 10 nm or more and 15 nm or less, and most preferably 10 nm or more and 14 nm or less. In the magnetic tape MT, a region having a size of ½ of a recording wavelength is an actual magnetization region. Therefore, a more excellent electromagnetic conversion characteristic (for example, SNR) can be obtained by setting the average particle size of the magnetic particles to half or smaller of the shortest recording wavelength. Accordingly, when the average particle size of the magnetic particles is 20 nm or less, in the magnetic tape MT having a high recording density (for example, the magnetic tape MT configured to be able to record a signal at the shortest recording wavelength of 40 nm or less), a more excellent electromagnetic conversion characteristic (for example, SNR) can be obtained. On the other hand, when the average particle size of the magnetic particles is 10 nm or more, the dispersibility of the magnetic particles is further improved, and a more excellent electromagnetic conversion characteristic (for example, SNR) can be obtained.

In a case where the magnetic particles are ε-iron oxide particles, an average aspect ratio of the magnetic particles is preferably 1.0 or more and 3.0 or less, more preferably 1.0 or more and 2.5 or less, still more preferably 1.0 or more and 2.1 or less, and particularly preferably 1.0 or more and 1.8 or less. When the average aspect ratio of the magnetic particles is within the range of 1.0 or more and 3.0 or less, aggregation of the magnetic particles can be suppressed. Furthermore, when the magnetic particles are vertically oriented in a process of forming the magnetic layer 43, resistance applied to the magnetic particles can be suppressed. Therefore, vertical orientation of the magnetic particles can be improved.

In a case where the magnetic particles are ε-iron oxide particles, an average particle size and an average aspect ratio of the magnetic particles are determined as follows. First, the magnetic tape MT accommodated in the cartridge 10 is unwound, and the magnetic tape MT is cut out at a position of 30 m to 40 m in the longitudinal direction from the connection portion 21 between the magnetic tape MT and the reader tape LT. Subsequently, the magnetic tape MT to be measured is processed by a focused ion beam (FIB) method or the like to be thinned. In a case where the FIB method is used, a carbon layer and a tungsten layer are formed as protective layers as a pre-treatment for observing a TEM image of a cross section described later. The carbon layer is formed on a surface on the magnetic layer 43 side and a surface on the back layer 44 side of the magnetic tape MT by a vapor deposition method, and then the tungsten layer is further formed on the surface of the magnetic layer 43 by a vapor deposition method or a sputtering method. The thinning is performed in the length direction (longitudinal direction) of the magnetic tape MT. That is, a cross section parallel to both the longitudinal direction and the thickness direction of the magnetic tape MT is formed by the thinning.

Using a transmission electron microscope (H-9500 manufactured by Hitachi High-Technologies Corporation), the cross section described above of the obtained thin piece sample is observed at an acceleration voltage of 200 kV and a total magnification of 500,000 times so that the entire magnetic layer 43 is included in the thickness direction of the magnetic layer 43, and a TEM image is captured. Next, 50 particles whose shapes can be clearly confirmed are selected from the captured TEM image, and a long axis length DL and a short axis length DS of each particle are measured. Here, the long axis length DL means the largest one of the distances between two parallel lines drawn from all angles so as to be in contact with a contour of each particle (so-called maximum Feret's diameter). On the other hand, the short axis length DS means the largest one of the lengths of the particles in a direction orthogonal to a long axis (DL) of the particle. Subsequently, the measured long axis lengths DLs of the 50 particles are simply averaged (arithmetically averaged) to determine an average long axis length $DL_{ave}$. The average long axis length $DL_{ave}$ obtained as described above is defined as the average particle size of the magnetic particles. Furthermore, the measured short axis lengths DSs of the 50 particles are simply averaged (arithmetically averaged) to determine an average short axis length $DS_{ave}$. Then, an average aspect ratio ($DL_{ave}/DS_{ave}$) of the particles is determined from the average long axis length $DL_{ave}$ and the average short axis length $DS_{ave}$.

In a case where the magnetic particles are ε-iron oxide particles, an average particle volume of the magnetic particles is preferably 500 $nm^3$ or more and 4,000 $nm^3$ or less, more preferably 500 $nm^3$ or more and 3,000 $nm^3$ or less, still more preferably 500 $nm^3$ or more and 2,000 $nm^3$ or less, particularly preferably 600 $nm^3$ or more and 1,600 $nm^3$ or less, and most preferably 600 $nm^3$ or more and 1, 300 $nm^3$ or less. In general, since a noise of the magnetic tape MT is inversely proportional to a square root of the number of particles (that is, proportional to the square root of the particle volume), a more excellent electromagnetic conversion characteristic (for example, SNR) can be obtained by reducing the particle volume. Therefore, when the average particle volume of the magnetic particles is 4,000 $nm^3$ or less, similar to a case where the average particle size of the magnetic particles is 20 nm or less, a more excellent electromagnetic conversion characteristic (for example, SNR) can be obtained. On the other hand, when the average particle volume of the magnetic particles is 500 $nm^3$ or more, the effect similar to that in a case where the average particle size of the magnetic particles is 10 nm or more is obtained.

In a case where the ε-iron oxide particle has a spherical shape, the average particle volume of the magnetic particles is determined as follows. First, the average long axis length $DL_{ave}$ is determined in a manner similar to the method of calculating the average particle size of the magnetic particles described above. Next, an average volume V of the magnetic particles is determined by the following equation.

$$V = (\Pi/6) \times DL_{ave}^3$$

In a case where the ε-iron oxide particle has a cubic shape, the average volume of the magnetic particles is determined as follows. First, the magnetic tape MT accommodated in the cartridge 10 is unwound, and the magnetic tape MT is cut out at a position of 30 m to 40 m in the longitudinal direction from the connection portion 21 between the magnetic tape MT and the reader tape LT. Subsequently, the cut out magnetic tape MT is processed by a focused ion beam (FIB) method or the like to be thinned. In a case where the FIB method is used, a carbon film and a tungsten thin film are formed as protective films as a pre-treatment for observing a TEM image of a cross section described later. The carbon film is formed on a surface on the magnetic layer 43 side and a surface on the back layer 44 side of the magnetic tape MT by a vapor deposition method, and then the tungsten thin film is further formed on the surface on the magnetic layer 43 side by a vapor deposition method or a sputtering method. The thinning is performed in the length direction (longitudinal direction) of the magnetic tape MT. That is, a cross section parallel to both the longitudinal direction and the thickness direction of the magnetic tape MT is formed by the thinning.

Using a transmission electron microscope (H-9500 manufactured by Hitachi High-Technologies Corporation), the obtained thin piece sample is observed at an acceleration voltage of 200 kV and a total magnification of 500,000 times so that the entire magnetic layer 43 is included in the thickness direction of the magnetic layer 43, and a TEM image is obtained. Note that the magnification and the acceleration voltage may be appropriately adjusted according to the type of the apparatus. Next, 50 particles whose shapes can be clearly confirmed are selected from the captured TEM image, and a side length DC of each particle is measured. Subsequently, the measured side lengths DCs of the 50 particles are simply averaged (arithmetically averaged) to determine an average side length $DC_{ave}$. Next, an average volume $V_{ave}$ of the magnetic particles (particle volume) is determined from the following equation using the average side length $DC_{ave}$.

$$V_{ave} = DC_{ave}^3$$

(Cobalt Ferrite Particles)

The cobalt ferrite particle preferably has uniaxial crystal anisotropy. Since the cobalt ferrite particles have the uniaxial crystal anisotropy, the magnetic particles can be preferentially crystal-oriented in the vertical direction of the magnetic tape MT. The cobalt ferrite particle has, for example, a cubic shape. In the present specification, the cubic shape includes a substantially cubic shape. Co-containing spinel ferrite may further include at least one of Ni, Mn, $A_l$, Cu, or Zn in addition to Co.

Co-containing spinel ferrite has, for example, an average composition represented by following formula:

(where, in the formula, M is, for example, at least one metal of Ni, Mn, $A_1$, Cu, or Zn, x is a value within a range of $0.4 \leq x \leq 1.0$, y is a value within a range of $0 \leq y \leq 0.3$, x and y satisfying a relationship of $(x+y) \leq 1.0$, and z is a value within a range of $3 \leq z \leq 4$. A part of Fe may be substituted with another metal element.)

In a case where the magnetic particles are cobalt ferrite particles, the average particle size of the magnetic particles is preferably 8 nm or more and 16 nm or less, more preferably 8 nm or more and 13 nm or less, and still more preferably 8 nm or more and 10 nm or less. When the average particle size of the magnetic particles is 16 nm or less, more excellent electromagnetic conversion characteristic (for example, SNR) may be obtained in the magnetic tape MT of high recording density. On the other hand, when the average particle size of the magnetic particles is 8 nm or more, the dispersibility of the magnetic particles is further improved, and a more excellent electromagnetic conversion characteristic (for example, SNR) can be obtained. The method of calculating the average particle size of the magnetic particles is similar to the method of calculating the average particle size of the magnetic particles in a case where the magnetic particles are ε-iron oxide particles.

In a case where the magnetic particles are cobalt ferrite particles, the average aspect ratio of the magnetic particles is preferably 1.0 or more and 3.0 or less, more preferably 1.0 or more and 2.5 or less, and still more preferably 1.0 or more and 2.0 or less. When the average aspect ratio of the magnetic particles is within the range of 1.0 or more and 3.0 or less, aggregation of the magnetic particles can be suppressed. Furthermore, when the magnetic particles are vertically oriented in a process of forming the magnetic layer 43, resistance applied to the magnetic particles can be suppressed. Therefore, vertical orientation of the magnetic particles can be improved. The method of calculating the average aspect ratio of the magnetic particles is similar to the method of calculating the average aspect ratio of the magnetic particles in a case where the magnetic particles are ε-iron oxide particle powder.

In a case where the magnetic particle is a cobalt ferrite particle powder, the average particle volume of the magnetic particle is preferably 500 nm³ or more and 4000 nm³ or less, more preferably 600 nm³ or more and 2000 nm³ or less, and still more preferably 600 nm³ or more and 1000 nm³ or less. When the average particle volume of the magnetic particle is 4000 nm³ or less, the effect similar to that in the case where the average particle size of the magnetic particle is 16 nm or less may be obtained. On the other hand, when the average particle volume of the magnetic particles is 500 nm³ or more, the effect similar to that in a case where the average particle size of the magnetic particles is 8 nm or more is obtained. The method of calculating the average particle volume of the magnetic component is similar to the method of calculating the average particle volume in a case where the ε-iron oxide particles have a cubic shape.

(First Particle)

As illustrated in FIG. 3B, some of the first particles 51A contained in the magnetic layer 43 protrude from the magnetic surface to form the first protrusion 51B. When the head unit 56 and the magnetic tape MT slide, the first protrusion 51B comes into contact with the head unit 56.

The first particles 51A have conductivity. The first particles 51A are preferably antistatic agents and solid lubricants. The first particles 51A are particles containing carbon. As the carbon-containing particles, for example, at least one selected from the group consisting of carbon particles and hybrid particles can be used, and it is preferable to use carbon particles.

As the carbon particles, for example, one or more selected from the group consisting of carbon black, acetylene black, Ketjen black, carbon nanotubes, and graphene can be used, and among these carbon particles, carbon black is preferably used. As the carbon black, for example, SEAST TA manufactured by Tokai Carbon, Asahi #15 and #15 HS manufactured by Asahi Carbon Co., Ltd., and the like can be used.

The hybrid particle contains carbon and a material other than carbon. The material other than carbon is, for example, an organic material or an inorganic material. The hybrid particle may be a hybrid particle in which carbon is attached to the surface of the inorganic particle. Specifically, for example, hybrid carbon in which carbon is attached to the surface of silica particles may be used.

(Second Particle)

As illustrated in FIG. 3B, some of the second particles 52A contained in the magnetic layer 43 protrude from the magnetic surface to form the second protrusion 52B. When the head unit 56 and the magnetic tape MT slide, the second protrusion 52B comes into contact with the head unit 56.

The second particles 52A are non-magnetic particles and may be an abrasive. The lower limit value of Mohs hardness of the second particles 52A is 7.0 or more, preferably 7.5 or more, more preferably 8.0 or more, and still more preferably 8.5 or more from the viewpoint of suppressing deformation due to contact with the head unit 56. The upper limit value of the Mohs hardness of the second particles 52A is preferably 9.5 or less from the viewpoint of suppressing wear of the head unit 56.

The second particles 52A are non-magnetic particles and preferably inorganic particles. Examples of the inorganic particle includes α-alumina having an a conversion rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular α-iron oxide prepared by subjecting a raw material of magnetic iron oxide to dehydration and an annealing treatment, materials obtained by subjecting these to a surface treatment with aluminum and/or silica, as required, a diamond powder, and the like. As the inorganic particles, alumina particles such as α-alumina, β-alumina, and γ-alumina, and silicon carbide are preferably used. Although the second particle 52A may have any shape such as a needle shape, a spherical shape, or a dice shape, those having a corner in a part of the shape are preferable because they have high lubricity.

(Binder)

Examples of the binder include a thermoplastic resin, a thermosetting resin, and a reactive resin. Examples of the thermoplastic resin include vinyl chloride, vinyl acetate, vinyl chloride-vinyl acetate copolymer, vinyl chloride-vinylidene chloride copolymer, vinyl chloride-acrylonitrile copolymer, acrylic acid ester-acrylonitrile copolymer, acrylic acid ester-vinyl chloride-vinylidene chloride copolymer, acrylic acid ester-acrylonitrile copolymer, acrylic acid ester-vinylidene chloride copolymer, methacrylic acid ester-vinylidene chloride copolymer, methacrylic acid ester-vinyl chloride copolymer, methacrylic acid ester-ethylene copolymer, polyvinyl fluoride, vinylidene chloride-acrylonitrile copolymer, acrylonitrile-butadiene copolymer, polyamide resin, polyvinyl butyral, cellulose derivative (cellulose acetate butyrate, cellulose diacetate, cellulose triacetate, cellulose propionate, nitrocellulose), styrene-butadiene copolymer, polyurethane resin, polyester resin, amino resin, synthetic rubber and the like.

Examples of the thermosetting resin include a phenol resin, an epoxy resin, a polyurethane curable resin, a urea resin, a melamine resin, an alkyd resin, a silicone resin, a polyamine resin, a urea formaldehyde resin and the like.

For the purpose of improving the dispersibility of the magnetic particles, polar functional groups such as —$SO_3M$, —$OSO_3M$, —COOM, $P=O(OM)_2$ (where M represents a hydrogen atom or an alkali metal such as lithium, potassium, or sodium), a side chain type amine having an end group represented by —NR1R2 or —NR1R2R3$^+$X$^-$, a main chain type amine represented by >NR1R2$^+$X$^-$ (where R1, R2, and R3 represent a hydrogen atom or a hydrocarbon group, and X$^-$ represents a halogen element ion such as fluorine, chlorine, bromine, or iodine, an inorganic ion, or an organic ion), —OH, —SH, —CN, and an epoxy group may be introduced into all the binders described above. The amount of these polar functional groups to be introduced into the binder is preferably $10^{-1}$ mol/g or more and $10^{-8}$ mol/g or less, and more preferably $10^{-2}$ mol/g or more and $10^{-6}$ mol/g or less.

(Lubricant)

The lubricant contains, for example, at least one selected from fatty acid and fatty acid ester, preferably both fatty acid and fatty acid ester. The fact that the magnetic layer 43 contains a lubricant, in particular, the fact that the magnetic layer 43 contains both a fatty acid and a fatty acid ester contributes to improvement of traveling stability of the magnetic tape MT. More particularly, since the magnetic layer 43 contains a lubricant and has pores, good traveling stability is achieved. The improvement of the traveling stability is considered to be because the dynamic friction coefficient of the magnetic layer 43 side surface of the magnetic tape MT is adjusted to a value suitable for travel of the magnetic tape MT by the lubricant described above.

The fatty acid may be preferably a compound represented by the following general formula (1) or (2). For example, one or both of the compound represented by the following general formula (1) and the compound represented by the general formula (2) may be contained as the fatty acid.

Moreover, the fatty acid ester may be preferably a compound represented by the following general formula (3) or (4). For example, one or both of the compound represented by the following general formula (3) and the compound represented by the general formula (4) may be contained as the fatty acid ester.

With the lubricant including either one or both of a compound represented by the general formula (1) and a compound represented by the general formula (2) and either one or both of a compound represented by the general formula (3) and a compound represented by the general formula (4), an increase in dynamic frictional coefficient due to repeated recording or reproduction on the magnetic tape MT can be restrained.

$$CH_3(CH_2)_kCOOH \quad (1)$$

(where, in the general formula (1), k is an integer selected from a range of 14 or more and 22 or less, and more preferably a range of 14 or more and 18 or less)

$$CH_3(CH_2)_nCH=CH(CH_2)_mCOOH \quad (2)$$

(where, in the general formula (2), the sum of n and m is an integer selected from a range of 12 or more and 20 or less, and more preferably a range of 14 or more and 18 or less)

$$CH_3(CH_2)_pCOO(CH_2)_qCH_3 \quad (3)$$

(where, in the general formula (3), p is an integer selected from a range of 14 or more and 22 or less, and more preferably a range of 14 or more and 18 or less, and q is an integer selected from a range of 2 or more and 5 or less, and more preferably a range of 2 or more and 4 or less)

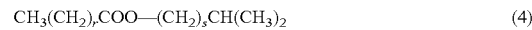

$$CH_3(CH_2)_rCOO-(CH_2)_sCH(CH_3)_2 \quad (4)$$

(where, in the general formula (4), r is an integer selected from a range of 14 or more and 22 or less, and s is an integer selected from a range of 1 or more and 3 or less)

(Antistatic Agent)

The antistatic agent contains carbon particles. The antistatic agent may further contain at least one selected from the group consisting of a natural surfactant, a nonionic surfactant, a cationic surfactant, and the like. The carbon particles include, for example, at least one selected from the group consisting of carbon black, acetylene black, Ketjen black, carbon nanotubes, and graphene.

(Curing Agent)

Examples of the curing agent include polyisocyanate and the like. Examples of the polyisocyanate include aromatic polyisocyanates such as an adduct of tolylene diisocyanate (TDI) and an active hydrogen compound, aliphatic polyisocyanates such as an adduct of hexamethylene diisocyanate (HMDI) and an active hydrogen compound, and the like. A weight average molecular weight of these polyisocyanates is desirably in a range of 100 or more and 3000 or less.

(Rust-Preventive Agent)

Examples of the rust-preventive agent include phenols, naphthols, quinones, heterocyclic compounds containing a nitrogen atom, heterocyclic compounds containing an oxygen atom, heterocyclic compounds containing a sulfur atom, and the like.

(Nonmagnetic Reinforcing Particle)

Examples of the nonmagnetic reinforcing particle include aluminum oxide (α, β, or γ alumina), chromium oxide, silicon oxide, diamond, garnet, emery, boron nitride, titanium carbide, silicon carbide, titanium carbide, titanium oxide (rutile type or anatase type titanium oxide), and the like.

(Underlayer)

The underlayer 42 relaxes the concavoconvex shape of the surface of the base 41 and adjusts the concavoconvex shape of the magnetic surface. The underlayer 42 is a nonmagnetic layer including nonmagnetic particles, a binder, and a lubricant. The underlayer 42 supplies a lubricant to the magnetic surface. The underlayer 42 may further include at least one type of additive of an antistatic agent, a curing agent, a rust inhibitor, and the like, as necessary.

The average thickness $t_2$ of the underlayer 42 is preferably 0.3 μm or more and 1.2 μm or less, and more preferably 0.3 μm or more and 0.9 μm or less, and 0.3 μm or more and 0.6 μm or less. Note that the average thickness $t_2$ of the underlayer 42 is determined similarly to the average thickness $t_1$ of the magnetic layer 43. However, magnification of the TEM image is appropriately adjusted according to the thickness of the underlayer 42. When the average thickness $t_2$ of the underlayer 42 is 1.2 μm or less, stretchability of the magnetic tape MT due to an external force further increases, so that adjustment of the width of the magnetic tape MT by tension adjustment is further facilitated.

The underlayer 42 preferably includes a plurality of holes. Since the lubricant is stored in the plurality of holes, it is possible to further suppress a decrease in supply amount of the lubricant between the magnetic surface and the head unit 56 even after the repeated recording or reproduction (that is, even after the head unit 56 is brought into contact with the surface of the magnetic tape MT and repeatedly travels). Therefore, the increase in dynamic friction coefficient may be further suppressed. That is, more excellent traveling stability can be obtained.

(Nonmagnetic Particle)

The nonmagnetic particles include, for example, at least one of inorganic particles or organic particles. Moreover, the nonmagnetic particles may be carbon particles such as carbon black. Note that one type of nonmagnetic particles may be used alone, or two or more types of nonmagnetic particles may be used in combination. The inorganic particle includes, for example, metal, metal oxide, metal carbonate, metal sulfate, metal nitride, metal carbide, metal sulfide and the like. A shape of the nonmagnetic particle may be, for example, various shapes such as a needle shape, a spherical shape, a cubic shape, a plate shape and the like, but is not limited these shapes.

(Binder, Lubricant)

The binder and the lubricant are similar to that of the magnetic layer 43 described above.

(Additives)

The antistatic agent, the curing agent, and the rust inhibitor are each similar to those of the magnetic layer 43 described above.

(Back Layer)

The back layer 44 includes a binder and nonmagnetic particles. The back layer 44 may further include at least one type of additive of a lubricant, a curing agent, an antistatic agent, and the like, as necessary. The binder and the nonmagnetic particles are similar to those of the underlayer 42 described above. The curing agent and the antistatic agent are similar to those of the magnetic layer 43 described above.

The average particle size of the nonmagnetic particle is preferably 10 nm or more and 150 nm or less, and more preferably 15 nm or more and 110 nm or less. The average particle size of the nonmagnetic particle is obtained similarly to the average particle size of the magnetic particle described above. The nonmagnetic particles may also include the nonmagnetic particles having two or more particle size distribution.

An upper limit value of an average thickness of the back layer 44 is preferably 0.6 µm or smaller. When the upper limit value of the average thickness of the back layer 44 is 0.6 µm or less, the thicknesses of the underlayer 42 and the base 41 can be kept thick even in a case where the average thickness of the magnetic tape MT is 5.6 µm or less, so that the traveling stability of the magnetic tape MT in the recording/reproducing device can be maintained. A lower limit value of the average thickness of the back layer 44 is not especially limited; this is, for example, 0.2 µm or more.

The average thickness to of the back layer 44 is determined as follows. First, an average thickness $t_T$ of the magnetic tape MT is measured. The method of measuring the average thickness $t_T$ is as described in the following "Average thickness of magnetic tape". Subsequently, the magnetic tape MT accommodated in the cartridge 10 is unwound, and the magnetic tape MT is cut out to a length of 250 mm at a position of 30 m to 40 m in the longitudinal direction from a connection portion 21 between the magnetic tape MT and the reader tape LT, thereby preparing samples. Next, the back layer 44 of the sample is removed with a solvent such as methyl ethyl ketone (MEK) or dilute hydrochloric acid. Next, thicknesses of the sample are measured at five positions using a laser holo gauge (LGH-110C) manufactured by Mitutoyo Corporation, and these measured values are simply averaged (arithmetically averaged) to calculate an average value $t_B$ [µm]. Thereafter, an average thickness $t_b$ [µm] of the back layer 44 is obtained by the following equation. Note that the five measurement positions described above are randomly selected from each sample so as to be different positions in the longitudinal direction of the magnetic tape MT.

$$t_b[\mu m] = t_T[\mu m] - t_B[\mu m]$$

(Average Thickness of Magnetic Tape)

An upper limit value of the average thickness (average total thickness) $t_T$ of the magnetic tape MT is preferably 5.3 µm or less, more preferably 5.0 µm or less, still more preferably 4.6 µm or less, and particularly preferably 4.4 µm or less. When the average thickness $t_T$ of the magnetic tape MT is 5.2 µm or less, the recording capacity that can be recorded in one data cartridge can be increased as compared with a general magnetic tape. The lower limit value of the average thickness $t_T$ of the magnetic tape MT is not particularly limited, and is, for example, 3.5 µm or more.

The average thickness $t_T$ of the magnetic tape MT is determined as follows. First, the magnetic tape MT accommodated in the cartridge 10 is unwound, and the magnetic tape MT is cut out to a length of 250 mm at a position of 30 m to 40 m in the longitudinal direction from a connection portion 21 between the magnetic tape MT and the reader tape LT, thereby preparing samples. Next, a thickness of the sample is measured at five positions using a laser holo gauge (LGH-110C) manufactured by Mitutoyo Corporation as a measuring device, and these measured values—are simply averaged (arithmetically averaged) to calculate the average thickness $t_T$ [µm]. Note that the five measurement positions described above are randomly selected from each sample so as to be different positions in the longitudinal direction of the magnetic tape MT.

(Coercive Force Hc2)

An upper limit value of the coercive force Hc2 of the magnetic layer 43 in the longitudinal direction of the magnetic tape MT is preferably 2000 Oe or less, more preferably 1900 Oe or less, and still more preferably 1800 Oe or less. When the coercive force Hc2 of the magnetic layer 43 in the longitudinal direction of the magnetic tape MT is 2000 Oe or less, sufficient electromagnetic conversion characteristics can be achieved even at a high recording density.

A lower limit value of the coercive force Hc2 of the magnetic layer 43 measured in the longitudinal direction of the magnetic tape MT is preferably 1000 Oe or more. When the coercive force Hc2 of the magnetic layer 43 measured in the longitudinal direction of the magnetic tape MT is 1000 Oe or more, it is possible to suppress demagnetization due to a leakage flux from the recording head.

The coercive force Hc2 described above is obtained as follows. First, the magnetic tape MT accommodated in the cartridge 10 is unwound, the magnetic tape MT is cut out at a position of 30 m to 40 m in the longitudinal direction from the connection portion 21 between the magnetic tape MT and the reader tape LT, and three sheets of the magnetic tape MT are superimposed on each other by use of a double-sided adhesive tape such that the directions of the magnetic tape MT in the longitudinal direction are the same, and then punched out with a punch of φ 6.39 mm to prepare a measurement sample. At this time, marking is performed with an arbitrary ink having no magnetism so that the longitudinal direction (traveling direction) of the magnetic tape MT can be recognized. Then, an M-H loop of the measurement sample (the entire magnetic tape MT) corresponding to the longitudinal direction (traveling direction) of the magnetic tape MT is measured using a vibrating sample magnetometer (VSM). Next, the coating film (underlayer 42, magnetic layer 43, back layer 44, and the like) of the magnetic tape MT cut out as described above is wiped off using acetone, ethanol, or the like, leaving only the base 41. Then, three sheets of the bases 41 obtained are stacked by use of a double-sided adhesive tape, and then punched out with a punch of φ 6.39 mm to prepare a sample for background correction (hereinafter referred to simply as "correction sample"). Thereafter, the M-H loop of the correction sample (base 41) corresponding to the longitudinal direction of the base 41 (longitudinal direction of the magnetic tape MT) is measured using the VSM.

In the measurement of the M-H loop of the measurement sample (the entire magnetic tape MT) and the M-H loop of the correction sample (the base 41), a high-sensitivity vibrating sample magnetometer "VSM-P7-15 model" manufactured by Toei Industry Co., Ltd. is used. The measurement conditions are measurement mode: full loop, maximum magnetic field: 15 kOe, magnetic field step: 40 bit, Time constant of Locking amp: 0.3 sec, Waiting time: 1 sec, and MH average number: 20.

After the M-H loop of the measurement sample (the entire magnetic tape MT) and the M-H loop of the correction sample (base 41) are obtained, the M-H loop of the correction sample (base 41) is subtracted from the M-H loop of the measurement sample (the entire magnetic tape MT), so that background correction is performed, and an M-H loop after the background correction is obtained. For calculation of the background correction, a measurement and analysis program attached to "VSM-P7-15 model" is used. The coercive force Hc2 is obtained from the obtained M-H loop after the background correction. Note that for this calculation, the measurement and analysis program attached to "VSM-P7-15 model" is used. Note that it is assumed that every measurement of the M-H loop described above is performed at 25° C.±2° C. and 50% RH±5% RH. Furthermore, it is assumed that "demagnetizing field correction" when measuring the M-H loop in the longitudinal direction of the magnetic tape MT is not performed.

(Square Ratio)

A square ratio S1 of the magnetic layer 43 in the vertical direction of the magnetic tape MT is preferably 65% or more, more preferably 70% or more, still more preferably 75% or more, particularly preferably 80% or more, and most preferably 85% or more. When the square ratio S1 is 65% or more, the vertical orientation of the magnetic particles is sufficiently high, so that a more excellent electromagnetic conversion characteristics can be obtained.

The square ratio S1 of the magnetic tape MT in the vertical direction is determined as follows. First, the magnetic tape MT accommodated in the cartridge 10 is unwound, the magnetic tape MT is cut out at a position of 30 m to 40 m in the longitudinal direction from the connection portion 21 between the magnetic tape MT and the reader tape LT, and three sheets of the magnetic tape MT are superimposed on each other by use of a double-sided adhesive tape such that the directions of the magnetic tape MT in the longitudinal direction are the same, and then punched out with a punch of φ 6.39 mm to prepare a measurement sample. At this time, marking is performed with an arbitrary ink having no magnetism so that the longitudinal direction (traveling direction) of the magnetic tape MT can be recognized. Then, an M-H loop of the measurement sample (the entire magnetic tape MT) corresponding to the vertical direction (vertical direction of the magnetic tape MT) of the magnetic tape MT is measured using a vibrating sample magnetometer (VSM). Next, the coating film (underlayer 42, magnetic layer 43, back layer 44, and the like) of the magnetic tape MT cut out as described above is wiped off using acetone, ethanol, or the like, leaving only the base 41. Then, three sheets of the bases 41 obtained are stacked by use of a double-sided adhesive tape, and then punched out with a punch of φ 6.39 mm to prepare a sample for background correction (hereinafter referred to simply as "correction sample"). Thereafter, the M-H loop of the correction sample (base 41) corresponding to the vertical direction of the base 41 (vertical direction of the magnetic tape MT) is measured using the VSM.

In the measurement of the M-H loop of the measurement sample (the entire magnetic tape MT) and the M-H loop of the correction sample (the base 41), a high-sensitivity vibrating sample magnetometer "VSM-P7-15 model" manufactured by Toei Industry Co., Ltd. is used. The measurement conditions are measurement mode: full loop, maximum magnetic field: 15 kOe, magnetic field step: 40 bit, Time constant of Locking amp: 0.3 sec, Waiting time: 1 sec, and MH average number: 20.

After the M-H loop of the measurement sample (the entire magnetic tape MT) and the M-H loop of the correction sample (base 41) are obtained, the M-H loop of the correction sample (base 41) is subtracted from the M-H loop of the measurement sample (the entire magnetic tape MT), so that background correction is performed, and an M-H loop after the background correction is obtained. For calculation of the background correction, a measurement and analysis program attached to "VSM-P7-15 model" is used.

The square ratio S1(%) is calculated by substituting saturation magnetization Ms (emu) and residual magnetization Mr (emu) of the obtained M-H loop after the background correction into the following equation. Note that it is assumed that every measurement of the M-H loop described above is performed at 25° C.±2° C. and 50% RH±5% RH. Furthermore, it is assumed that "demagnetizing field correction" when measuring the M-H loop in the vertical direction of the magnetic tape MT is not performed. Note that for this calculation, the measurement and analysis program attached to "VSM-P7-15 model" is used.

$$\text{Square ratio } S1(\%) = (Mr/Ms) \times 100$$

A square ratio S2 of the magnetic layer 43 in the longitudinal direction (traveling direction) of the magnetic tape MT is preferably 35% or less, more preferably 30% or less, still more preferably 25% or less, especially preferably 20% or less, and most preferably 15% or less. When the square ratio S2 is 35% or less, the vertical orientation of the magnetic particles is sufficiently high, so that more excellent electromagnetic conversion characteristics can be obtained.

The square ratio S2 of the magnetic tape MT in the longitudinal direction is obtained in a manner similar to that of the square ratio S1 except that the M-H loop is measured in the longitudinal direction (traveling direction) of the magnetic tape MT and the base 41.

(Ratio Hc2/Hc1)

A ratio Hc2/Hc1 of the coercive force Hc1 of the magnetic layer 43 in the vertical direction of the magnetic tape MT to the coercive force Hc2 of the magnetic layer 43 in the longitudinal direction of the magnetic tape MT preferably satisfies a relationship of Hc2/Hc1≤0.8, more preferably Hc2/Hc1≤0.75, still more preferably Hc2/Hc1≤0.7, particularly preferably Hc2/Hc1≤0.65, and most preferably Hc2/Hc1≤0.6. When the coercive forces Hc1 and Hc2 satisfy the relationship of Hc2/Hc1≤0.8, a degree of perpendicular orientation of the magnetic particles can be increased. Therefore, it is possible to reduce a magnetization transition width and to obtain a high-output signal at the time of signal reproduction, so that more excellent electromagnetic conversion characteristics can be obtained. Note that when Hc2 is small as described above, the magnetization reacts with a high degree of sensitivity by a vertical magnetic field from the recording head, so that a good recording pattern may be formed.

In a case where the ratio Hc2/Hc1 is Hc2/Hc1≤0.8, it is particularly effective that the average thickness $t_1$ of the magnetic layer 43 is 90 nm or less. When the average thickness $t_1$ of the magnetic layer 43 exceeds 90 nm, in the case where a ring-type head is used as the recording head, a lower region (a region on the underlayer 42 side) of the magnetic layer 43 would be magnetized in the longitudinal direction of the magnetic tape MT, and it may become impossible to uniformly magnetize the magnetic layer 43 in the thickness direction. Therefore, it may be impossible to obtain more excellent electromagnetic conversion characteristics even when the ratio Hc2/Hc1 is set to be Hc2/Hc1≤0.8 (namely, even when the degree of perpendicular orientation of the magnetic particles is enhanced).

The lower limit value of Hc2/Hc1 is not particularly limited, and is, for example, 0.5≤Hc2/Hc1. Note that Hc2/Hc1 represents the degree of perpendicular orientation of the magnetic particles, and the smaller Hc2/Hc1, the higher the degree of perpendicular orientation of the magnetic particles.

The method of calculating the coercive force Hc2 of the magnetic layer 43 in the longitudinal direction of the magnetic tape MT is as described above. The coercive force Hc1 of the magnetic layer 43 in the vertical direction of the magnetic tape MT is obtained similarly to the coercive force Hc2 of the magnetic layer 43 in the longitudinal direction of the magnetic tape MT except that the M-H loop is measured in the vertical direction (thickness direction) of the magnetic tape MT and the base 41.

(Activation Volume $V_{act}$)

An activation volume $V_{act}$ is preferably 8000 nm³ or less, more preferably 6000 nm³ or less, still more preferably 5000 nm³ or less, especially preferably 4000 nm³ or less, and most preferably 3000 nm³ or less. When the activation volume $V_{act}$ is 8000 nm³ or smaller, a dispersion state of the magnetic particles becomes excellent, so that a bit inversion region may be made steep, and it is possible to suppress the deterioration in magnetic signal recorded in the adjacent track by the leakage magnetic field from the recording head. Therefore, there is a possibility that more excellent electromagnetic conversion characteristics cannot be obtained.

The activation volume $V_{act}$ described above is obtained by following equation derived by Street and Woolley.

$$V_{act}(\text{nm}^3) = k_B \times T \times X_{irr} / (\mu_0 \times M_s \times S)$$

(where KB: Boltzmann's constant (1.38×10⁻²³ J/K), T: temperature (K), $X_{irr}$: irreversible magnetic susceptibility, $\mu_0$: vacuum magnetic permeability, S: magnetic viscosity coefficient, and Ms: saturation magnetization (emu/cm³))

The irreversible magnetic susceptibility $X_{irr}$, the saturation magnetization Ms, and the magnetic viscosity coefficient S to be substituted in the above formula are obtained as follows by using VSM. Note that a measurement direction by the VSM is assumed to be the vertical direction (thickness direction) of the magnetic tape MT. Furthermore, it is assumed that the measurement by the VSM is performed on the measurement sample cut out from the elongated magnetic tape MT at 25° C.±2° C. and 50% RH±5% RH. Furthermore, it is assumed that "demagnetizing field correction" when measuring the M-H loop in the vertical direction (thickness direction) of the magnetic tape MT is not performed.

(Irreversible Magnetic Susceptibility $X_{irr}$)

The irreversible magnetic susceptibility $X_{irr}$ is defined as an inclination in the vicinity of a residual coercive force Hr in an inclination of a residual magnetization curve (DCD curve). First, a magnetic field of −1193 kA/m (15 kOe) is applied to a whole of the magnetic tape MT, and the magnetic field is returned to zero to obtain a residual magnetization state. Thereafter, a magnetic field of about 15.9 kA/m (200 Oe) is applied in the opposite direction to return to zero again, and a residual magnetization amount is measured. Thereafter, similarly, measurement to apply a magnetic field larger than the above-described applied magnetic field by 15.9 kA/m to return to zero is repeatedly performed, the residual magnetization amount is plotted to the applied magnetic field, and the DCD curve is measured. From the obtained DCD curve, a point at which the magnetization amount is zero is made the residual coercive force Hr, the DCD curve is further differentiated, and the inclination of the DCD curve at each magnetic field is obtained. In the inclination of this DCD curve, the inclination in the vicinity of the residual coercive force Hr is $X_{irr}$.

(Saturation Magnetization Ms)

First, an M-H loop after background correction is obtained in a manner similar to the method of measuring the square ratio S1 described above. Next, Ms (emu/cm³) is calculated from a value of saturation magnetization Ms (emu) of the obtained M-H loop and the volume (cm³) of the magnetic layer 43 in the measurement sample. Note that the volume of the magnetic layer 43 is obtained by multiplying the area of the measurement sample by the average thickness $t_1$ of the magnetic layer 43. The method of calculating the average thickness $t_1$ of the magnetic layer 43 required for calculating the volume of the magnetic layer 43 is as described above.

(Magnetic Viscosity Coefficient S)

First, a magnetic field of −1193 kA/m (15 kOe) is applied to a whole of the magnetic tape MT (measurement sample), and the magnetic field is returned to zero to obtain the residual magnetization state. Thereafter, a magnetic field equivalent to the value of the residual coercive force Hr obtained from the DCD curve is applied in the opposite direction. The magnetization amount is continuously measured at regular time intervals for 1000 seconds in a state in which the magnetic field is applied. A magnetic viscosity coefficient S is calculated by checking a relationship between time t and the magnetization amount M(t) against the following formula obtained in this manner.

$$M(t) = M0 + S \times \ln(t)$$

(where M(t): magnetization amount at time t, M0: initial magnetization amount, S: magnetic viscosity coefficient, and ln(t): natural logarithm of time)

(Surface Roughness $R_b$ of Back Surface)

The surface roughness $R_b$ of the back surface (surface roughness of the back layer 44) preferably meets $R_b \leq 6.0$ [nm]. When the surface roughness $R_b$ of the back surface is in the above range, more excellent electromagnetic conversion characteristics can be obtained.

The surface roughness $R_b$ of the back surface is determined as follows. First, the magnetic tape MT accommodated in the cartridge 10 is unwound, and the magnetic tape MT is cut out to a length of 100 mm at a position of 30 m to 40 m in the longitudinal direction from a connection portion 21 between the magnetic tape MT and the reader tape LT, thereby preparing samples. Next, the sample is placed on a slide glass so that a surface to be measured (surface on the magnetic layer side) of the sample is oriented upwardly, and an end of the sample is fixed with a mending tape. The surface shape is measured using VertScan (20× objective lens) as a measuring device, and the surface roughness $R_b$ of the back surface is obtained from the following formula on the basis of the standard of ISO 25178.

The measurement conditions are as follows.

Apparatus: non-contact roughness meter using optical interference
(non-contact surface/layer section profile measuring system "VertScan R5500GL-M100-AC" manufactured by Ryoka Systems Inc.)
Objective lens: 20 times
Measurement region: 640×480 pixels (field of view: about 237 µm×178 µm field of view)
Measurement mode: phase
Wavelength filter: 520 nm
CCD: ⅓ inch
Noise removal filter: Smoothing 3×3
Surface correction: correction on quadratic polynomial approximated surface
Measurement software: VS-Measure Version 5.5.2
Analysis software: VS-viewer Version 5.5.5

$$S_a = \frac{1}{A} \int\int_A |Z(x, y)| dx dy \qquad \text{[Math. 2]}$$

After measuring the surface roughness at five points in the longitudinal direction of the magnetic tape MT as described above, an average value of arithmetic average roughnesses $S_a$ (nm) automatically calculated on the basis of the surface profile obtained at each position is taken as the surface roughness $R_b$ (nm) of the back surface.

(Young's Modulus of Magnetic Tape in Longitudinal Direction)

The upper limit value of the Young's modulus of the magnetic tape MT in the longitudinal direction is preferably 9.0 GPa or less, more preferably 8.0 GPa or less, still more preferably 7.5 GPa or less, and particularly preferably 7.1 GPa or less. When the Young's modulus of the magnetic tape MT in the longitudinal direction is 9.0 GPa or less, the stretchability of the magnetic tape MT due to the external force further increases, so that adjustment of the width of the magnetic tape MT by tension adjustment is further facilitated. Therefore, off-track can be more suitably suppressed, and data recorded on the magnetic tape MT can be more accurately reproduced. The lower limit value of the Young's modulus of the magnetic tape MT in the longitudinal direction is preferably 3.0 GPa or more, and more preferably 4.0 GPa or more. When the lower limit value of the Young's modulus of the magnetic tape MT in the longitudinal direction is 3.0 GPa or more, a decrease in traveling stability can be suppressed.

The Young's modulus of the magnetic tape MT in the longitudinal direction is a value indicating the difficulty of expansion and contraction of the magnetic tape MT in the longitudinal direction due to an external force. The larger this value, the more difficult the magnetic tape MT is expanded and contracted in the longitudinal direction due to the external force. The smaller this value, the easier the magnetic tape MT is expanded and contracted in the longitudinal direction due to the external force.

Note that the Young's modulus of the magnetic tape MT in the longitudinal direction is a value relating to the magnetic tape MT in the longitudinal direction, and is correlated with the difficulty of expansion and contraction of the magnetic tape MT in the width direction. That is, the larger this value, the more difficult the magnetic tape MT is expanded and contracted in the width direction due to an external force. The smaller this value, the easier the magnetic tape MT is expanded and contracted in the width direction due to the external force. Therefore, from the viewpoint of tension adjustment, it is advantageous that the Young's modulus of the magnetic tape MT in the longitudinal direction is small as described above and is 9.0 GPa or less.

For measurement of the Young's modulus, a tensile tester (manufactured by Shimadzu Corporation, AG-100D) is used. In the case where the Young's modulus in the tape longitudinal direction is desired to be measured, the magnetic tape MT accommodated in the cartridge 10 is unwound, and the magnetic tape MT is cut out to a length of 180 mm at a position of 30 m to 40 m in the longitudinal direction from the connection portion 21 between the magnetic tape MT and the reader tape LT, thereby preparing samples. A jig capable of fixing the tape width (½ inch) is attached to the tensile tester described above to fix the top and bottom of the tape width. The distance (length of the tape between chucks) is set to 100 mm. After chucking the data sample, stress is gradually applied in the direction of pulling the sample. The tensile speed is 0.1 mm/min. The Young's modulus is calculated using the following formula on the basis of the change in stress and the amount of elongation at this time.

$$E(N/m^2) = ((\Delta N/S)/(\Delta x/L)) \times 10^6$$

ΔN: change in stress (N)
S: Cross-sectional area of test piece (mm²)
Δx: elongation amount (mm)
L: distance between gripping jigs (mm)

A cross-sectional area S of the measurement sample 10S described above is a cross-sectional area before tensile operation, and is obtained by a product of the width (½ inch) of the measurement sample 10S and the thickness of the measurement sample 10S. For a range of tensile stress at the time of measurement, the range of the tensile stress in a linear region is set according to the thickness of the magnetic tape MT or the like. In this case, the stress range is 0.5 N to 1.0 N, and the change in stress (ΔN) and the amount of elongation (Δx) at this time are used for calculation. Note that the measurement of the Young's modulus described above is performed at 25° C.±2° C. and 50% RH±5% RH.
(Young's Modulus of Base in Longitudinal Direction)

The Young's modulus of the base 41 in the longitudinal direction is preferably 7.8 GPa or less, more preferably 7.0 GPa or less, still more preferably 6.6 GPa or less, and particularly preferably 6.4 GPa or less. When the Young's modulus of the base 41 in the longitudinal direction is 7.8 GPa or less, the stretchability of the magnetic tape MT due to the external force further increases, so that adjustment of the width of the magnetic tape MT by tension adjustment is further facilitated. Therefore, off-track can be more suitably suppressed, and data recorded on the magnetic tape MT can be more accurately reproduced. The lower limit value of the Young's modulus of the base 41 in the longitudinal direction is preferably 2.5 GPa or more, and more preferably 3.0 GPa or more. When the lower limit value of the Young's modulus of the base 41 in the longitudinal direction is 2.5 GPa or more, the decrease in traveling stability can be suppressed.

The Young's modulus of the base 41 described above in the longitudinal direction is determined as follows. First, the magnetic tape MT accommodated in the cartridge 10 is unwound, and the magnetic tape MT is cut out to a length of 180 mm at a position of 30 m to 40 m in the longitudinal direction from the connection portion 21 between the magnetic tape MT and the reader tape LT. Subsequently, the underlayer 42, the magnetic layer 43, and the back layer 44 are removed from the cut magnetic tape MT to obtain the base 41. Using this base 41, the Young's modulus of the base 41 in the longitudinal direction is obtained in a similar procedure to the above-mentioned Young's modulus of the magnetic tape MT described above in the longitudinal direction.

The thickness of the base 41 is half or more of the thickness of the entire magnetic tape MT. Therefore, the Young's modulus of the base 41 in the longitudinal direction is correlated with the difficulty of expansion and contraction of the magnetic tape MT due to an external force. The larger this value, the more difficult the magnetic tape MT is expanded and contracted in the width direction due to the external force. The smaller this value, the easier the magnetic tape MT is expanded and contracted in the width direction due to the external force.

Note that the Young's modulus of the base 41 in the longitudinal direction is a value relating to the magnetic tape MT in the longitudinal direction, and is correlated with the difficulty of expansion and contraction of the magnetic tape MT in the width direction. That is, the larger this value, the more difficult the magnetic tape MT is expanded and contracted in the width direction due to an external force. The smaller this value, the easier the magnetic tape MT is expanded and contracted in the width direction due to the external force. Therefore, from the viewpoint of tension adjustment, it is advantageous that the Young's modulus of the base 41 in the longitudinal direction is small as described above and is 7.8 GPa or less.
(Ratio H1/H2 Between Average Height H1 of First Protrusion and Average Height H2 of Second Protrusion)

The upper limit value of the ratio H1/H2 (hereinafter, referred to as "protrusion average height ratio H1/H2") of the average height H1 of the first protrusion 51B to the average height H2 of the second protrusion 52B is $H1/H2 \leq 2.3$, preferably $H1/H2 \leq 2.0$, more preferably $H1/H2 \leq 1.7$, and still more preferably $H1/H2 \leq 1.5$. When the protrusion average height ratio H1/H2 satisfies $H1/H2 \leq 2.3$, the contact area between the first protrusion 51B and the head unit 56 can be adjusted to a suitable range, and a contact opportunity between the second protrusion 52B and the head unit 56 can be adjusted to a suitable range, so that wear of the first protrusion 51B due to travel of the magnetic tape MT can be suppressed. Therefore, it is possible to suppress an increase in friction of the magnetic surface due to traveling many times. Therefore, it is possible to suppress an increase in a standard deviation σPES of the PES value due to traveling many times.

The lower limit value of the protrusion average height ratio H1/H2 is preferably $1.0 \leq H1/H2$, more preferably $1.1 \leq H1/H2$, and still more preferably $1.2 \leq H1/H2$. Since the second protrusion 52B is more likely to be crushed than the first protrusion 51B at the time of calendering the magnetic surface, the average height H2 of the second protrusion 52B is lower than the average height H1 of the first protrusion 51B. Therefore, it is difficult to adjust the protrusion average height ratio H1/H2 on the magnetic surface after the calendering treatment to $H1/H2<1.0$.
(Average Height H1 of First Protrusion)

The upper limit value of the average height H1 of the first protrusion 51B is preferably 12.0 nm or less, more preferably 11.5 nm or less, still more preferably 10.5 nm or less, 9.5 nm or less, or 8.5 nm or less. If the average height H1 of the first protrusion 51B exceeds 12.0 nm, a spacing amount between the head unit 56 and the magnetic tape MT increases, and it may become impossible to obtain predetermined electromagnetic conversion characteristics.

The lower limit value of the average height H1 of the first protrusion 51B is not particularly limited, and is preferably 5.0 nm or more, more preferably 5.5 nm or more, and still more preferably 6.0 nm or more.
(Average Height H2 of Second Protrusion)

The upper limit value of the average height H2 of the second protrusion 52B is preferably 7.0 nm or less, more preferably 6.5 nm or less, still more preferably 6.0 nm or less, 5.5 nm or less, or 5.3 nm or less. If the average height H2 of the second protrusion 52B exceeds 7.0 nm, the spacing amount between the head unit 56 and the magnetic tape MT increases, and it may become impossible to obtain predetermined electromagnetic conversion characteristics.

The lower limit value of the average height H2 of the second protrusion 52B is not particularly limited, and is preferably 2.0 nm or more, more preferably 2.5 nm or more, and still more preferably 3.0 nm or more.
(Method of Measuring Average Height H1 of First Protrusion, Average Height H2 of Second Protrusion, and Average Height Ratio H1/H2 of Protrusion)

As described below, the average height H1 of the first protrusion 51B, the average height H2 of the second protrusion 52B, and the average height ratio H1/H2 of the protrusion are obtained by acquiring an AFM image by an atomic force microscope (AFM) and an FE-SEM image by a field-emission scanning electron microscope (FE-SEM) at the same location of the measurement sample, and associating these AFM images with the FE-SEM image.

The height of each protrusion can be measured by AFM, and whether each protrusion is formed by the first particle 51A or the second particle 52A can be specified by FE-SEM. An image obtained by AFM and an image obtained by FE-SEM for the same location are superimposed to obtain a synthesized image, and from the obtained synthesized image, the type of particles forming each protrusion (the first particles 51A or the second particles 52A) and the height of each protrusion can be associated with each other.

Hereinafter, (1) Preparation of measurement sample and acquisition of AFM image, (2) Method of identifying type of particle forming projection using FE-SEM, (3) Method of correlating height of protrusion with type of particle forming protrusion, (4) Method of measuring height of projection using AFM, and (5) Method of calculating average height H1 of first protrusion, average height H2 of second protrusion, and average height ratio H1/H2 of protrusion will be sequentially described.

(1) Preparation of Measurement Sample and Acquisition of AFM Image

First, the magnetic tape MT accommodated in the cartridge 10 is unwound, and the magnetic tape MT is cut out at a position of 30 m to 40 m in the longitudinal direction from the connection portion 21 between the magnetic tape MT and the reader tape LT into a size to be placed on a sample stage for AFM observation and a sample stage for SEM observation, thereby preparing a measurement sample. Next, a surface of the measurement sample is marked while avoiding a central portion of the measurement sample. Examples of the marking method include a method of forming a recess in a linear or dotted shape on the magnetic tape MT with a manipulator, a naindenter, or the like, a method of forming a protrusion on the magnetic tape MT with a silver paste or the like, and the like. Note that in AFM, since a marking portion is scanned with a probe, a probe tip may be contaminated depending on the state of the marking portion, and an accurate AFM image may not be obtained. Therefore, the marking is preferably small and shallow so that the probe is not contaminated.

Next, the marking portion on the surface of the measurement sample is subjected to shape analysis by AFM. Since the marked marking portion is recessed or protrudes, the surface of the measurement sample is measured at a viewing angle of 5 μm×5 μm with AFM so that the marking portion is at the end of the field of view as much as possible. Note that the protrusions around the marking portion are not to be measured. Specifically, measurement is performed at a viewing angle of 10 μm×10 μm, a portion to be a mark is determined, and the surface of the measurement sample is measured at a viewing angle of 5 μm×5 μm at a portion without marking in accordance with the portion to be the mark. The measurement conditions for the shape analysis described above are as described below.

<AFM Measurement Conditions>
  Measurement device: AFM Dimension 3100 microscope (with Nanoscope IV controller) (manufactured by Digital Instruments, Inc.)
  Measurement mode: tapping
  Tapping frequency at the time of tuning: 200 kHz or more and 400 kHz or less
  Cantilever: SNL-10 (manufactured by Bruker)
  Scan size: 5 μm×5 μm
  Scan rate: 1 Hz
  Scan line: 256

<Method of Calculating Reference Surface in Calculating Protrusion Height>

The AFM image is divided into 256×256 (=65, 536) measurement points, the height Z (i) (i: measurement point number, i=1 to 65,536) is measured at each measurement point, and the measured heights Z (i) at the measurement points are simply averaged (arithmetically averaged) to determine an average height (reference surface) Zave (=(Z(1)+Z(2)+ . . . +Z(65,536))/65,536).

(2) Method of Identifying Type of Particle Forming Projection Using FE-SEM

Figure 10:
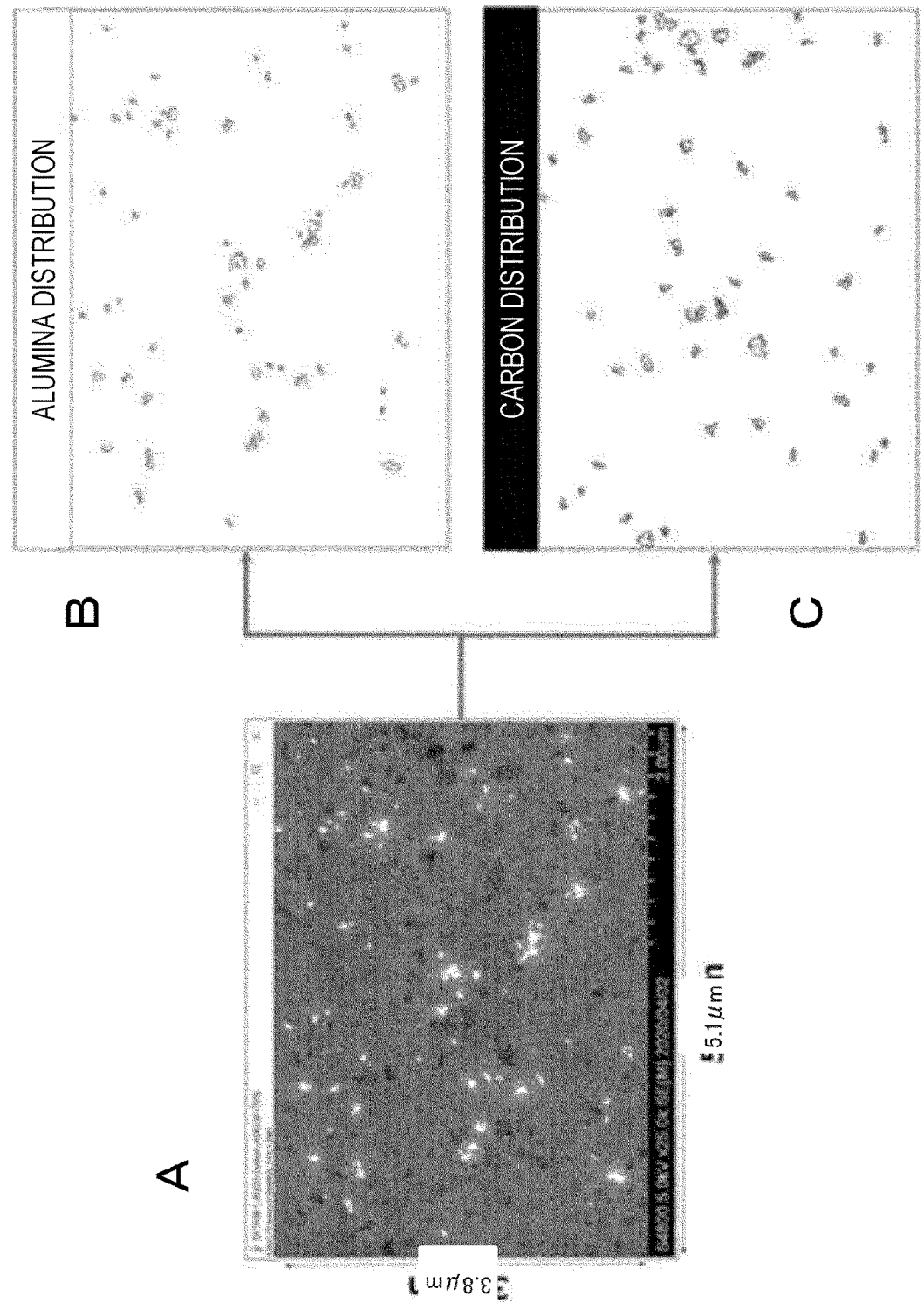
FIG. 10 is a view illustrating an example of an FE-SEM image of a surface of the magnetic layer.

The marking portion described above of the measurement sample described above is imaged using an FE-SEM under the FE-SEM measurement conditions described below to obtain an FE-SEM image. A of FIG. 10 is an example of the FE-SEM image. From the obtained FE-SEM image, the type of the particle forming the protrusion can be identified using a luminance difference due to a difference in a secondary electron emission amount of each of the first particle 51A and the second particle 52A. Image processing for the identification will be described later. In addition, the position of the protrusion formed by each of the first particle 51A and the second particle 52A in the FE-SEM image is identified.

<FE-SEM Measurement Condition>
  Measurement device: HITACHI S-4800 (manufactured by Hitachi High-Tech Corporation)
  Viewing angle: 5.1 μm×3.8 μm
  Acceleration voltage: 5 kV
  Measurement magnification: 25000 times The obtained FE-SEM image (A in FIG. 10) is binarized under each of the following two processing conditions using image processing software Image J. From the image obtained by the binarization processing, information on the number of protrusions is obtained for the first protrusions 51B and the second protrusions 52B formed by the first particles 51A and the second particles 52A, respectively. Note that in the binarization processing, the conditions are changed as follows for the second particle 52A having high luminance (white portion in A in FIG. 10) and the first particle 51A having low luminance (black portion in A in FIG. 10).

<Binarization Processing Condition for Obtaining Information Associated with First Particle>
  Software: Image J Ver 1.44 p
  Binarization threshold value: Threshold (0.65)
  Binarization target size: 0.002 μm-infinity <Binarization Processing Condition for Obtaining Information Associated with Second Particle>
  Software: Image J Ver 1.44 p
  Binarization threshold value: Threshold (220,255)
  Binarization target size: 0.001 μm-infinity B in FIG. 10 is an image obtained by binarizing the FE-SEM image of A in FIG. 10 under the binarization treatment condition of the second particles (alumina particles) 52A, that is, an image showing a position distribution of the second protrusions 52B formed by the second particles (alumina particles) 52A. The following information on the second particles 52A is obtained from the obtained image.

<Information Associated with Obtained Second Particle>
  Number of particles: 58

C in FIG. 10 is an image obtained by binarizing the FE-SEM image of A in FIG. 10 under the binarization treatment condition of the first particles (carbon black particles) 51A, that is, an image showing a position distribution of the first protrusions 51B formed by the first particles (carbon black particles) 51A. The following information on the first particles 51A is obtained from the obtained image.

<Information Associated with Obtained First Particle>
  Number of particles: 55

(3) Method of Correlating Height of Protrusion with Type of Particle Forming Protrusion The obtained AFM image and the FE-SEM image before the binarization processing are superimposed to obtain a synthesized image. Using the synthesized image, it is identified whether the particle forming each protrusion is the first particle 51A or the second particle 52A.

For example, FIG. C in FIG. 11 is a synthesized image in which the AFM image (FIG. B) and the FE-SEM image (FIG. A) are superimposed such that the positions of the respective corresponding protrusions coincide with each other. In the FE-SEM image before image composition (A in FIG. 11), different marks (white circles or white squares) are attached at the respective positions so that the position of the first protrusion 51B and the position of the second protrusion 52B determined by the binarization processing described above can be determined. Similarly, in the AFM image before image composition (B in FIG. 11), different marks (white circles or white squares) are attached at the respective positions so that the position of the first protrusion 51B and the position of the second protrusion 52B determined by the binarization processing described above can be determined. From the composite image (FIG. C) obtained by superimposing the AFM image (FIG. B) and the FE-SEM image (FIG. A) so that the positions of the respective corresponding protrusions coincide with each other, it is determined whether each protrusion includes any one of the first particles 51A and the second particles 52A. Note that, in B in FIG. 11, since the marking portion is measured at a viewing angle of 10 μm×10 μm by AFM, and thereafter, a portion without marking is measured at a viewing angle of 5 μm×5 μm, there is no marking in the image.

(4) Method of Measuring Height of Projection Using AFM

The heights of the twenty first protrusions 51B in the synthesized image are measured and the heights of the twenty second protrusions 52B are measured using AFM analysis software (Software version 5.12 Rev. B for Dimension 3100, manufactured by Veeco Instruments Inc.).

Figure 12:
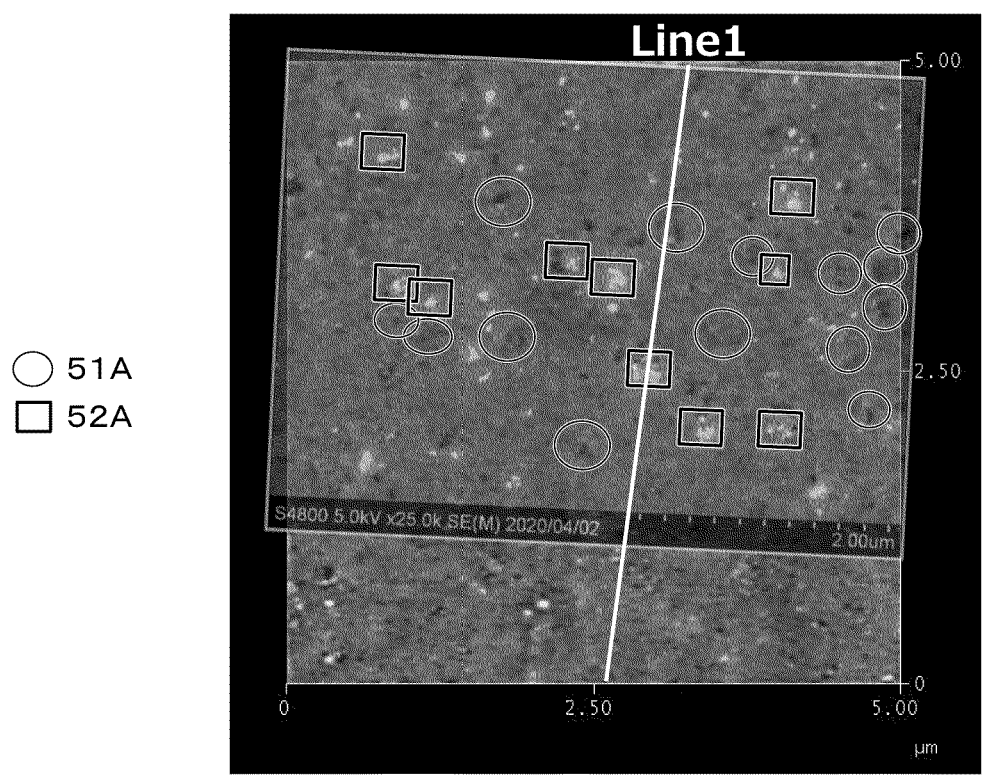
FIG. 12 is an enlarged view illustrating an example of the composite image in which the AFM image and the FE-SEM image are superimposed.
Figure 13:
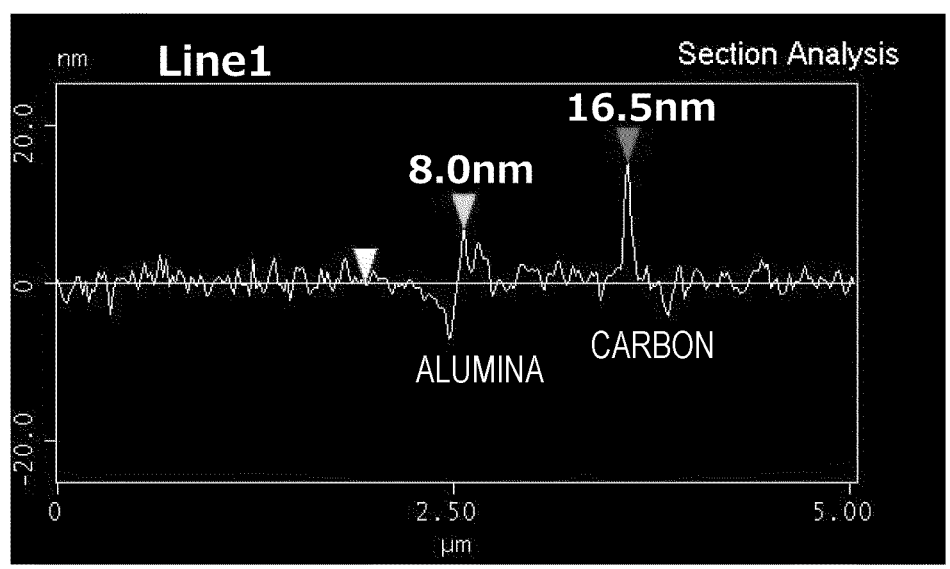
FIG. 13 is a view illustrating an example of a cross-sectional profile taken along a line 1 (Line 1) in FIG. 12.

For example, FIG. 12 is an enlarged view of the composite image in which the AFM image and the FE-SEM image are superimposed. FIG. 13 is a view illustrating an analysis result (measurement result of the protrusion height) by AFM for a line 1 (Line 1) set at an arbitrary position in FIG. 12. As illustrated in FIG. 13, the heights of the first protrusion 51B and the second protrusion 52B formed respectively by the first particles (carbon black particles) 51A and the second particles (alumina particles) 52A present on the line 1 can be identified. In this manner, the heights of the first protrusion 51B and the second protrusion 52B are identified from the synthesized image and the AFM analysis result.

For each of the first protrusion 51B and the second protrusion 52B, in a case where twenty or more protrusions can be specified in one field of view of AFM from one measurement sample, one field of view is measured by AFM. For each of the first protrusion 51B and the second protrusion 52B, in a case where the number of protrusions that can be identified in one field of view of AFM is less than 20, a plurality of (for example, 3 to 5) fields of view is measured from one measurement sample. Therefore, for each of the first protrusion 51B and the second protrusion 52B, twenty points specified as the first protrusion 51B and the second protrusion 52B by the binarization processing described above are secured. Note that in the case where the plurality of visual fields is measured from one measurement sample as described above, the plurality of visual fields is randomly selected from one measurement sample.

(5) Method of Calculating Average Height H1 of First Protrusion, Average Height H2 of Second Protrusion, and Average Height Ratio H1/H2 of Protrusion The heights of the twenty first protrusions 51B obtained as described above are simply averaged (arithmetically averaged) to determine an average value, which is defined as the average height H1 of the first protrusions. Similarly, the heights of the twenty second protrusions 52B obtained as described above are simply averaged (arithmetically averaged) to determine an average value, which is defined as the average height H2 of the second protrusions. Using the average height H1 of the first protrusions 51B and the average height H2 of the second protrusions 52B thus obtained, the protrusion average height ratio H1/H2 is calculated.

(Standard Deviation σPES of PES Value)

The standard deviation σPES of the PES value of the magnetic tape MT is preferably less than 50 nm within 40 FV number, more preferably 40 nm or less, still more preferably 30 nm or less, and particularly preferably 25 nm or less.

A position error signal (PES) indicates a deviation amount (error) of the reading position of the servo pattern in the width direction of the magnetic tape MT when the servo pattern is reproduced (read) by the recording/reproducing device. In order to accurately adjust the tension of the magnetic tape MT in the longitudinal direction, it is preferable that the linearity of the servo band when the servo pattern is read by the recording/reproducing device is as high as possible, that is, the standard deviation σPES of the PES value indicating the deviation amount of the reading position described above is as low as possible. When the standard deviation σPES of the PES value of the magnetic tape MT is a low value as described above, the linearity of the servo band is high, and the tension of the magnetic tape MT can be accurately adjusted. In addition, the standard deviation σPES is related to friction of the magnetic surface, and when the friction of the magnetic surface increases, the standard deviation σPES tends to increase.

Figure 14:
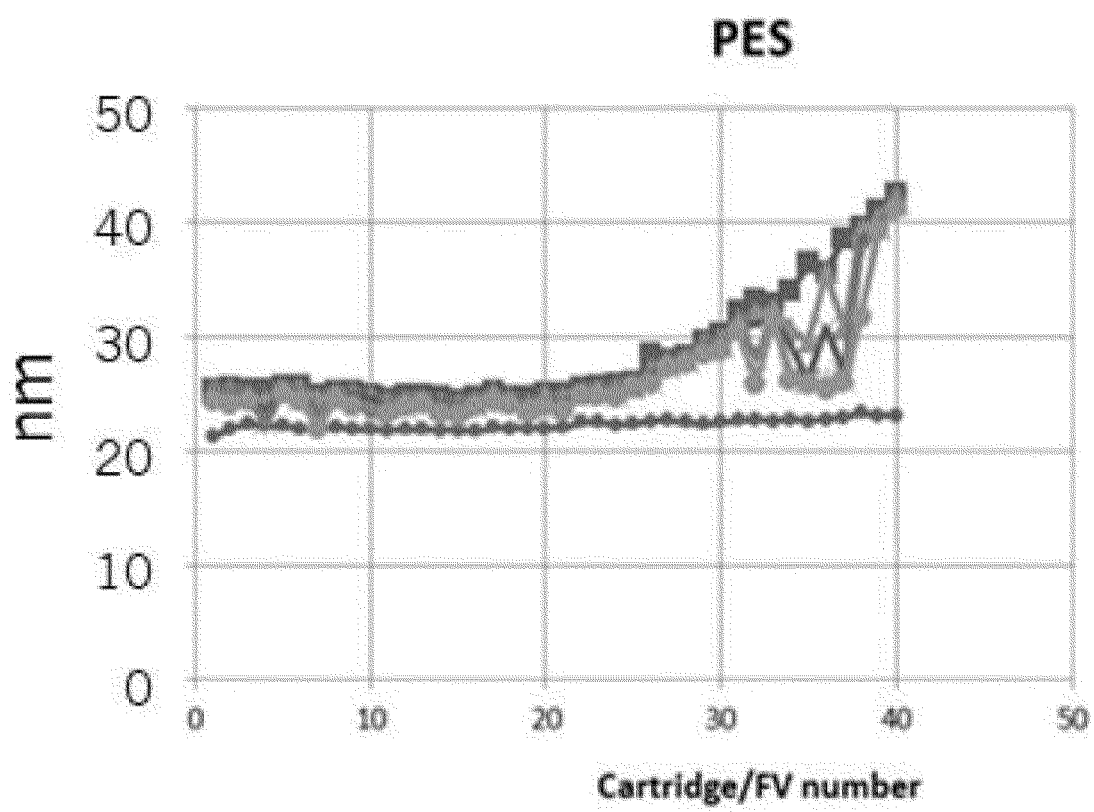
FIG. 14 is a graph illustrating a first example of a temporal change of a standard deviation σPES.
Figure 15:
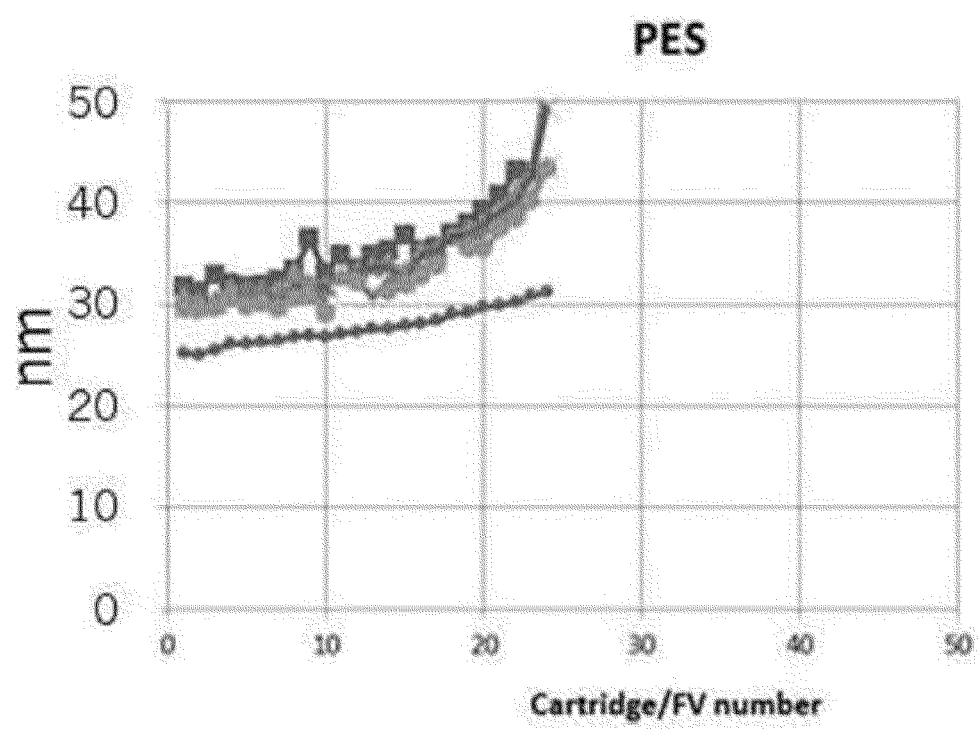
FIG. 15 is a graph illustrating a second example of the temporal change of the standard deviation σPES.

FIG. 14 is a view illustrating a first example of a temporal change of the standard deviation σPES of the PES value accompanying the travel of the magnetic tape MT. As illustrated in FIG. 14, when σPES is less than 50 nm within 40 FV number, no track displacement occurs. In addition, an increase in friction of the magnetic surface is suppressed and is kept substantially constant. FIG. 15 is a view illustrating a second example of the temporal change of the standard deviation σPES of the PES value accompanying the travel of the magnetic tape MT. As illustrated in FIG. 15, when σPES exceeds 50 nm within 40 FV number, track displacement frequently occurs, and thus travel of the magnetic tape MT stops. In addition, friction of the magnetic surface increases.

Figure 16:
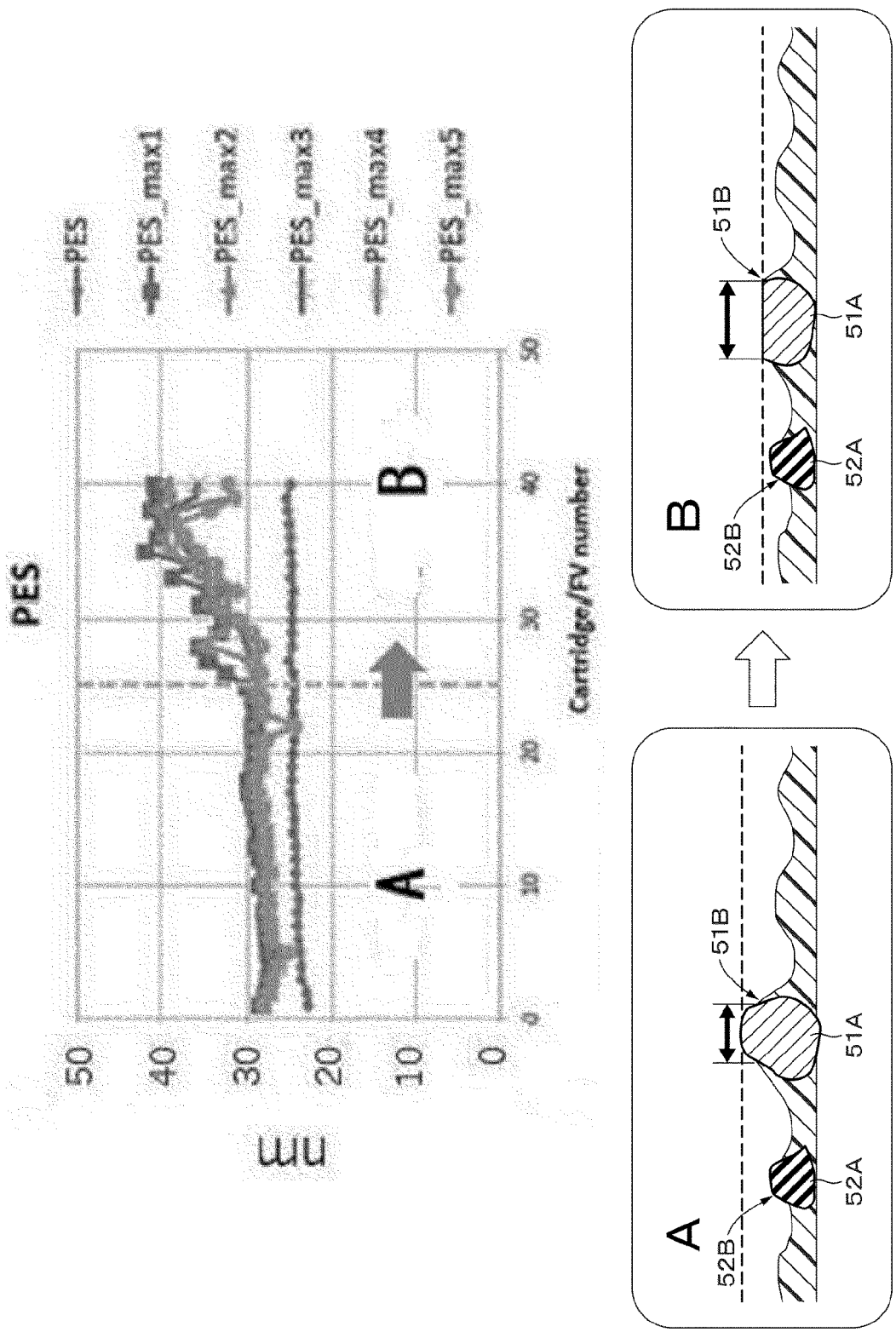
FIG. 16 is a graph illustrating a third example of the temporal change of the standard deviation σPES and a cross-sectional view schematically illustrating a change in a state of the second protrusion on the surface of the magnetic layer.

A top view in FIG. 16 is a view illustrating a third example of the temporal change of the standard deviation σPES accompanying the travel of the magnetic tape MT. The lower left view of FIG. 16 is a cross-sectional view schematically illustrating a relationship between the head unit 56 and the first protrusion 51B and the second protrusion 52B in a region A (frictional stability) where σPES in the top view described above is substantially constant. A broken line in the drawing is an imaginary line indicating a contact position between the first protrusion 51B and the surface of the head unit 56. The lower right view of FIG. 16 is a cross-sectional view schematically illustrating a relationship between the head unit 56 and the first protrusion 51B and the second protrusion 52B in a region B (friction increase) where σPES in the top view described above tends to increase. A broken line in the drawing is an imaginary line indicating a contact position between the first protrusion 51B and the surface of the head unit 56.

As illustrated in FIG. 16, it is presumed that the reason why the standard deviation σPES increases in the region B while the standard deviation σPES is substantially constant in the region A is that while the contact area between the first protrusions 51B and the surface of the head unit 56 is small and the friction is constant in the region A, the first particles 51A (carbon particles) are worn by the magnetic tape MT in the region B as the magnetic tape MT travels, the first protrusions 51B gradually collapse, the contact area between the first protrusions 51B and the surface of the head unit 56 increases, and the friction increases.

Figure 17:
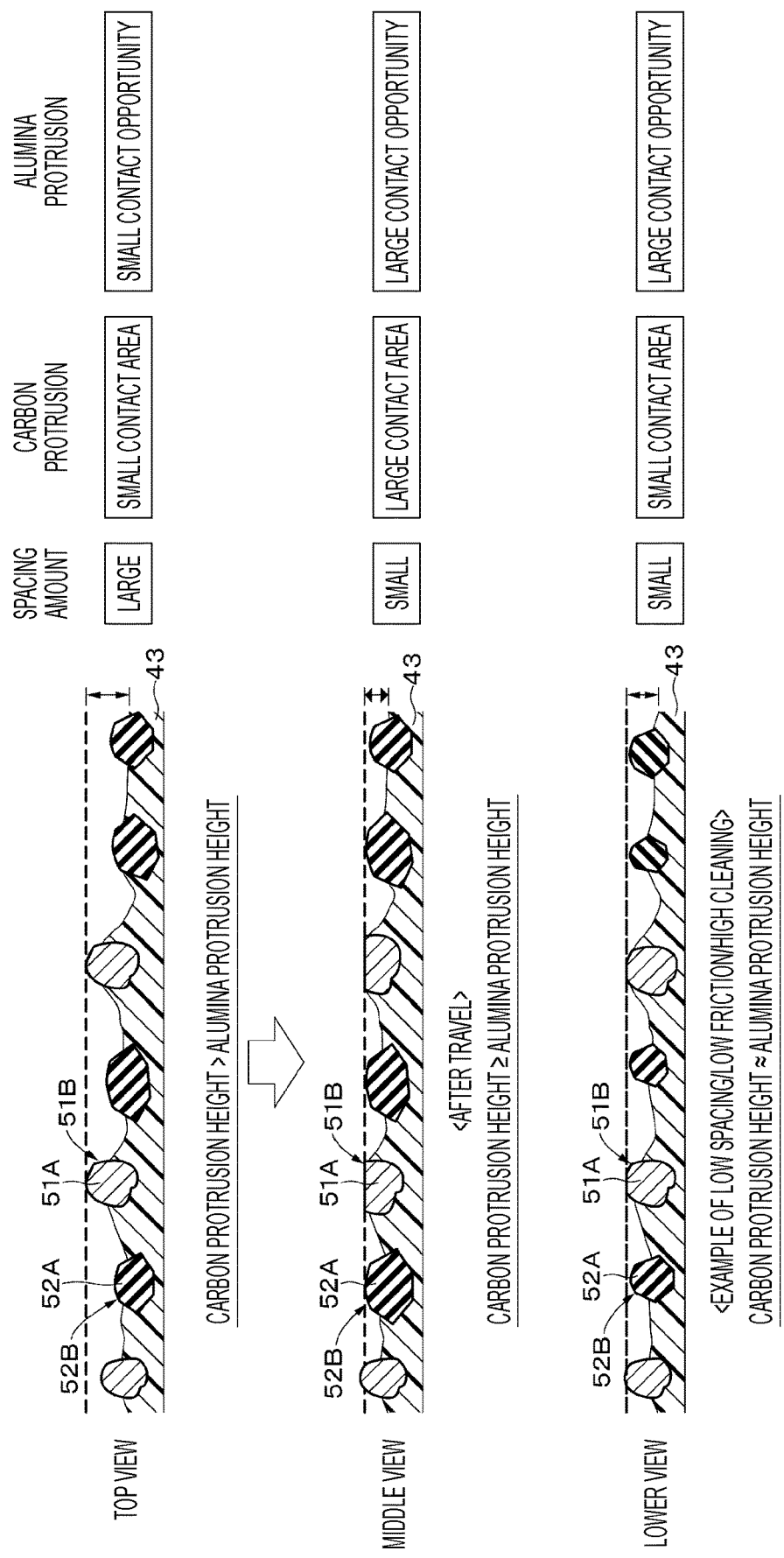
FIG. 17 is a view schematically illustrating a relationship between the first protrusion and the second protrusion, and a head unit. 10

FIG. 17 is a cross-sectional view schematically illustrating a relationship between the first protrusion 51B and the second protrusion 52B on the magnetic surface and the head unit 56. A broken line in FIG. 17 is an imaginary line indicating a contact position between the first protrusion 51B and the surface of the head unit 56 on the magnetic surface.

An upper view in FIG. 17 is a view schematically illustrating a relationship between the first protrusion 51B and the second protrusion 52B on the magnetic surface and the head unit 56 before the magnetic tape MT travels. As illustrated in the top view of FIG. 17, before the magnetic tape MT travels, it is presumed that the height of the first protrusion 51B is larger than the height of the second protrusion 52B, the spacing amount between the head unit 56 and the magnetic tape MT is large, the contact area between the first protrusion 51B and the head unit 56 is small, and, in addition, the contact opportunity between the second protrusion 52B and the head unit 56 is small.

A middle view in FIG. 17 is a view schematically illustrating a relationship between the first protrusion 51B and the second protrusion 52B and the head unit 56 after the magnetic tape MT travels. As illustrated in the middle view of FIG. 17, after the magnetic tape MT travels, it is presumed that the first protrusions 51B are gradually scraped by contact with the magnetic tape MT, the height of the first protrusion 51B becomes higher than or equal to the height of the second protrusion 52B, the spacing amount between the head unit 56 and the magnetic tape MT becomes small, the contact area between the first protrusion 51B and the head unit 56 becomes large, and, in addition, the contact opportunity between the second protrusions 52B and the head unit 56 becomes large. In this state, friction is high, and the standard deviation σPES is deteriorated.

A lower view in FIG. 17 is a view schematically illustrating a relationship between the first protrusion 51B and the second protrusion 52B in the present embodiment and the head unit 56. As illustrated in the lower view of FIG. 17, it is presumed that by setting the relationship between the heights of the first protrusion 51B and the second protrusion 52B to the shape in the present embodiment (concavoconvex shape with protrusion average height ratio H1/H2≤2.3), the contact area between the first protrusion 51B and the head unit 56 is reduced, and the contact opportunity between the second protrusion 52B and the head unit 56 is increased, so that wear of the first protrusion 51B due to travel of the magnetic tape MT is suppressed, and as a result, the increase in the standard deviation σPES is suppressed.

Figure 18:
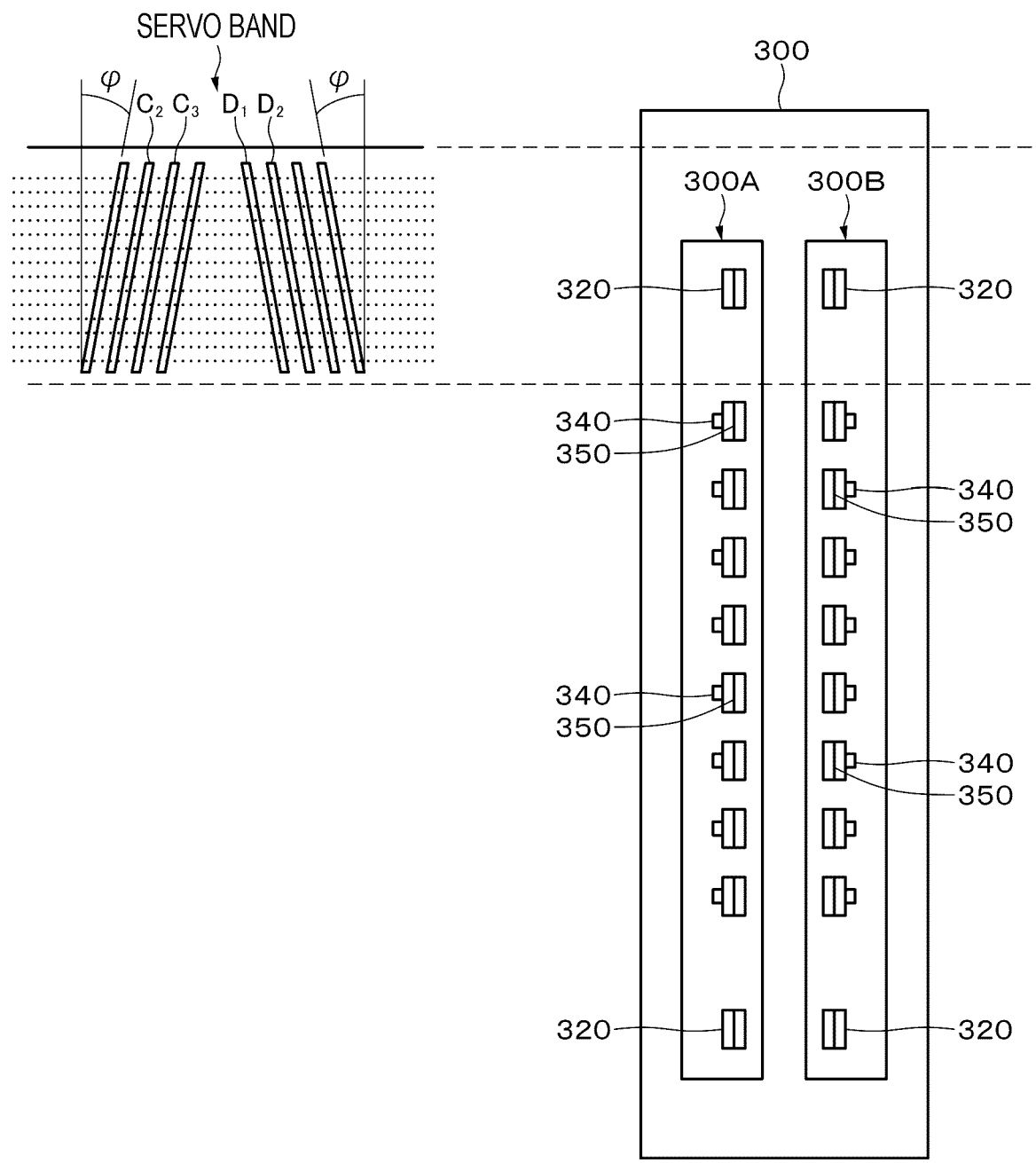
FIG. 18 is a view for explaining a method for measuring a PES.

Hereinafter, a method of measuring the standard deviation σPES will be described with reference to FIGS. 6 and 18. A PES value is measured to determine the standard deviation σPES. In order to measure the PES value, for example, a PES measurement head unit 300 illustrated in FIG. 18 is prepared. As the head unit 300, an LTO2 head (head conforming to the LTO2 standard) manufactured by Hewlett Packard Enterprise (HPE) is used. The head unit 300 includes two head sections 300A and 300B arranged side by side along the longitudinal direction of the magnetic tape MT. Each head section is provided with a plurality of recording heads 340 for recording data signals in the magnetic tape MT, a plurality of reproducing heads 350 for reproducing the data signal recorded in the magnetic tape MT, and a plurality of servo heads 320 for reproducing the servo signals recorded in the magnetic tape MT. Note that in a case where the head unit 300 is used only for measuring the PES value, the recording head 340 and the reproducing head 350 may not be included in the head unit.

First, a servo pattern in a predetermined servo band provided on the magnetic tape MT is reproduced (read) using the head unit 300. At this time, the servo head 320 of the head section 300A and the servo head 320 of the head section 300B sequentially face each servo pattern of a predetermined servo band, and these two servo heads 320 sequentially reproduce the servo pattern. At this time, a portion facing the servo head 320 in the servo pattern recorded on the magnetic tape MT is read and output as a servo signal.

As illustrated in FIG. 6, the value of the PES value for each head section is calculated for each servo frame by the following calculation formula.

[Math. 3]

$$PES\ [\mu m] = \frac{X\ [\mu m] - \begin{bmatrix} (B_{a1} - A_{a1}) + (B_{a2} - A_{a2}) + (B_{a3} - A_{a3}) + (B_{a4} - A_{a4}) + \\ (D_{a1} - C_{a1}) + (D_{a2} - C_{a2}) + (D_{a3} - C_{a3}) + (D_{a41} - C_{a4}) \\ (C_{a1} - A_{a1}) + (C_{a2} - A_{a2}) + (C_{a3} - A_{a3}) + (C_{a4} - A_{a4}) + \\ (A'_{a1} - C_{a1}) + (A'_{a2} - C_{a2}) + (A'_{a3} - C_{a3}) + (A'_{a4} - C_{a4}) \end{bmatrix} \times Y\ [\mu m]}{2 \times \tan\varphi}$$

Here, the center line illustrated in FIG. 6 is a center line of the servo band.

X [μm] is a distance between a servo pattern A1 and a servo pattern B1 on a center line illustrated in FIG. 6, and Y [μm] is a distance between the servo pattern A1 and a servo pattern C1 on the center line illustrated in FIG. 6. X and Y are obtained by developing the magnetic tape MT with a ferricolloid developer and using a universal tool microscope (TOPCON TUM-220ES) and a data processing device (TOPCON CA-1B).

Fifty servo frames are selected at arbitrary locations in the tape length direction, X and Y are obtained in each servo frame, and those obtained by simply averaging 50 pieces of data are taken as X and Y used in the calculation formula described above.

The difference ($B_{a1}-A_{a1}$) described above indicates a time [sec] on an actual path between the corresponding two servo patterns B1 and A1. Similarly, other difference terms also indicate the time [sec] on the actual path between the corresponding two servo patterns. These times are obtained from the time between the timing signals obtained from the waveform of the servo signal and the tape traveling speed. In the present specification, the actual path means a position where a servo signal reading head actually travels on the servo signal.

φ is an azimuth angle. φ is obtained by developing the magnetic tape MT with a ferricolloid developer and using a universal tool microscope (TOPCON TUM-220ES) and a data processing device (TOPCON CA-1B).

In the present technology, the standard deviation σPES of the PES value is calculated using a servo signal obtained by correcting the movement of the tape in the lateral direction. In addition, the servo signal is subjected to high pass filtering in order to reflect followability of the head. In the present technology, the standard deviation σPES is obtained by using a signal obtained by performing the above correction and the above high pass filtering on the servo signal, which is a so-called written in PESσ.

A method of measuring the standard deviation σPES of the PES value will be described below.

Figure 19:
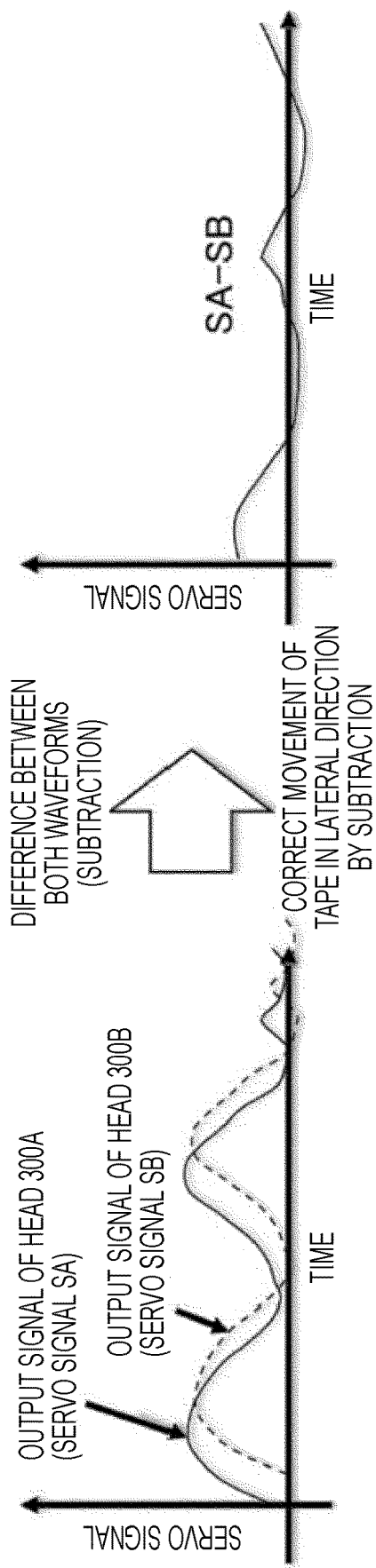
FIG. 19 is a graph for explaining correction of movement of the magnetic tape in a width direction.

First, the servo signal is read by the head unit 300 in an arbitrary range corresponding to 1 m of a data recording area of the magnetic tape MT. The signals acquired by the head sections 300A and 300B are subtracted as illustrated in FIG. 19 to obtain a servo signal in which the movement of the magnetic tape MT in the lateral direction is corrected. Then, high pass filtering is performed on the corrected servo signal. When the magnetic tape MT is actually caused to travel by a drive, a recording/reproducing head mounted on the drive moves in the width direction of the magnetic tape MT by an actuator so as to follow the servo signal. Since written in PESσ is a noise value after considering the followability of the head in the width direction, the high pass filtering described above is required. Therefore, the high pass filter is not particularly limited, and needs to be a function capable of reproducing width direction followability of the drive head. Using the signal obtained by the high pass filtering the value of the PES is calculated for each servo frame according to the above calculation formula. The standard deviation (written in PESσ) of the value of the PES calculated over the above 1 m is the standard deviation σPES of the PES value in the present technology.

(Height Range ΔH, Gradient Range ΔA)

A height range ΔH (see FIG. 28) obtained from statistical information (distribution) on the height of the concavoconvex shape on the magnetic surface is 3.00 nm≤ΔH≤6.00 nm, preferably 3.00 nm≤ΔH≤4.00 nm, and more preferably 3.00 nm≤ ΔH≤3.50 nm. When the height range ΔH meets ΔH<3.00 nm, the head unit 300 sticks to the magnetic tape MT, making it difficult for the magnetic tape MT to travel. On the other hand, when the height range ΔH meets 6.00 nm<ΔH, the electromagnetic conversion characteristics (for example, SNR) are deteriorated due to spacing loss.

A gradient range ΔA (see FIG. 28) obtained from statistical information (distribution) of a gradient of the concavoconvex shape on the magnetic surface is 4.00 degrees≤ΔA≤9.00 degrees. When the gradient range ΔA meets ΔA<4.00 degrees, the gradient of the protrusion (protrusion including the first protrusion 51B, the second protrusion 52B, and the like) on the magnetic surface becomes too smooth, and the friction increases. Therefore, the standard deviation σPES of the PES value increases. On the other hand, when the gradient range ΔA meets 9.00 degrees<ΔA, the gradient of the protrusion (protrusion including the first protrusion 51B, the second protrusion 52B, and the like) on the magnetic surface becomes too steep, and the protrusion is scraped when the magnetic tape MT travels, so that powder is dropped.

A method of calculating the height range ΔH and the gradient range ΔA will be described in the following order.
(1) Surface profile measurement (AFM)
(2) Calculation of relative height at each point
(3) Calculation of gradient at each point
(4) Statistical processing of height and gradient data
(5) Calculation of height range ΔH
(6) Calculation of gradient range ΔA (1) Surface Profile Measurement (AFM)

By measuring a two-dimensional surface profile of the magnetic surface of the magnetic tape MT, a numerical data matrix having a height Z (L, W) is obtained from the two-dimensional surface profile image after the filter action. Note that the measurement conditions are as follows.

Measurement device: AFM (device name: Nanoscope Dimension 3100 manufactured by Digital Instruments)
Measurement range: 10 μm×10 μm
Number of measurement points: 256 points×256 points
Scan rate: 1 Hz
Filter condition: [Flatten] order 2
[Plane Fit] not Performed FIG. 20A is a view illustrating an example of a two-dimensional surface profile image after filter action. FIG. 20B is a view illustrating an example of a numerical data matrix of the height ζ (L, W) at each point (L, W). The coordinate L indicates a coordinate in the longitudinal direction of the magnetic tape MT, and the coordinate W indicates a coordinate in the width direction of the magnetic tape MT. In each cell of the numerical data matrix, the height ζ (L, W) at each point (L, W) is described. In the example illustrated in FIG. 20B, for example, the height ζ (1, 3) at the measurement point (1, 3) is "0.50". The number of pieces of numerical data (that is, the height ζ (L, W)) is 256×256=65,536 in total.

(2) Calculation of Relative Height at Each Point

From the numerical data matrix of the height ζ (L, W), a relative height Z (L, W) (hereinafter, simply referred to as "height Z (L, W)") at each point (L, W) is calculated to obtain a numerical data matrix of the height Z (L, W). Specifically, the height Z (L, W) at each point (L, W) is obtained as follows. That is, all the heights ζ (L, W) are simply averaged (arithmetically averaged) to obtain an average value, which is defined as an average center height ζave. Then, the height ζ (L, W) at each point (L, W) is converted into a relative height based on the average center height ζave, and the height Z (L, W) at each point (L, W) is obtained. A method of calculating the height Z (L, W) is as follows. FIG. 21 is a view illustrating an example of a numerical data matrix of the height Z (L, W).

$$\zeta_{ave} = \frac{\sum_{W=1}^{256}\sum_{L=1}^{256}\zeta(L, W)}{256 \times 256}$$ [Math. 4]

$$Z(L, W) = \zeta(L, W) - \zeta_{ave}$$ [Math. 5]

(3) Calculation of Gradient at Each Point

FIG. 22 is a view for explaining a method of calculating gradients $G_L$ (L, W) and $G_W$ (L, W) at each point (L, W). Here, the gradient $G_L$ (L, W) indicates a gradient in the longitudinal direction of the magnetic tape MT, and the gradient $G_W$ (L, W) indicates a gradient in the width direction of the magnetic tape MT.

From the numerical data matrix of the height Z (L, W), the gradients $G_L$ (L, W) and $G_W$ (L, W) in two directions are calculated at each point (L, W) to obtain the numerical data matrix of each of the gradients $G_L$ (L, W) and $G_W$ (L, W). FIG. 23A is a view illustrating an example of the numerical data matrix of the gradient $G_L$ (L, W). FIG. 23B is a view illustrating an example of the numerical data matrix of the gradient $G_W$ (L, W).

The gradient $G_L$ (L, W) is calculated as follows. The gradient $G_L$ (L, W) is calculated using the height $\zeta$ (L, W) at a certain point (L, W) and a height $\zeta$ (L+1, W) at a point (L+1, W) adjacent to the point (L, W) in the longitudinal direction of the magnetic tape MT. As illustrated in FIG. 22, for example, a gradient $G_L$ (2, 2) is calculated using a height $\zeta$ (2, 2) (=0.30) of a point (2, 2) and a height $\zeta$ (3, 2) (=0.10) of a point (3, 2).

The gradient $G_W$ (L, W) is calculated as follows. The gradient $G_W$ (L, W) is calculated using the height $\zeta$ (L, W) at a certain point (L, W) and a height $\zeta$ (L, W+1) at a point (L, W+1) adjacent to the point (L, W) in the width direction of the magnetic tape MT. As illustrated in FIG. 22, for example, a gradient $G_W$ (2, 2) is calculated using the height $\zeta$ (2, 2) (=0.30) of the point (2, 2) and a height $\zeta$ (2, 3) (=0.10) of a point (2, 3).

As described above, the "adjacent point" used in the calculation of the $G_L$ (L, W) at each point (L, W) is a point (L+1, W). An adjacent point in the opposite direction, i.e. a point (L−1, W), should not be used. Similarly, the "adjacent point" used in the calculation of the $G_W$ (L, W) at each point (L, W) is a point (L, W+1). An adjacent point in the opposite direction, i.e. a point (L, W−1), should not be used.

As illustrated in FIG. 22, a gradient $G_L$ (256, W) cannot be calculated at each point (256, W) of L=256 (that is, the rightmost column in FIG. 22) of the numerical data matrix. Thus, as illustrated in FIG. 23A, in the numerical data matrix of the gradient $G_L$ (L, W), each point (256, W) of L=256 has no value. On the other hand, as illustrated in FIG. 22, a gradient $G_W$ (L, 256) cannot be calculated at each point (L, 256) of W=256 (that is, the lowest row in FIG. 22) of the numerical data matrix. Thus, as illustrated in FIG. 23B, in the numerical data matrix of the gradient $G_W$ (L, W), each point (L, 256) of W=256 has no value.

However, as illustrated in FIG. 22, since neither a gradient $G_L$ (256, 256) nor a gradient $G_W$ (256, 256) can be calculated at the point (L, W) of L=256 and W=256 (most bottom-right column and bottom row) of the numerical data matrix, the point (256, 256) has neither the gradient $G_L$ (256, 256) nor the gradient $G_W$ (256, 256).

FIG. 24A is a view illustrating a method of calculating the gradient $G_L$ (L, W). FIG. 24B is a view illustrating a method of calculating the gradient $G_W$ (L, W). A method of calculating the gradients $G_L$ (L, W) and $G_W$ (L, W) is expressed as follows.

$$G_L(L, W)[°] = \tan^{-1}\left(\frac{|\zeta(L+1, W) - \zeta(L, W)|}{39.0625}\right) \quad \text{[Math. 6]}$$

$$G_W(L, W)[°] = \tan^{-1}\left(\frac{|\zeta(L, W+1) - \zeta(L, W)|}{39.0625}\right) \quad \text{[Math. 7]}$$

(4) Statistical Processing of Height and Gradient Data

Figure 25:
FIG. 25 is a view for explaining statistical processing of data of the relative height Z (L, W) and the gradient $G_L$ (L, W).
Figure 26:
FIG. 26 is a view for explaining statistical processing of data of the relative height Z (L, W) and the gradient $G_W$ (L, W).
Figure 27:
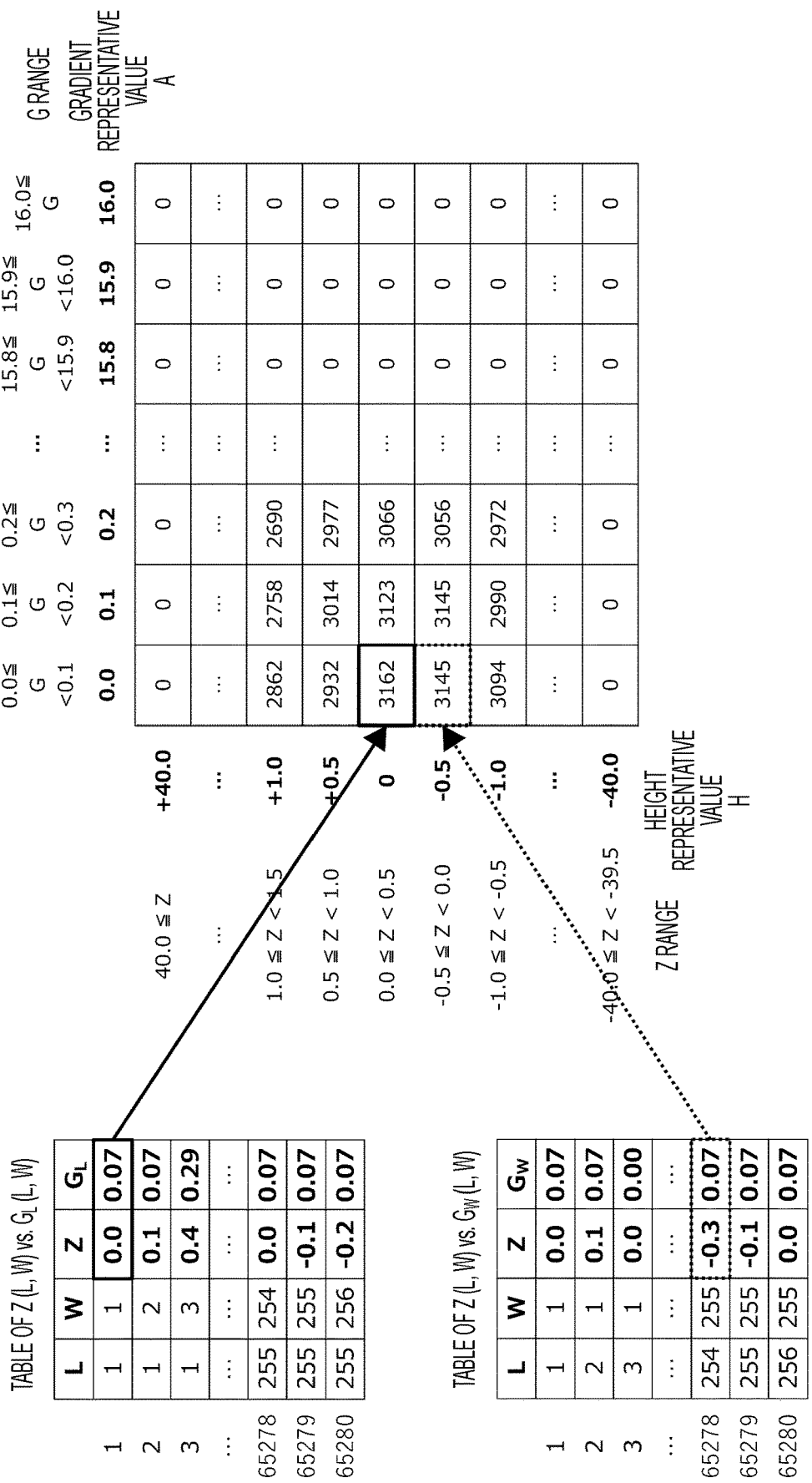
FIG. 27 is a view for explaining statistical processing of data of the relative height Z (L, W), the gradient $G_L$ (L, W) and the gradient $G_W$ (L, W).

FIGS. 25, 26, and 27 are views for explaining statistical processing of data of the height Z (L, W), the gradient $G_L$ (L, W), and the gradient $G_W$ (L, W).

The numerical data matrix of the height Z (L, W) and the gradient $G_L$ (L, W) obtained as described above is organized, and a table (see FIG. 25) showing the relationship between the height Z (L, W) and the gradient $G_L$ (L, W) is created. However, since there is no gradient $G_L$ (256, W), the total number of data in the created table is 255× 256=65,280.

Moreover, the numerical data matrix of the height Z (L, W) and the gradient $G_W$ (L, W) is organized, and a table (see FIG. 26) showing the relationship between the height Z (L, W) and the gradient $G_W$ (L, W) is created. However, since there is no $G_W$ (L, 256), the total number of data in the created table is 256×255=65,280.

All the data (that is, 130,560 pieces=65,280+65,280) of the two created tables are aggregated to create a numerical data matrix of the number of data M (H, A) as illustrated in FIG. 27. The total number of data is 130,560 when all the numerical values of the cells of the numerical data matrix of the number of data M (H, A) are added.

In FIG. 27, the range of the height Z (L, W) and the representative value H thereof are described to be arranged in a column of the numerical data matrix of the number of data M (H, A). In addition, the range of the gradient G (L, W) and the representative value A thereof are described to be arranged in a row of the numerical data matrix of the number of data M (H, A). Note that in a case where the gradient $G_L$ (L, W) and the gradient $G_W$ (L, W) are not particularly distinguished, the gradient $G_L$ (L, W) and the gradient $G_W$ (L, W) are collectively referred to as a gradient G (L, W).

The numerical value (see FIG. 27) of each cell of the numerical data matrix of the number of data M (H, A) indicates the number of data M (H, A) corresponding to a range of a specified height Z (L, W) and corresponding to a range of a specified gradient G (L, W) (specifically, the gradient $G_L$ (L, W) or the gradient $G_W$ (L, W)). For example, data in a first row of a table of Z (L, W) vs. $G_L$ (L, W) is counted in a (H, A)=(0.0, 0.00) cell in M (H, A). In addition, the 65278-th data in the table of Z (L, W) vs. $G_W$ (L, W) is counted in a (H, A)=(−0.5, 0.00) cell in M (H, A).

Figure 28:
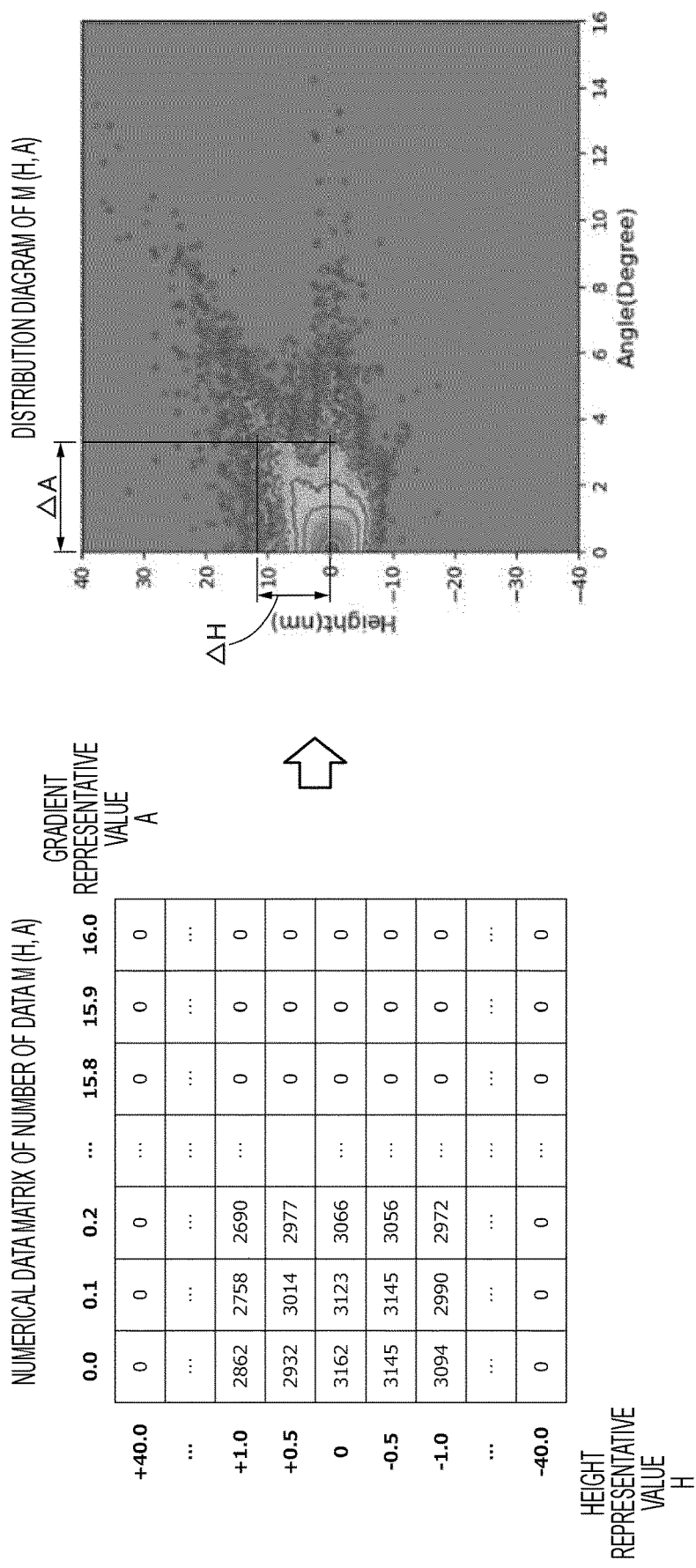
FIG. 28 is a view for explaining a procedure of creating a distribution diagram from a numerical data matrix of the number of data M (H, A).

When the numerical data matrix M (H, A) (see FIG. 27) obtained as described above is drawn as a distribution diagram with the horizontal axis A and the vertical axis H, FIG. 28 is obtained.

(5) Calculation of Height Range ΔH

Figures 29, 30:
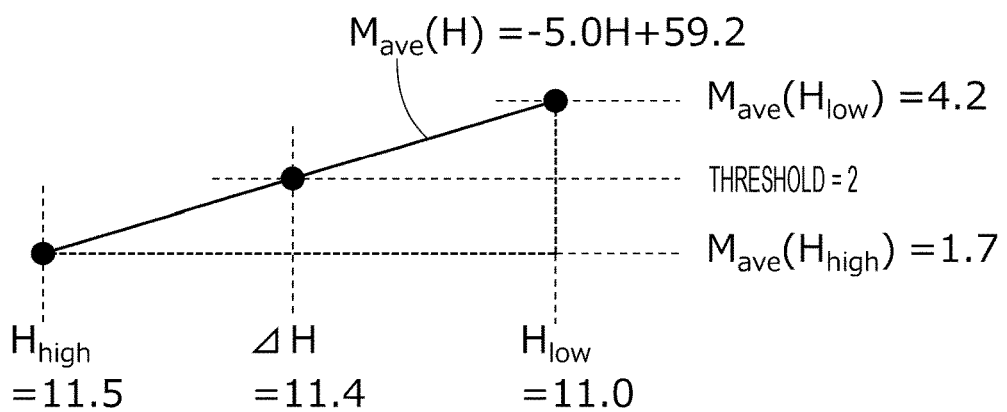
FIG. 29 is a view for explaining a method of calculating a height range ΔH.
FIG. 30 is a view for explaining a method of calculating the height range ΔH.

FIGS. 29 and 30 are views for explaining a method of calculating the height range ΔH. When the height range ΔH is calculated, only the components (cells) in ranges of 0≤H and 0.00≤A≤1.20 are used in the numerical data matrix of the number of data M (H, A). The reason why only the component in the range of 0≤H is used for the height H is to consider only a protrusion of the magnetic surface. That is, this is because it is considered that a recess of the magnetic surface does not affect the electromagnetic conversion characteristics and the friction. On the other hand, the reason why only the components in the range of 0.00≤A≤1.20 are used for the gradient A is that it is considered that it is sufficient to define an approximate outline of the distribution (see FIG. 28) if even this range is used for calculation.

As illustrated in FIG. 29, an average value in each row (height H) of the numerical data matrix of the number of data M (H, A) is defined as $M_{ave}$ (H), and the calculation is sequentially performed from an average value $M_{ave}$ (0) toward an average value $M_{ave}$ (40.0). However, for the calculation of the average value $M_{ave}$ (H), only the components of the column (angle A) in the range of 0.00≤A≤1.20 are used for the column (angle A).

The height H when the average value $M_{ave}$ (H) falls below the threshold (however, the threshold is set to "2") for the first time is defined as a height $H_{high}$, and the average value $M_{ave}$ (H) at that time is defined as an average value $M_{ave}$ ($H_{high}$). Moreover, the previous height H is defined as a height How, and the average value $M_{ave}$ (H) at that time is defined as an average value $M_{ave}$ ($H_{low}$). When the threshold is set to "1", reproducibility is deteriorated. That is, an accidental factor greatly affects. Therefore, "2", which is the least frequency at which reproducibility can be secured, is defined as the threshold.

In the example of FIG. 29, the height $H_{high}$, the average value $M_{ave}$ ($H_{high}$), the height $H_{low}$, and the average value $M_{ave}$ ($H_{low}$) are as follows.

$$H_{high} = 11.5, M_{ave}(H_{high}) = 1.9$$

$$H_{low} = 11.0, M_{ave}(H_{low}) = 4.2$$

As illustrated in FIG. 30, using the four values described above, the height H when $M_{ave}$ (H)=threshold=2 is calculated and defined as a height range ΔH. Note that when the height H is calculated, linear approximation between two points is used.

(6) Calculation of Gradient Range ΔA

Figures 31, 32:
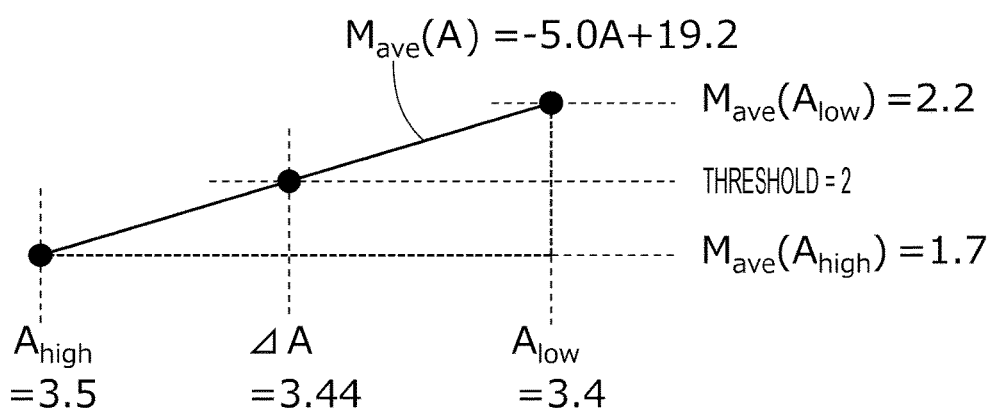
FIG. 31 is a view for explaining a method of calculating a gradient range ΔA.
FIG. 32 is a view for explaining the method of calculating the gradient range ΔA.

FIGS. 31 and 32 are views for explaining the method of calculating the gradient range ΔA. When the gradient range ΔA is calculated, only the components (cells) in ranges of 0≤H≤ΔH and 0.00≤A≤16.00 are used in the numerical data matrix of the number of data M (H, A). As ΔH, a value obtained in "(5) Calculation of height range ΔH" described above is used. The reason why only components in the range of 0.00≤A≤16.00 are used for the gradient A is that normally, the gradient A is 0.00≤A≤16.00, and it is considered that it is sufficient to use even this range for calculation.

As illustrated in FIG. 31, an average value of M (H, A) in each column (angle A) of the numerical data matrix of the number of data M (H, A) is defined as $M_{ave}$ (A), and the calculation is sequentially performed from the average value $M_{ave}$ (0) toward an average value $M_{ave}$ (16.00). However, for the calculation of the average value $M_{ave}$ (A), only the components of the row (height H) in a range of 0.00≤H≤ΔH are used for the row (height H).

In a case where the height range ΔH is not a multiple of 0.5, the components of the row (height H) in the range up to the height $H_{low}$ used in the calculation of the height range ΔH are used in the calculation of the average value $M_{ave}$ (A). For example, as illustrated in FIG. 31, in such a case where the height range ΔH exists between 11.0 and 11.5, the components of the rows (height H) in a range of 0.00≤ H≤11.0 are used.

When the average value $M_{ave}$ (A) falls below the threshold (however, the threshold is set to "2") for the first time, A is defined as $A_{high}$, and the average value $M_{ave}$ (A) at that time is defined as an average value $M_{ave}$ ($A_{high}$). Moreover, the previous angle A is defined as an angle $A_{low}$, and the average value $M_{ave}$ (A) at that time is defined as an average value $M_{ave}$ ($A_{low}$). The reason why the threshold of the average value $M_{ave}$ (A) is set to "2" is similar to the reason why the threshold of the average value $M_{ave}$ (H) is set to "2".

In the example of FIG. 31, $A_{high}$, $M_{ave}$ ($A_{high}$), $A_{low}$, and $M_{ave}$ ($A_{low}$) are as follows.

$$A_{high} = 3.5, M_{ave}(A_{high}) = 1.9$$

$$A_{low} = 3.4, M_{ave}(A_{low}) = 2.2$$

As illustrated in FIG. 32, using the four values described above, the angle A when $M_{ave}$ (A)=threshold=2 is calculated and defined as a gradient range ΔA. Note that when the angle A is calculated, the linear approximation between two points is used.

[4 Method of Manufacturing Magnetic Tape]

Next, an example of a method of manufacturing the magnetic tape MT having the configuration described above will be described.

(Step of Preparing Paint)

First, nonmagnetic particles, a binder, and the like are kneaded and dispersed in a solvent, to prepare an underlayer forming coating material. Next, the magnetic particles, the first particles 51A, the second particles 52A, the binder, and the like are kneaded and dispersed in the solvent to prepare a magnetic layer forming coating material. For the preparation of the magnetic layer forming coating material and the underlayer forming coating material, for example, the following solvents, dispersing device, and kneading device can be used.

Examples of the solvent used for the paint preparation described above include, for example, ketone solvents such as acetone, methyl ethyl ketone, methyl isobutyl ketone, and cyclohexanone, alcohol solvents such as methanol, ethanol, and propanol, ester solvents such as methyl acetate, ethyl acetate, butyl acetate, propyl acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, halogenated hydrocarbon solvents such as methylene chloride, ethylene chloride, carbon tetrachloride, chloroform, and chlorobenzene. They may be used alone, or they may be mixed appropriately.

As the kneading device used for the paint preparation described above, for example, kneading devices such as a continuous two-axis kneader, a continuous two-axis kneader capable of diluting in multiple stages, a kneader, a pressure kneader, and a roll kneader may be used, but this is not especially limited to such devices. Furthermore, as the dispersing device used for the paint preparation described above, for example, dispersing devices such as a roll mill, a ball mill, a horizontal sand mill, a vertical sand mill, a spike mill, a pin mill, a tower mill, a pearl mill (for example, "DCP mill" manufactured by Eirich Co., Ltd. and the like), a homogenizer, and an acoustic wave dispersing device may be used, but it is not especially limited to these devices.

(Applying Step)

Next, the underlayer forming coating material is applied to one main surface of the base 41 and dried to form the underlayer 42. Subsequently, the magnetic layer forming coating material is applied onto the underlayer 42 and dried to form the magnetic layer 43 on the underlayer 42. Note that, at the time of drying, magnetic particles are magnetically oriented in the thickness direction of the base 41 by, for example, a solenoid coil. Furthermore, at the time of drying, it is also possible to perform the magnetic field orientation of the magnetic particles in the thickness direction of the base 41 after the magnetic field orientation in the traveling direction (longitudinal direction) of the base 41 by, for example, the solenoid coil. By performing the treatment of temporarily orienting the magnetic particles in the longitudinal direction as described above, the degree of perpendicular orientation (that is, the square ratio S1) of the magnetic particles can be further improved. After the magnetic layer 43 is formed, the back layer 44 is formed on the other principal plane of the base 41. Therefore, the magnetic tape MT is obtained.

The square ratios S1 and S2 are, for example, set to desired values by adjusting strength of the magnetic field applied to the coating of the magnetic layer forming coating material, concentration of a solid content in the magnetic layer forming coating material, and a drying condition of the coating of the magnetic layer forming coating material (drying temperature and drying time). The strength of the magnetic field applied to the coating is preferably twice or larger and three times or smaller of the coercive force of the magnetic particles. In order to further increase the square ratio S1 (that is, to further decrease the square ratio S2), it is preferable to improve the dispersion state of the magnetic particles in the magnetic layer forming coating material. Furthermore, in order to further increase the square ratio S1, it is also effective to magnetize the magnetic particles at a stage before the magnetic layer forming coating material enters an orienting device for performing the magnetic field orientation of the magnetic particles. Note that, the methods of adjusting the square ratios S1 and S2 described above may be used alone, or two or more methods may be used in combination.

(Curing Step)

Next, after the magnetic tape MT is wound into a roll shape, the magnetic tape MT is heated in this state to cure the underlayer 42 and the magnetic layer 43.

(Calendering Step)

Next, the obtained magnetic tape MT is subjected to calender treatment to smooth the magnetic surface.

(Surface Treatment Step)

Next, if necessary, the magnetic surface may be ground using, for example, a prism or the like, and the average height H1 of the first protrusion 51B, the average height H2 of the second protrusion 52B, the average height ratio H1/H2 of the protrusion, the height range ΔH, and the gradient range ΔA on the magnetic surface may be adjusted.

(Demagnetization Step and Servo Pattern Writing Step)

Next, after demagnetization of the magnetic tape MT is performed as necessary, the servo pattern may be written on the magnetic tape MT.

(Cutting Step)

Next, the magnetic tape MT is cut into a predetermined width (for example, ½ inch width). Thus, the magnetic tape MT is obtained.

(Adjustment of Average Height H1 of First Protrusion, Average Height H2 of Second Protrusion, Average Height Ratio H1/H2 of Protrusion, Height Range ΔA, and Gradient Range ΔA)

The adjustment of the average height H1 of the first protrusion, the average height H2 of the second protrusion, the average height ratio H1/H2 of the protrusion, the height range ΔH, and the gradient range ΔA can be set to prescribed values, for example, by adjusting at least one selected from the group consisting of (1) the sizes and blending amounts of the first particles 51A and the second particles 52A blended in a magnetic layer forming coating material, (2) the blending amount of the binder blended in the magnetic layer forming coating material, (3) the conditions (temperature and pressure) of the calender treatment, and (4) the surface treatment step described above.

[5 Operation and Effect]

As described above, in the magnetic tape MT according to one embodiment, the magnetic layer 43 has a concavoconvex shape on the magnetic surface, and the concavoconvex shape includes the first protrusion 51B including the first particles 51A and the second protrusion 52B including the second particles 52A. The ratio H1/H2 of the average height H1 of the first protrusion 51B and the average height H2 of the second protrusion 52B meets H1/H2≤2.3, the height range ΔH is 3.00 nm≤ΔH≤6.00 nm, and the gradient range ΔA is 4.00 degrees≤ΔA≤9.00 degrees. This makes it possible to ensure good electromagnetic conversion characteristics while suppressing the increase in the standard deviation σPES of the PES value.

[6 Modification]

In one embodiment described above, a case where the magnetic tape cartridge is the one-reel type cartridge 10 has been described; however, the magnetic tape cartridge may be a two-reel type cartridge.

Figure 33:
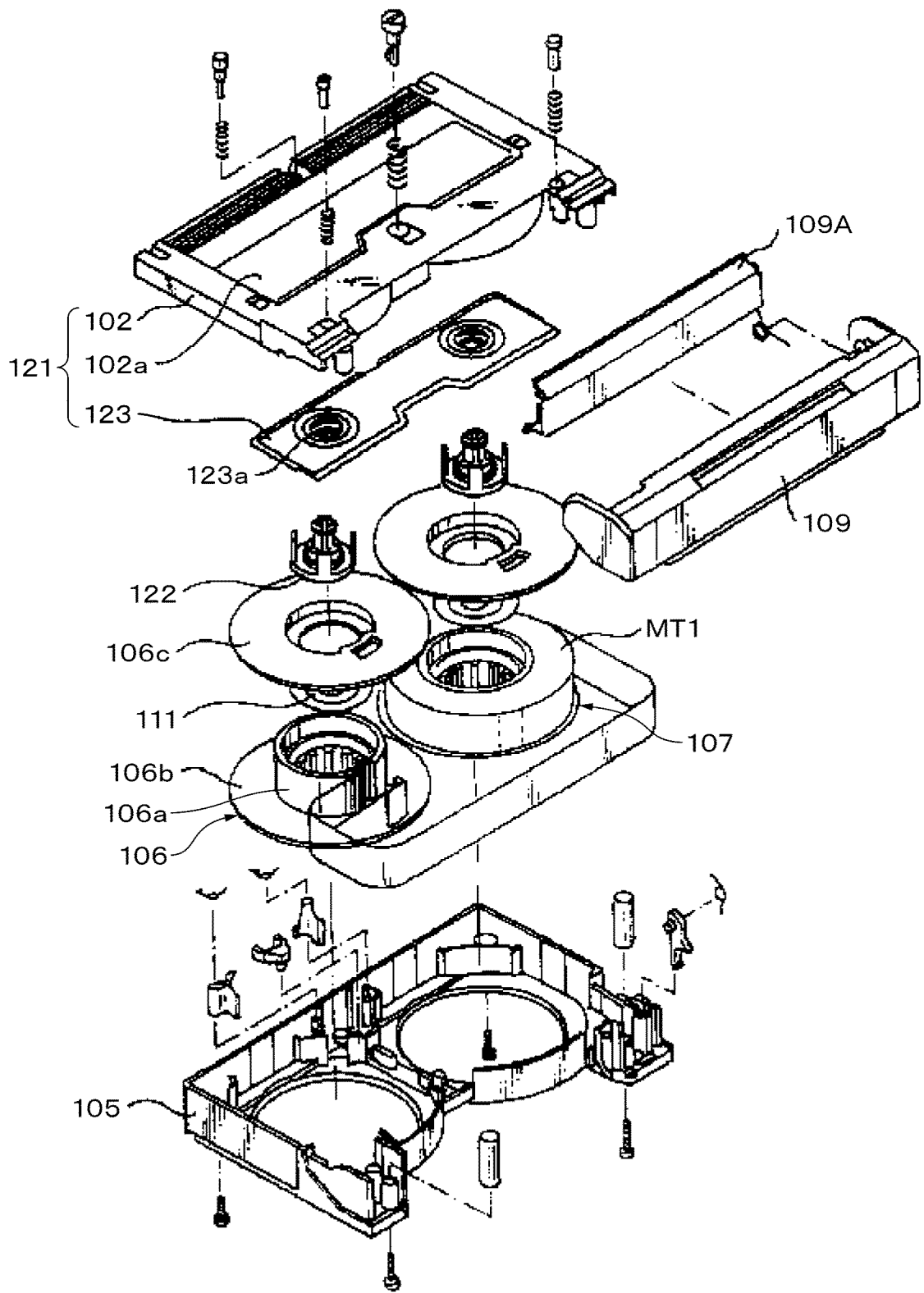
FIG. 33 is an exploded perspective view illustrating an example of a configuration of a cartridge according to a modification of an embodiment of the present disclosure.

FIG. 33 is an exploded perspective view illustrating an example of a configuration of a two-reel type cartridge 121. The cartridge 121 includes an upper half 102 including a synthetic resin, a transparent window member 123 fitted and fixed to a window portion 102a opened in an upper surface of the upper half 102, a reel holder 122 fixed to an inner side of the upper half 102 and preventing uplift of reels 106 and 107, a lower half 105 corresponding to the upper half 102, the reels 106 and 107 stored in a space formed by combining the upper half 102 and the lower half 105, a magnetic tape MT wound around the reels 106 and 107, a front lid 109 closing a front side opening formed by combining the upper half 102 and the lower half 105, and a back lid 109A protecting the magnetic tape MT exposed at the front side opening.

The reels 106 and 107 are for winding the magnetic tape MT. The reel 106 includes a lower flange 106b having a cylindrical hub portion 106a around which the magnetic tape MT is wound in a central portion, an upper flange 106c having substantially the same size as the lower flange 106b, and a reel plate 111 interposed between the hub portion 106a and the upper flange 106c. The reel 107 has a configuration similar to that of the reel 106.

The window member 123 is provided with attachment holes 123a at positions corresponding to the reels 106 and 107, respectively, for assembling the reel holder 122 as a reel holding unit for preventing the reels from being lifted up. The magnetic tape MT is similar to the magnetic tape MT in the first embodiment.

EXAMPLES

Hereinafter, the present disclosure will be specifically described with reference to examples, but the present disclosure is not limited to these examples.

In the following Examples and Comparative Examples, the average aspect ratio of the magnetic particles, the average particle volume of the magnetic particles, the average height H1 of the first protrusion, the average height H2 of the second protrusion, the average height ratio H1/H2 of the protrusion, the height range ΔH, the gradient range ΔA, the average thickness of the magnetic tape, the average thickness of the magnetic layer, the average thickness of the underlayer, the average thickness of the back layer, the square ratio S1 of the magnetic layer in the vertical direction of the magnetic tape, and the square ratio S2 of the magnetic layer in the longitudinal direction of the magnetic tape are values determined by the measurement method described in one embodiment described above.

In the following Examples and Comparative Examples, the average height H1 of the first protrusion, the average height H2 of the second protrusion, the average height ratio H1/H2 of the protrusion, the height range ΔH, and the gradient range ΔA mean values measured with the finally obtained magnetic tape (magnetic tape after undergoing the calendering step), respectively.

Hereinafter, the average height H1 of the first protrusion, the average height H2 of the second protrusion, the average height ratio H1/H2 of the protrusion, the height range ΔH, and the gradient range ΔA are referred to as respective numerical values of the concavoconvex shape.

Example 1

(Step of Preparing Magnetic Layer Forming Coating Material)

A magnetic layer forming coating material was prepared as follows. First, a first composition having the following formulation was kneaded with an extruder. Next, the kneaded first composition and a second composition of the following formulation were added to a stirring tank equipped with a disper and premixing was carried out. Subsequently, sand mill mixing was further carried out and filter treatment was carried out to prepare the magnetic layer forming coating material.

(First Composition)
    Barium ferrite ($BaFe_{12}O_{19}$) magnetic powder (hexagonal plate shape, average aspect ratio 3.2, average particle volume: 1,600 $nm^3$):100 parts by mass
    Vinyl chloride resin solution in which a vinyl chloride-based resin is dispersed in cyclohexanone (vinyl chloride-based resin: 30% by mass, cyclohexanone: 70% by mass):65 parts by mass
    (vinyl chloride-based resin: degree of polymerization 300, number average molecular weight Mn=10,000, containing $OSO_3K$=0.07 mmol/g, and secondary OH=0.3 mmol/g as a polar group)
    Aluminum oxide powder ($\alpha$-$Al_2O_3$, average particle size ($D_{50}$) 80 nm):5.0 parts by mass (Second Composition)
    Vinyl chloride resin solution in which a vinyl chloride-based resin is dispersed in cyclohexanone (vinyl chloride-based resin: 30% by mass, cyclohexanone: 70% by mass):1.1 parts by mass
    n-butyl stearate: 2.0 parts by mass
    methyl ethyl ketone: 121.3 parts by mass
    toluene: 121.3 parts by mass
    cyclohexanone: 60.7 parts by mass
    carbon black (average particle size ($D_{50}$) 70 nm, manufactured by Tokai Carbon, trade name: SEAST S):2.0 parts by mass Finally, 4 parts by mass of polyisocyanate (trade name: Coronate L, manufactured by Tosoh Corporation) as a curing agent and 2 parts by mass of stearic acid were added to the magnetic layer forming coating material prepared as described above.

(Step of Preparing Underlayer Forming Coating Material)

An underlayer forming coating material was prepared as follows. First, a third composition having the following formulation was kneaded with an extruder. Next, the kneaded third composition and a fourth composition of the following formulation were added to a stirring tank equipped with a disper and premixing was carried out. Subsequently, sand mill mixing was further carried out and filter treatment was carried out to prepare the underlayer forming coating material.

(Third Composition)
    Needle-shaped iron oxide powder having a medium particle size (nonmagnetic powder) (x-$Fe_2O_3$, average long axis length 0.08 μm):100 parts by mass
    Vinyl chloride resin solution in which a vinyl chloride-based resin is dispersed in cyclohexanone (vinyl chloride-based resin: 30% by mass, cyclohexanone: 70% by mass):55.6 parts by mass
    Carbon black (average particle size 20 nm):10 parts by mass (Fourth Composition)
    polyurethane resin UR 8200 (manufactured by TOYOBO CO., LTD.):18.5 parts by mass
    n-butyl stearate: 2 parts by mass
    methyl ethyl ketone: 108.2 parts by mass
    toluene: 108.2 parts by mass
    cyclohexanone: 18.5 parts by mass Finally, 4 parts by mass of polyisocyanate (trade name: Coronate L, manufactured by Tosoh Corporation) as a curing agent and 2 parts by mass of stearic acid were added to the underlayer forming coating material prepared as described above.

(Step of Preparing Back Layer Forming Coating Material)

A back layer forming coating material was prepared as follows. The following raw materials were mixed in a stirring tank equipped with a disperser and subjected to filter treatment to prepare the back layer forming coating material.
    carbon black powder (average particle size (D50) 20 nm):100 parts by mass
    polyester polyurethane (manufactured by Nippon Polyurethane Industry Co., Ltd., trade name: N-2304):100 parts by mass
    methyl ethyl ketone: 500 parts by mass
    toluene: 400 parts by mass
    cyclohexanone: 100 parts by mass (Applying Step)

An underlayer and a magnetic layer were formed in the following manner on one main surface of an elongated polyethylene naphthalate film (hereinafter referred to as "PEN film") having an average thickness of 3.6 μm, which is a nonmagnetic support, using the magnetic layer forming coating material and the underlayer forming coating material prepared as described above. First, the underlayer forming coating material was applied onto one main surface of the PEN film to be dried to form an underlayer so that the average thickness was 1.1 μm after the calendering treatment. Next, the magnetic layer forming coating material was applied onto the underlayer to be dried to form a magnetic layer so that the average thickness was 85 nm after the calendering treatment. Note that when drying the magnetic layer forming coating material, magnetic field orientation of the magnetic particles in the thickness direction of the film was performed by a solenoid coil. In addition, the square ratio S1 of the magnetic tape in the vertical direction (thickness direction) was set to 65%, and the square ratio S2 of the magnetic tape in the longitudinal direction was set to 38%. Subsequently, the back layer forming coating material was applied onto another main surface of the PEN film to be dried to form a back layer so that the average thickness was 0.4 μm after the calendering treatment. With this arrangement, the magnetic tape was obtained.

(Curing Step)

After the magnetic tape is wound into a roll shape, the magnetic tape is heated at 70° C. for 48 hours in this state to cure the underlayer and the magnetic layer.

(Calendering Step)

Calender treatment was performed to smooth the surface of the magnetic layer. At this time, the temperature of the calendering treatment was set to a reference temperature of 100° C., and the pressure of the calendering treatment was set to a reference pressure of 200 kg/cm, so that each numerical value of the concavoconvex shape was set to the value shown in Table 1.

(Cutting Step)

The magnetic tape obtained as described above was cut into a width of ½ inch (12.65 mm). As a result, a magnetic tape having an average thickness of 5.2 μm was obtained.

Example 2

A magnetic tape in which each numerical value of the concavoconvex shape was set to the value shown in Table 1 was obtained similarly to Example 1 except for the following points.

In the step of preparing the magnetic layer forming coating material, the blending amount of the aluminum oxide powder of the first composition was changed from 5.0 parts by mass to 7.5 parts by mass, and the blending amount of the vinyl chloride resin solution of the first composition was changed from 65 parts by mass to 46 parts by mass.

In addition, after the cutting step, the magnetic surface was scraped with a prism.

Example 3

A magnetic tape in which each numerical value of the concavoconvex shape was set to the value shown in Table 1 was obtained similarly to Example 1 except for the following points.

In the step of preparing the magnetic layer forming coating material, the blending amount of the aluminum oxide powder of the first composition was changed from 5.0 parts by mass to 7.5 parts by mass.

Example 4

A magnetic tape in which each numerical value of the concavoconvex shape was set to the value shown in Table 1 was obtained similarly to Example 1 except for the following points.

In the step of preparing the magnetic layer forming coating material, an aluminum oxide powder ($\alpha$-$Al_2O_3$, average particle size (D50) 50 nm) was used in place of the aluminum oxide powder ($\alpha$-$Al_2O_3$, average particle size (D50) 80 nm) of the first composition, and the blending amount of the aluminum oxide powder of the first composition was changed from 5.0 parts by mass to 7.5 parts by mass.

In addition, in the calendering step, the temperature of the calendering treatment was changed to a temperature lower than the reference temperature of 100° C. of Example 1.

Example 5

A magnetic tape in which each numerical value of the concavoconvex shape was set to the value shown in Table 1 was obtained similarly to Example 4 except for the following points.

In the calendering step, the temperature of the calendering treatment was changed from a temperature lower than the reference temperature of 100° C. to the reference temperature of 100° C. similar to that of Example 1.

Example 6

A magnetic tape in which each numerical value of the concavoconvex shape was set to the value shown in Table 1 was obtained similarly to Example 4 except for the following points.

In the calendering step, the temperature of the calendering treatment was changed from a temperature lower than the reference temperature of 100° C. to a temperature higher than the reference temperature of 100° C.

Example 7

A magnetic tape in which each numerical value of the concavoconvex shape was set to the value shown in Table 1 was obtained similarly to Example 4 except for the following points.

In the step of preparing the magnetic layer forming coating material, an aluminum oxide powder ($\alpha$-$Al_2O_3$, average particle size (D50) 80 nm) was used in place of the aluminum oxide powder ($\alpha$-$Al_2O_3$, average particle size (D50) 50 nm) of the first composition.

Example 8

A magnetic tape in which each numerical value of the concavoconvex shape was set to the value shown in Table 1 was obtained similarly to Example 2 except for the following points.

In the step of preparing the magnetic layer forming coating material, the blending amount of the vinyl chloride resin solution of the first composition was changed from 46 parts by mass to 65 parts by mass.

Comparative Example 1

A magnetic tape in which each numerical value of the concavoconvex shape was set to the value shown in Table 1 was obtained similarly to Example 2 except for the following points.

In the step of preparing the magnetic layer forming coating material, barium ferrite ($BaFe_{12}O_{19}$) magnetic powder (hexagonal plate shape, average aspect ratio 3.2, average particle volume 2500 $nm^3$) was used in place of the barium ferrite ($BaFe_{12}O_{19}$) magnetic powder (hexagonal plate shape, average aspect ratio 3.2, average particle volume 1600 $nm^3$).

In addition, the treatment of the magnetic surface with the prism was not performed between the calendering step and the cutting step.

Comparative Example 2

A magnetic tape in which each numerical value of the concavoconvex shape was set to the value shown in Table 1 was obtained similarly to Example 1 except for the following points.

In the step of preparing the magnetic layer forming coating material, an aluminum oxide powder ($\alpha$-$Al_2O_3$, average particle size (D50) 80 nm) was blended in the second composition in place of the first composition, and the blending amount of the vinyl chloride resin solution of the first composition was changed from 65 parts by mass to 46 parts by mass.

Comparative Example 3

A magnetic tape in which each numerical value of the concavoconvex shape was set to the value shown in Table 1 was obtained similarly to Comparative Example 1 except for the following points.

In the step of preparing the magnetic layer forming coating material, 2.0 parts by mass of carbon black (average particle size (D50) 100 nm, manufactured by Tokai Carbon, trade name: SEAST SP) and 1.5 parts by mass of carbon black (average particle size (D50) 70 nm, manufactured by Tokai Carbon, trade name: SEAST S) were used in place of 2.0 parts by mass of carbon black (average particle size (D50) 70 nm, manufactured by Tokai Carbon, trade name: SEAST S) of the first composition.

Comparative Example 4

A magnetic tape in which each numerical value of the concavoconvex shape was set to the value shown in Table 1 was obtained similarly to Example 1 except for the following points.

In the step of preparing the magnetic layer forming coating material, needle-shaped metal magnetic powder (average particle volume: 3000 nm$^3$) was used in place of the barium ferrite (BaFe$_{12}$O$_{19}$) magnetic powder (hexagonal plate shape, average aspect ratio 3.2, average particle volume 1600 nm$^3$).

Comparative Example 5

A magnetic tape in which each numerical value of the concavoconvex shape was set to the value shown in Table 1 was obtained similarly to Example 1 except for the following points.

In the step of preparing the magnetic layer forming coating material, the blending amount of the vinyl chloride resin solution of the first composition was changed from 65 parts by mass to 46 parts by mass.

Comparative Example 6

A magnetic tape in which each numerical value of the concavoconvex shape was set to the value shown in Table 1 was obtained similarly to Example 4 except for the following points.

In the calendering step, the pressure of the calendering treatment was changed to a pressure lower than the reference pressure of 200 kg/cm in Example 1.

Comparative Example 7

A magnetic tape in which each numerical value of the concavoconvex shape was set to the value shown in Table 1 was obtained similarly to Example 6 except for the following points.

In the step of preparing the magnetic layer forming coating material, an aluminum oxide powder ($\alpha$-Al$_2$O$_3$, average particle size (D50) 80 nm) was used in place of the aluminum oxide powder ($\alpha$-Al$_2$O$_3$, average particle size (D50) 50 nm) of the first composition.

Comparative Example 8

A magnetic tape in which each numerical value of the concavoconvex shape was set to the value shown in Table 1 was obtained similarly to Example 1 except for the following points.

In the step of preparing the magnetic layer forming coating material, an aluminum oxide powder ($\alpha$-Al$_2$O$_3$, average particle size (D50) 50 nm) was used in place of the aluminum oxide powder ($\alpha$-Al$_2$O$_3$, average particle size (D50) 80 nm) of the first composition.

[Evaluation]

(Electromagnetic Conversion Characteristics)

The SNR of the magnetic tape on which the servo pattern was written was evaluated as follows. The electromagnetic conversion characteristics (SNR) of the magnetic tape in a 25 degrees C. environment were measured using a ½ inch tape traveling device (MTS Transport, manufactured by Mountain Engineering II, Inc.) equipped with a recording/reproducing head and a recording/reproducing amplifier. A ring head with a gap length of 0.2 μm was used as the recording head, and a GMR head with an inter-shield distance of 0.1 μm was used for as reproducing head. A relative speed was 6 m/s, a recording clock frequency was 160 MHZ, and a recording track width was 2.0 μm. Furthermore, the SNR was calculated on the basis of the method disclosed in the following document. The results are illustrated in Table 1 as relative values with the SNR of Comparative Example 1 being 0 dB.

Y. Okazaki: "An Error Rate Emulation System.", IEEE Trans. Man., 31, pp. 3093-3095 (1995)

(Standard Deviation σPES)

The standard deviation σPES of the magnetic tape was measured by the method of measuring the standard deviation σPES described in one embodiment described above.

[Evaluation Results]

Figure 34:
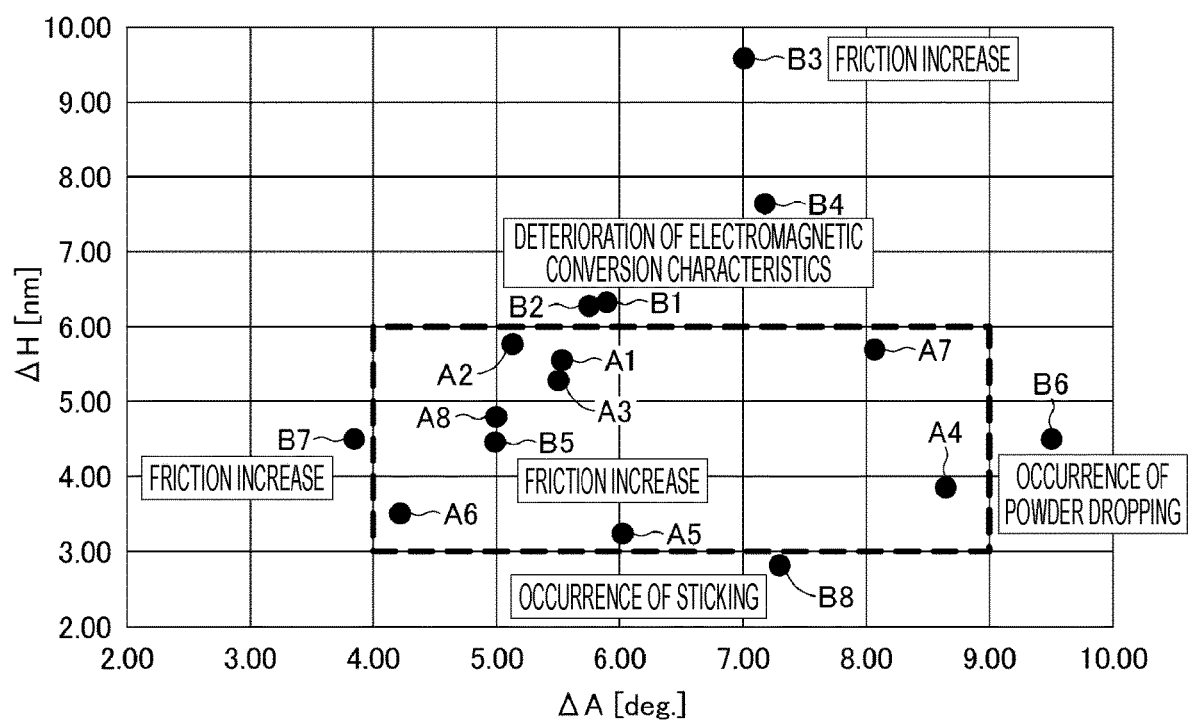
FIG. 34 is a graph illustrating a relationship between the height range ΔH and the gradient range ΔA.

Table 1 shows the configurations and the evaluation results of the magnetic tapes of Examples 1 to 8 and Comparative Examples 1 to 8. FIG. 34 illustrates a relationship between the height range ΔH and the gradient range ΔA of the magnetic tapes of Examples 1 to 8 and Comparative Examples 1 to 8. In FIG. 34, reference numerals A1 to A8 correspond to the evaluation results of Examples 1 to 8, respectively, and reference numerals B1 to B8 correspond to the evaluation results of Comparative Examples 1 to 8, respectively.

TABLE 1

| | Reference numeral in FIG. 34 | Magnetic powder Type | Size [nm$^3$] | Carbon (first particle) Average particle size (D50) [nm] | Blending amount [part(s) by mass] | Al$_2$O$_3$ (second particle) Average particle size (D50) [nm] | Blending amount [part(s) by mass] | Type of compound blended with Al$_2$O$_3$ | Vinyl chloride resin solution Blending amount [part(s) by mass] | Calendering treatment Temperature |
|---|---|---|---|---|---|---|---|---|---|---|
| Example 1 | A1 | BaFe$_{12}$O$_{19}$ | 1600 | 70 | 2.0 | 80 | 5.0 | First composition | 65 | Reference |
| Example 2 | A2 | BaFe$_{12}$O$_{19}$ | 1600 | 70 | 2.0 | 80 | 7.5 | First composition | 46 | Reference |
| Example 3 | A3 | BaFe$_{12}$O$_{19}$ | 1600 | 70 | 2.0 | 80 | 7.5 | First composition | 65 | Reference |
| Example 4 | A4 | BaFe$_{12}$O$_{19}$ | 1600 | 70 | 2.0 | 50 | 7.5 | First composition | 65 | Low temperature |

TABLE 1-continued

| | | | | | | | | | | |
|---|---|---|---|---|---|---|---|---|---|---|
| Example 5 | A5 | $BaFe_{12}O_{19}$ | 1600 | 70 | 2.0 | 50 | 7.5 | First composition | 65 | Reference |
| Example 6 | A6 | $BaFe_{12}O_{19}$ | 1600 | 70 | 2.0 | 50 | 7.5 | First composition | 65 | High temperature |
| Example 7 | A7 | $BaFe_{12}O_{19}$ | 1600 | 70 | 2.0 | 80 | 7.5 | First composition | 65 | Low temperature |
| Example 8 | A8 | $BaFe_{12}O_{19}$ | 1600 | 70 | 2.0 | 80 | 7.5 | First composition | 65 | Reference |
| Comparative Example 1 | B1 | $BaFe_{12}O_{19}$ | 2500 | 70 | 2.0 | 80 | 7.5 | First composition | 46 | Reference |
| Comparative Example 2 | B2 | $BaFe_{12}O_{19}$ | 1600 | 70 | 2.0 | 80 | 5.0 | Second composition | 46 | Reference |
| Comparative Example 3 | B3 | $BaFe_{12}O_{19}$ | 2500 | 100, 70 | 2.0, 1.5 | 80 | 5.0 | First composition | 46 | Reference |
| Comparative Example 4 | B4 | Needle-shaped metal | 3000 | 70 | 2.0 | 80 | 5.0 | First composition | 65 | Reference |
| Comparative Example 5 | B5 | $BaFe_{12}O_{19}$ | 1600 | 70 | 2.0 | 80 | 5.0 | First composition | 46 | Reference |
| Comparative Example 6 | B6 | $BaFe_{12}O_{19}$ | 1600 | 70 | 2.0 | 50 | 7.5 | First composition | 65 | Low temperature |
| Comparative Example 7 | B7 | $BaFe_{12}O_{19}$ | 1600 | 70 | 2.0 | 80 | 7.5 | First composition | 65 | High temperature |
| Comparative Example 8 | B8 | $BaFe_{12}O_{19}$ | 1600 | 70 | 2.0 | 50 | 5.0 | First composition | 65 | Reference |

| | Calendering treatment Pressure | Prism surface treatment Presence (P)/absence (A) | Each numerical value of concavoconvex shape on magnetic surface | | | | Evaluation result | |
|---|---|---|---|---|---|---|---|---|
| | | | H1/H2 | H1 [nm] | H2 [nm] | ΔH [nm] | ΔA [degree] | Electromagnetic conversion characteristics [db] | σPES increase (friction increase) [nm] |
| Example 1 | Reference | A | 2.0 | 10.4 | 5.1 | 5.56 | 5.53 | 1.3 | 43 |
| Example 2 | Reference | P | 1.5 | 7.6 | 5.0 | 5.77 | 5.13 | 1.5 | 33 |
| Example 3 | Reference | A | 1.7 | 11.4 | 6.6 | 5.28 | 5.50 | 1.3 | 35 |
| Example 4 | Reference | A | 1.8 | 11.5 | 6.4 | 3.85 | 8.65 | 1.8 | 30 |
| Example 5 | Reference | A | 1.7 | 11.4 | 6.7 | 3.24 | 6.03 | 2.0 | 25 |
| Example 6 | Reference | A | 1.7 | 11.3 | 6.5 | 3.51 | 4.22 | 2.0 | 37 |
| Example 7 | Reference | A | 2.2 | 11.2 | 5.0 | 5.70 | 8.07 | 1.5 | 40 |
| Example 8 | Reference | P | 1.1 | 7.5 | 6.8 | 4.80 | 5.00 | 1.4 | 24 |
| Comparative Example 1 | Reference | A | 2.2 | 11.3 | 5.1 | 6.33 | 5.90 | 0.0 | 45 |
| Comparative Example 2 | Reference | A | 1.9 | 11.8 | 6.1 | 6.28 | 5.75 | 0.5 | 44 |
| Comparative Example 3 | Reference | A | 2.4 | 12.2 | 5.1 | 9.58 | 7.01 | −0.8 | 55 |
| Comparative Example 4 | Reference | A | 2.0 | 12.7 | 6.2 | 7.64 | 7.18 | −1.5 | 40 |
| Comparative Example 5 | Reference | A | 3.0 | 14.7 | 4.9 | 4.46 | 4.99 | 1.8 | 60 |
| Comparative Example 6 | Low pressure | A | 1.8 | 11.5 | 6.4 | 4.50 | 9.50 | Powder dropping | Powder dropping |
| Comparative Example 7 | Reference | A | 2.1 | 10.3 | 5.0 | 4.50 | 3.85 | 1.8 | 53 |
| Comparative Example 8 | Reference | A | 2.2 | 13.8 | 6.3 | 2.82 | 7.30 | Sticking | Sticking |

The following can be seen from Table 1 and FIG. 34. When the ratio H1/H2 of the average height H1 of the first protrusion to the average height H2 of the second protrusion meets H1/H2≤2.3, the height range ΔH is 3.00 nm≤ΔH≤6.00 nm, and the gradient range ΔA is 4.00 degrees≤ΔA≤9.00 degrees, it is possible to secure good electromagnetic conversion characteristics while suppressing the increase in the standard deviation σPES (friction) of the PES value.

When the ratio H1/H2 of the average height H1 of the first protrusion to the average height H2 of the second protrusion meets 2.3<H1/H2, the standard deviation σPES (friction) of the PES value increases. When the height range ΔH meets ΔH<3.00 nm, the head unit 300 sticks to the magnetic tape, making it difficult for the magnetic tape to travel. On the other hand, when the height range ΔH meets 6.00 nm<ΔH, the electromagnetic conversion characteristics (SNR) are deteriorated due to spacing loss.

When the gradient range ΔA meets ΔA<4.00 degrees, the gradient of the protrusion on the surface of the magnetic layer becomes too gentle, and the standard deviation σPES (friction) of the PES value increases. On the other hand, when the gradient range ΔA meets 9.00 degrees<ΔA, the gradient of the protrusion on the surface of the magnetic layer becomes too steep, and the protrusion is scraped when the magnetic tape travels, so that powder is dropped.

The embodiment and the modified examples thereof of the present disclosure have been specifically described above, but the present disclosure is not limited to the embodiment and modified examples described above thereof, and various modifications on the basis of the technical idea of the present disclosure are possible. For example, configurations, methods, steps, shapes, materials, numerical values, and the like described in the embodiment and modified examples described above are merely examples, and different configurations, methods, processes, shapes, materials, numerical values, and the like may be used as necessary. The configurations, methods, steps, shapes, materials, numerical values, and the like of the embodiment and modified examples described above can be combined with each other without departing from the gist of the present disclosure.

The chemical formulas of the compounds and the like exemplified in the above embodiments and modified examples are representative, and are not limited to the described valences and the like as long as they are common names of the same compounds. In numerical value ranges described in stages in the embodiment and modified examples described above, an upper limit value or a lower limit value of a numerical value range of a certain stage may be replaced with the upper limit value or the lower limit value of the numerical value range of another stage. The materials exemplified in the embodiments and modified examples described above may be used alone or in combination of two or more unless otherwise specified.

Furthermore, the present disclosure can also adopt the following configurations.

(1)

A tape-shaped magnetic recording medium, the magnetic recording medium sequentially including a base, an underlayer, and a magnetic layer,
 in which the magnetic layer includes magnetic particles, conductive first particles, and second particles having a Mohs hardness of 7.0 or more,
 the magnetic layer has a concavoconvex shape on a magnetic surface,
 the concavoconvex shape includes a first protrusion including the first particle and a second protrusion including the second particle,
 a ratio H1/H2 of an average height H1 of the first protrusion and an average height H2 of the second protrusion satisfies H1/H2≤2.3,
 a height range ΔH obtained from statistical information on a height of the concavoconvex shape satisfies 3.00 nm≤ΔH≤6.00 nm, and
 a gradient range ΔA obtained from statistical information on a gradient of the concavoconvex shape satisfies 4.00 degrees≤ΔA≤9.00 degrees.

(2)

The magnetic recording medium according to (1), in which the ratio H1/H2 satisfies 1.0≤H1/H2≤1.7 or less.

(3)

The magnetic recording medium according to (1) or (2), in which the height range ΔH satisfies 3.00 nm≤ΔH≤4.00 nm.

(4)

The magnetic recording medium according to any one of (1) to (3), in which the average height H1 of the first protrusion is 5.0 nm or more and 12.0 nm or less, and the average height H2 of the second protrusion is 2.0 nm or more and 7.0 nm or less.

(5)

The magnetic recording medium according to any one of (1) to (4), in which the first particles include carbon particles.

(6)

The magnetic recording medium according to any one of (1) to (5), in which the second particles include inorganic particles.

(7)

The magnetic recording medium according to any one of (1) to (5), in which the second particles include alumina particles.

(8)

The magnetic recording medium according to any one of (1) to (7), in which an average thickness of the magnetic layer is 80 nm or less.

(9)

The magnetic recording medium according to any one of (1) to (8), in which an average thickness of the underlayer is 0.9 μm or less.

(10)

The magnetic recording medium according to any one of (1) to (9), in which an average thickness of the magnetic recording medium is 5.3 μm or less.

(11)

The magnetic recording medium according to any one of (1) to (10), in which an average thickness of the base is 4.4 μm or less.

(12)

The magnetic recording medium according to any one of (1) to (11), in which an average particle volume of the magnetic particle is 2500 $nm^3$ or less.

(13)

The magnetic recording medium according to any one of (1) to (11), in which an average particle volume of the magnetic particle is 1600 $nm^3$ or less.

(14)

The magnetic recording medium according to any one of (1) to (13), in which the magnetic particle includes hexagonal ferrite, ε-iron oxide, or Co-containing spinel ferrite.

(15)

The magnetic recording medium according to any one of (1) to (14), in which the base includes polyester.

(16)

A tape-shaped magnetic recording medium, the magnetic recording medium sequentially including a base, an underlayer, and a magnetic layer,
 in which the magnetic layer includes magnetic particles, carbon particles, and an abrasive,
 the magnetic layer has a concavoconvex shape on a magnetic surface,
 the concavoconvex shape includes a first protrusion including the carbon particle and a second protrusion including the abrasive,
 a ratio H1/H2 of an average height H1 of the first protrusion and an average height H2 of the second protrusion satisfies H1/H2≤2.3,
 a height range ΔH obtained from statistical information on a height of the concavoconvex shape satisfies 3.00 nm≤ΔH≤6.00 nm, and
 a gradient range ΔA obtained from statistical information on a gradient of the concavoconvex shape satisfies 4.00 degrees≤ΔA≤9.00 degrees.

(17)

The magnetic recording medium according to (16), in which the abrasive includes alumina particles.

(18)

A cartridge including the magnetic recording medium according to any one of (1) to (17).

REFERENCE SIGNS LIST

10 Cartridge
11 Cartridge memory
31 Antenna coil
32 Rectification/power source circuit 33 Clock circuit
34 Detection/modulation circuit
35 Controller
36 Memory
36A First storage region
36B Second storage region
41 Base
42 Underlayer
43 Magnetic layer
44 Back layer
56, 300 Head unit
56A, 56B Servo read head
110 Servo frame
111 Servo subframe 1
111A A Burst
111B B Burst
112 Servo subframe 2
112C C Burst
112D D Burst
113 Servo stripe
MT Magnetic tape
SB Servo band
DB Data binding

The invention claimed is:

1. A magnetic recording medium, the magnetic recording medium sequentially comprising a base, an underlayer, and a magnetic layer,
    wherein the magnetic layer includes magnetic particles, first particles, and second particles having a Mohs hardness of 7.0 or more,
    the magnetic layer has a concavoconvex shape on a magnetic surface,
    the concavoconvex shape includes a first protrusion including the first particles and a second protrusion including the second particles,
    a ratio H1/H2 of an average height H1 of the first protrusion and an average height H2 of the second protrusion satisfies H1/H2≤2.3,
    a height range ΔH obtained from statistical information on a height of the concavoconvex shape satisfies 3.00 nm≤ΔH≤6.00 nm,
    a gradient range ΔA obtained from statistical information on a gradient of the concavoconvex shape satisfies 4.00 degrees≤ΔA≤9.00 degrees,
    the first particles include carbon-containing particles,
    the second particles include non-magnetic particles, and
    the magnetic recording medium is tape-shaped.

2. The magnetic recording medium according to claim 1, wherein the ratio H1/H2 satisfies 1.0≤H1/H2≤1.7 or less.

3. The magnetic recording medium according to claim 1, wherein the height range ΔH satisfies 3.00 nm≤ΔH≤4.00 nm.

4. The magnetic recording medium according to claim 1, wherein the average height H1 of the first protrusion is 5.0 nm or more and 12.0 nm or less, and the average height H2 of the second protrusion is 2.0 nm or more and 7.0 nm or less.

5. The magnetic recording medium according to claim 1, wherein the carbon-containing particles include carbon particles.

6. The magnetic recording medium according to claim 1, wherein the non-magnetic particles include inorganic particles.

7. The magnetic recording medium according to claim 6, wherein the inorganic particles include alumina particles.

8. The magnetic recording medium according to claim 1, wherein an average thickness of the magnetic layer is 80 nm or less.

9. The magnetic recording medium according to claim 1, wherein an average thickness of the underlayer is 0.9 μm or less.

10. The magnetic recording medium according to claim 1, wherein an average thickness of the magnetic recording medium is 5.3 μm or less.

11. The magnetic recording medium according to claim 1, wherein an average thickness of the base is 4.4 μm or less.

12. The magnetic recording medium according to claim 1, wherein an average particle volume of the magnetic particle is 2500 nm$^3$ or less.

13. The magnetic recording medium according to claim 1, wherein an average particle volume of the magnetic particle is 1600 nm$^3$ or less.

14. The magnetic recording medium according to claim 1, wherein the magnetic particles includes hexagonal ferrite, ε-iron oxide, or Co-containing spinel ferrite.

15. The magnetic recording medium according to claim 1, wherein the base includes polyester.

16. A cartridge including the magnetic recording medium according to claim 1.

17. A magnetic recording medium, the magnetic recording medium sequentially comprising a base, an underlayer, and a magnetic layer,
    wherein the magnetic layer includes magnetic particles, carbon particles, and non-magnetic particles,
    the magnetic layer has a concavoconvex shape on a magnetic surface,
    the concavoconvex shape includes a first protrusion including the carbon particles and a second protrusion including the non-magnetic particles,
    a ratio H1/H2 of an average height H1 of the first protrusion and an average height H2 of the second protrusion satisfies H1/H2≤2.3,
    a height range ΔH obtained from statistical information on a height of the concavoconvex shape satisfies 3.00 nm≤ΔH≤6.00 nm,
    a gradient range ΔA obtained from statistical information on a gradient of the concavoconvex shape satisfies 4.00 degrees≤ΔA≤9.00 degrees, and
    the magnetic recording medium is tape-shaped.

18. The magnetic recording medium according to claim 17, wherein the non-magnetic particles include alumina particles.

19. A cartridge including the magnetic recording medium according to claim 17.

20. The magnetic recording medium according to claim 17, wherein the non-magnetic particles are an abrasive.

* * * * *